(12) United States Patent
Wang et al.

(10) Patent No.: US 10,663,966 B2
(45) Date of Patent: May 26, 2020

(54) VEHICLE MOTION CONTROL SYSTEM AND METHOD

(71) Applicant: Mitsubishi Electric Research Laboratories, Inc., Cambridge, MA (US)

(72) Inventors: Yebin Wang, Acton, MA (US); Jin Dai, Mishawaka, IN (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 17 days.

(21) Appl. No.: 15/472,373

(22) Filed: Mar. 29, 2017

(65) Prior Publication Data
US 2018/0284769 A1    Oct. 4, 2018

(51) Int. Cl.
G05D 1/00        (2006.01)
B62D 15/02       (2006.01)
(Continued)

(52) U.S. Cl.
CPC ........... *G05D 1/0088* (2013.01); *B60W 30/06* (2013.01); *B62D 1/00* (2013.01); *B62D 15/0285* (2013.01); *G05D 1/0212* (2013.01); *G05D 1/0217* (2013.01); *G05D 1/0248* (2013.01); *G06F 17/11* (2013.01); *G06F 17/5009* (2013.01);
(Continued)

(58) Field of Classification Search
CPC combination set(s) only.
See application file for complete search history.

(56) References Cited

U.S. PATENT DOCUMENTS

| 8,428,820 B2 | 4/2013 | Ottenhues et al. |
| 8,862,436 B2 * | 10/2014 | Samuel ..................... E21B 7/04 703/1 |

(Continued)

OTHER PUBLICATIONS

Thierry Fraichard, Alexis Scheuer. "From Reeds and Shepp's to continuous-curvature paths". IEEE Transactions on Robotics, IEEE, 2004, 20 (6), pp. 1025-1035.

(Continued)

*Primary Examiner* — Adam D Tissot
*Assistant Examiner* — Edward J Pipala
(74) *Attorney, Agent, or Firm* — Gennadiy Vinokur; James McAleenan; Hironori Tsukamoto

(57) ABSTRACT

A system for controlling a motion of a vehicle includes a memory to store a set of analytical functions corresponding to a set of patterns of elementary paths. Each pattern represents a continuous path and each analytical function is determined for a corresponding pattern to provide an analytical solution for input states of the vehicle defining a continuous path connecting the input states by a sequential compositions of the elementary paths following the corresponding pattern. The system includes a path planner to select from the memory, in response to receiving an initial state and a target state of the vehicle, an analytical function corresponding to a minimum cost of the continuous curvature path connecting the initial state with the target state and to analytically determine parameters of the continuous curvature path using the selected analytical function and a controller to control the motion of the vehicle according to the parameters of the continuous curvature path.

15 Claims, 40 Drawing Sheets

(51) Int. Cl.
  *G05D 1/02*  (2020.01)
  *B62D 1/00*  (2006.01)
  *B60W 30/06* (2006.01)
  *G06F 17/11* (2006.01)
  *G06F 17/50* (2006.01)
  *G08G 1/14*  (2006.01)

(52) U.S. Cl.
  CPC ..... *G06F 17/5095* (2013.01); *B60W 2420/42* (2013.01); *B60W 2420/52* (2013.01); *B60W 2510/20* (2013.01); *B60W 2520/06* (2013.01); *B60W 2710/20* (2013.01); *B60W 2720/24* (2013.01); *G05D 2201/0213* (2013.01); *G06F 2217/16* (2013.01); *G08G 1/142* (2013.01); *G08G 1/143* (2013.01)

(56) References Cited

U.S. PATENT DOCUMENTS

| | | | | |
|---|---|---|---|---|
| 9,174,674 B2* | 11/2015 | Endo | .................. | B62D 7/159 |
| 9,746,854 B2* | 8/2017 | Berkemeier | ......... | G05D 1/0212 |
| 2010/0299013 A1* | 11/2010 | Dolgov | ................ | G05D 1/0274 |
| | | | | 701/25 |
| 2012/0024605 A1* | 2/2012 | Elinas | .................... | G06Q 10/06 |
| | | | | 175/57 |
| 2013/0313373 A1 | 11/2013 | O'Dell | | |
| 2016/0313737 A1* | 10/2016 | Berkemeier | ......... | G05D 1/0212 |
| 2017/0144702 A1* | 5/2017 | Dang | .................... | A01B 69/008 |
| 2017/0293304 A1* | 10/2017 | Dang | .................... | A01B 69/008 |

OTHER PUBLICATIONS

Choi et al., "Constrained Global Path OPtimization for Articulated Steering Vehicles," IEEE Transactions on Vehicular Technology, IEEE Service Center, Piscataway, NJ. vol. 65, No. 4, Apr. 4, 2016. pp. 1868-1879.
Sabelhaus et al., "Using Continuous-curvature Paths to Generate Feasible Headland Turn Manoeuvres," Biosystems Engineeringm vol. 116, No. 4, Oct. 13, 2013, pp. 399-409.
Fraichard et al., "From Reeds and Shepps to Continuous curvature Paths," IEEE transactions on robotics, IEEE, Piscataway, NJ. vol. 20, No. 6, Dec. 1, 2004, pp. 1025-1035.

* cited by examiner

| Classes | Patterns |
|---|---|
| $CSC-1$ | L+S+L+, L-S-L-, R+S+R+, R-S-R- |
| $CSC-2$ | L+S+R+, L-S-R-, R+S+L+, R-S-L- |
| $C\|C\|C$ | L+R-L-, L-R+L+, R+L-R-, R-L+R+ |
| $C\|CC$ | L+R-L+, L-R+L-, R+L-R+, R-L+R- |
| $CC\|C$ | L+R+L-, L-R-L+, R+L+R-, R-L-R+ |
| $CC_u\|C_uC$ | L+R+L-R-, L-R-L+R+, R+L+R-L-, R-L-R+L+ |
| $C\|C_uC_u\|C$ | L+R-L-R+, L-R+L+R-, R+L-R-L+, R-L+L+R- |
| $C\|C_{\frac{\pi}{2}}SC-1$ | L+R-S-R-, L-R+S+R+, R+L-S-L-, R-L+S+L+ |
| $C\|C_{\frac{\pi}{2}}SC-2$ | L+R-S-L-, L-R+S+L+, R+L-S-R-, R-L+S+R+ |
| $CSC_{\frac{\pi}{2}}\|C-1$ | L+S+L+R-, L-S-L-R+, R+S+R+L-, R-S-R-L+ |
| $CSC_{\frac{\pi}{2}}\|C-2$ | L+S+R+L-, L-S-R-L+, R+S+L+R-, R-S-L-R+ |
| $C\|C_{\frac{\pi}{2}}SC_{\frac{\pi}{2}}\|C$ | L+R-S-L-R+, L-R+S+L+R-, R+L-S-R-L+, R-L+S+R+L- |

FIG. 1C

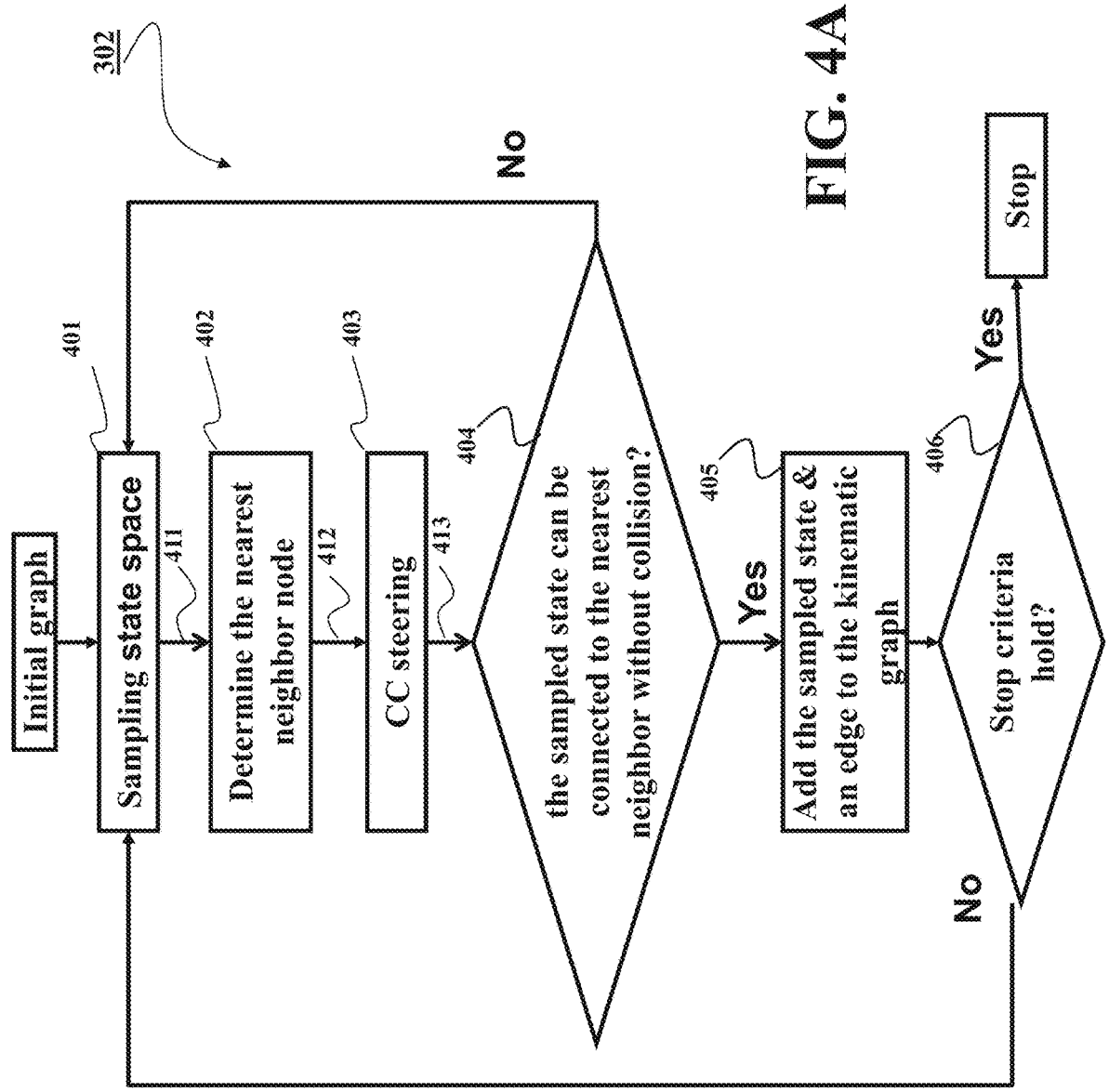

| Class | Geometric constraints |
|---|---|
| $CC_u\|C_uC$ | A line between centers of the first CT and final CT is parallel to a line between centers of two intermediate CTs |
| $C\|C_uC_u\|C$ | A line between centers of the first two CTs and a line between centers of the last two CTs is parallel |
| $C\|C_{\frac{\pi}{2}}SC\text{--}1$ | Centers of all three CTs stay in the same line |
| $C\|C_{\frac{\pi}{2}}SC_{\frac{\pi}{2}}\|C$ | A line between centers of the first two CTs and a line between centers of the last two CTs is parallel |

| | |
|---|---|
| Known | $\Omega_1, \Omega_2, R_\Omega, \mu, \delta_c$ |
| Existence condition | $0 \leq 2R_\Omega \sin\mu \leq L(\Omega_1 \Omega_2)$<br>$\theta \leq \theta_f$ |
| Validation condition | $|\delta_1|, |\delta_2| \leq \pi + 2\delta_c$ |
| Geometric constraints | N/A |
| Cost formula | $\delta_1 = \theta$<br>$L(q_1 q_2) = L(\Omega_1 \Omega_2) - 2R_\Omega \sin\mu$<br>$\delta_2 = \theta_f - \theta$<br>$J = arclen(\delta_1, \delta_2) + L(q_1 q_2)$ |

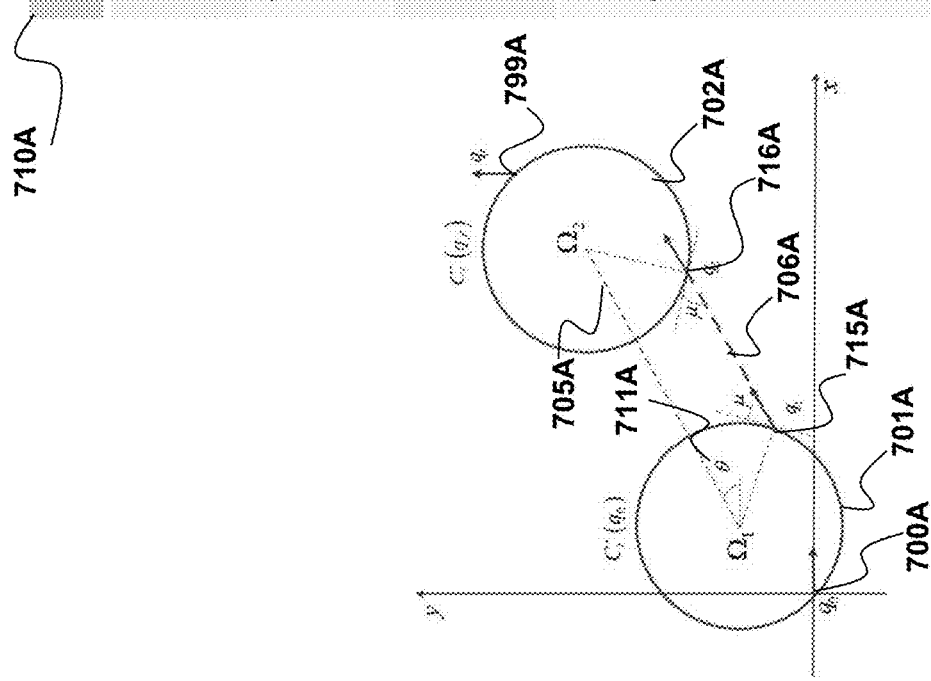

| Known | $\Omega_1, \Omega_2, R_\Omega, \mu, \delta_c$ |
|---|---|
| Existence condition | $0 \leq 2R_\Omega \sin \mu \leq L(\Omega_1 \Omega_2) \cos \alpha$ |
| Validation condition | $|\delta_1|, |\delta_2| \leq \pi + 2\delta_c$ |
| Geometric constraints | N/A |
| Cost formula | $\sin \alpha = \dfrac{2R_\Omega \cos \mu}{L(\Omega_1 \Omega_2)}$ <br> $\delta_1 = \theta + \alpha$ <br> $L(q_1 q_2) = L(\Omega_1 \Omega_2) \cos \alpha - 2R_\Omega \sin \mu$ <br> $\delta_2 = \theta_f - \theta - \alpha$ <br> $J = arclen(\delta_1, \delta_2) + L(q_1 q_2)$ |

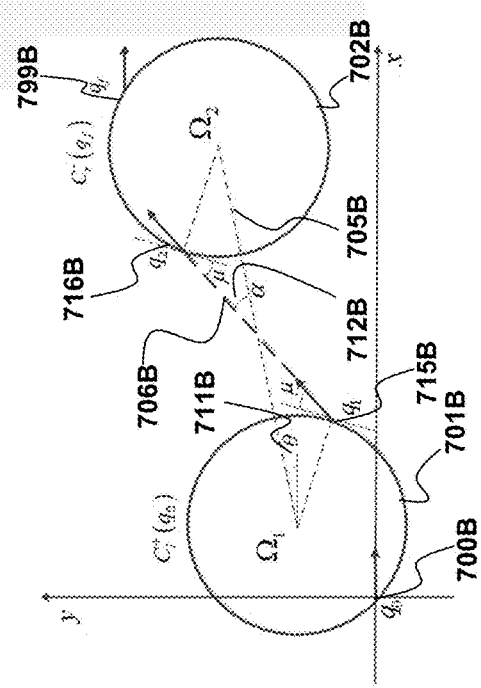

FIG. 7C

| Known | $\Omega_1, \Omega_2, R_\Omega, \mu, \delta_c$ |
|---|---|
| Existence condition | $0 \leq L(\Omega_1 \Omega_2) \leq 4R_\Omega \cos \mu$ |
| Validation condition | $|\delta_1|, |\delta_2|, |\delta_3| \leq \pi + 2\delta_c$ |
| Geometric constraints | N/A |
| Cost formula | $\cos \alpha = \dfrac{L(\Omega_1 \Omega_2)}{4R_\Omega \cos \mu}$ $\Omega_3 = \begin{pmatrix} x_{\Omega_1} + 2R_\Omega \cos \mu \cos(\theta + \alpha) \\ y_{\Omega_1} + 2R_\Omega \cos \mu \sin(\theta + \alpha) \end{pmatrix}$ $\delta_1 = \theta + \pi/2 + \alpha$ $\delta_2 = \theta_1 - \alpha - \pi - \theta$ $\delta_3 = \theta_f - \theta_1 + \pi/2$ $J = arclen(\delta_1, \delta_2, \delta_3)$ |

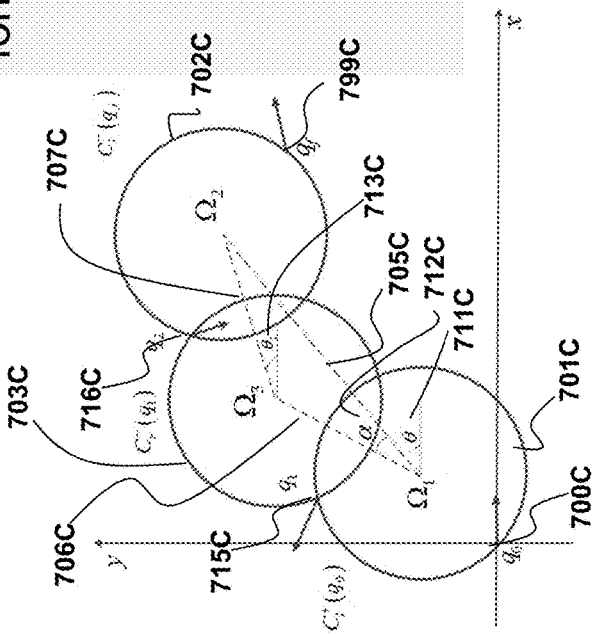

FIG. 7D

| | |
|---|---|
| Known | $\Omega_1, \Omega_2, R_\Omega, \mu, \delta_c$ |
| Existence condition | $0 \leq L(\Omega_1 \Omega_2) \leq 4 R_\Omega \cos \mu$ |
| Validation condition | $|\delta_1|, |\delta_2|, |\delta_3| \leq \pi + 2\delta_c$ |
| Geometric constraints | N/A |
| Cost formula | $\cos \alpha = \dfrac{L^2(\Omega_1 \Omega_2) - (2R_\Omega \sin \mu)^2}{4L(\Omega_1 \Omega_2) R_\Omega \cos \mu}$ <br> $\Omega_3 = \begin{pmatrix} x_{\Omega_1} + 2R_\Omega \cos \mu \cos(\theta + \alpha) \\ y_{\Omega_1} + 2R_\Omega \cos \mu \sin(\theta + \alpha) \end{pmatrix}$ <br> $\delta_1 = \theta + \pi/2 + \alpha$ <br> $\delta_2 = \theta_1 - \alpha - \pi - \theta - \mu$ <br> $\delta_3 = \theta_f - \theta_1 + \pi/2 + \mu$ <br> $J = arclen(\delta_1, \delta_2, \delta_3)$ |

FIG. 7E

| Known | $\Omega_1, \Omega_2, R_\Omega, \mu, \delta_c$ |
|---|---|
| Existence condition | $0 \leq L(\Omega_1\Omega_2) \leq 4R_\Omega \cos\mu$ |
| Validation condition | $|\delta_1|, |\delta_2|, |\delta_3| \leq \pi + 2\delta_c$ |
| Geometric constraints | N/A |
| Cost formula | $\cos\alpha = \dfrac{L^2(\Omega_1\Omega_2) + (2R_\Omega \sin\mu)^2}{4L(\Omega_1\Omega_2)R_\Omega \cos\mu}$ $\Omega_3 = \begin{pmatrix} x_{\Omega_1} + 2R_\Omega \cos\mu \cos(\theta-\alpha) \\ y_{\Omega_1} + 2R_\Omega \cos\mu \sin(\theta-\alpha) \end{pmatrix}$ $\delta_1 = \theta + \pi/2 - \alpha - \mu$ $\delta_2 = \theta_1 + \alpha - \pi - \theta - \mu$ $\delta_3 = \theta_f - \theta_1 + \pi/2$ $J = arclen(\delta_1, \delta_2, \delta_3)$ |

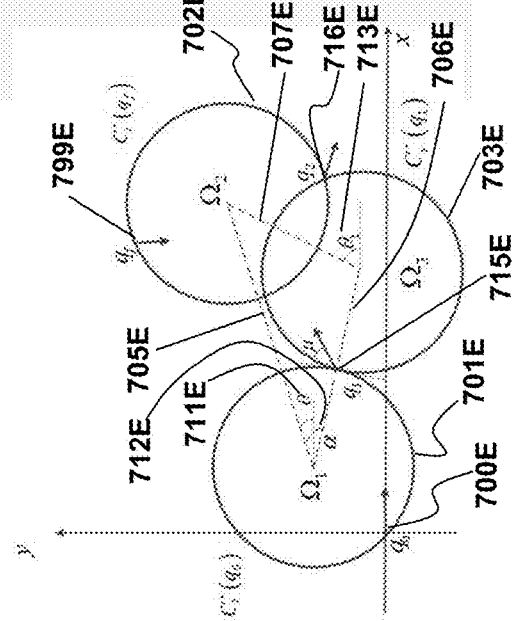

FIG. 7F

| | |
|---|---|
| Known | $\Omega_1, \Omega_2, R_\Omega, \mu, \delta_c$ |
| Existence condition | $2R_\Omega \leq L(\Omega_1\Omega_2) \leq 2R_\Omega \cos(\mu) + 4R_\Omega$ |
| Validation condition | $|\delta_1|, |\delta_2|, |\delta_3|, |\delta_4| \leq \pi + 2\delta_c$ |
| Geometric constraints | The line $\Omega_1\Omega_2$ is parallel to the line $\Omega_3\Omega_4$ |
| Cost formula | $\cos\alpha = \dfrac{L(\Omega_1\Omega_2) - 2R_\Omega \cos\mu}{4R_\Omega}$ <br> $\Omega_3 = \begin{pmatrix} x_{\Omega_1} + 2R_\Omega \cos(\theta - \alpha) \\ y_{\Omega_1} + 2R_\Omega \sin(\theta - \alpha) \end{pmatrix}$ <br> $\Omega_4 = \begin{pmatrix} x_{\Omega_3} + 2R_\Omega \cos\mu \cos\theta \\ y_{\Omega_3} + 2R_\Omega \cos\mu \sin\theta \end{pmatrix}$ <br> $\delta_1 = \theta - \alpha - \mu + \pi/2$ <br> $\delta_2 = \alpha + \mu - \pi$ <br> $\delta_3 = \alpha + \mu - \pi$ <br> $\delta_4 = \theta_f - \theta_1 - \mu + \pi/2$ <br> $J = arclen(\delta_1, \delta_2, \delta_3, \delta_4)$ |

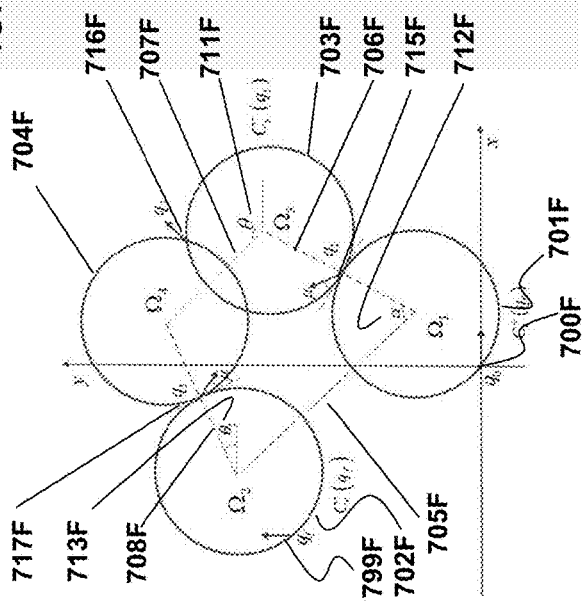

FIG. 7G

| Known | $\Omega_1, \Omega_2, R_\Omega, \mu, \delta_c$ |
|---|---|
| Existence condition | $\|2R_\Omega - 4R_\Omega \cos\mu\| \leq L(\Omega_1\Omega_2)$ <br> $\leq 4R_\Omega \cos\mu + 2R_\Omega$ |
| Validation condition | $\|\delta_1\|, \|\delta_2\|, \|\delta_3\|, \|\delta_4\| \leq \pi + 2\delta_c$ |
| Geometric constraints | The line $\Omega_1\Omega_3$ is parallel to the line $\Omega_2\Omega_4$ |
| Cost formula | $\cos\alpha = \dfrac{\frac{1}{4}L^2(\Omega_1\Omega_2) + (2R_\Omega \cos\mu)^2 - R_\Omega^2}{2L(\Omega_1\Omega_2)R_\Omega \cos\mu}$ <br> $\Omega_3 = \begin{pmatrix} x_{\Omega_1} + 2R_\Omega \cos\mu \cos(\theta + \alpha) \\ y_{\Omega_1} + 2R_\Omega \cos\mu \sin(\theta + \alpha) \end{pmatrix}$ <br> $\Omega_4 = \Omega_1 + \Omega_2 - \Omega_3$ <br> $\delta_1 = \theta + \alpha + \pi/2$ <br> $\delta_2 = \theta_1 - \theta - \alpha - \mu$ <br> $\delta_3 = -\delta_2$ <br> $\delta_4 = \theta_f - \theta - \alpha - \pi/2$ <br> $J = arclen(\delta_1, \delta_2, \delta_3, \delta_4)$ |

710G

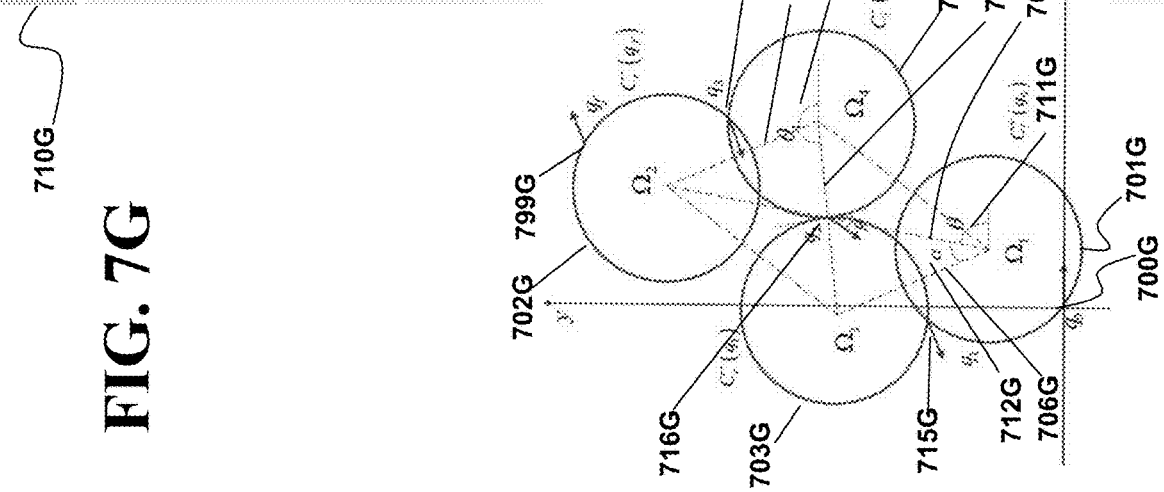

FIG. 7H

| Known | $\Omega_1, \Omega_2, R_\Omega, \mu, \delta_c$ |
|---|---|
| Existence condition | $2R_\Omega(\cos\mu + \sin\mu) \leq L(\Omega_1\Omega_2)$ |
| Validation condition | $|\delta_1|, |\delta_2|, |\delta_3| \leq \pi + 2\delta_c$ |
| Geometric constraints | Centers $\Omega_1, \Omega_2, \Omega_3$ stay in a same straight line |
| Cost formula | $\Omega_3 = \begin{pmatrix} x_{\Omega_1} + 2R_\Omega \cos\mu \cos\theta \\ y_{\Omega_1} + 2R_\Omega \cos\mu \sin\theta \end{pmatrix}$ <br> $\delta_1 = \theta + \pi/2$ <br> $\delta_2 = \pi/2$ <br> $L(q_2q_3) = L(\Omega_1\Omega_2) - 2R_\Omega \cos\mu - 2R_\Omega \sin\mu$ <br> $\delta_3 = \theta_f - \theta - \pi$ <br> $J = arclen(\delta_1, \delta_2, \delta_3) + L(q_2q_3)$ |

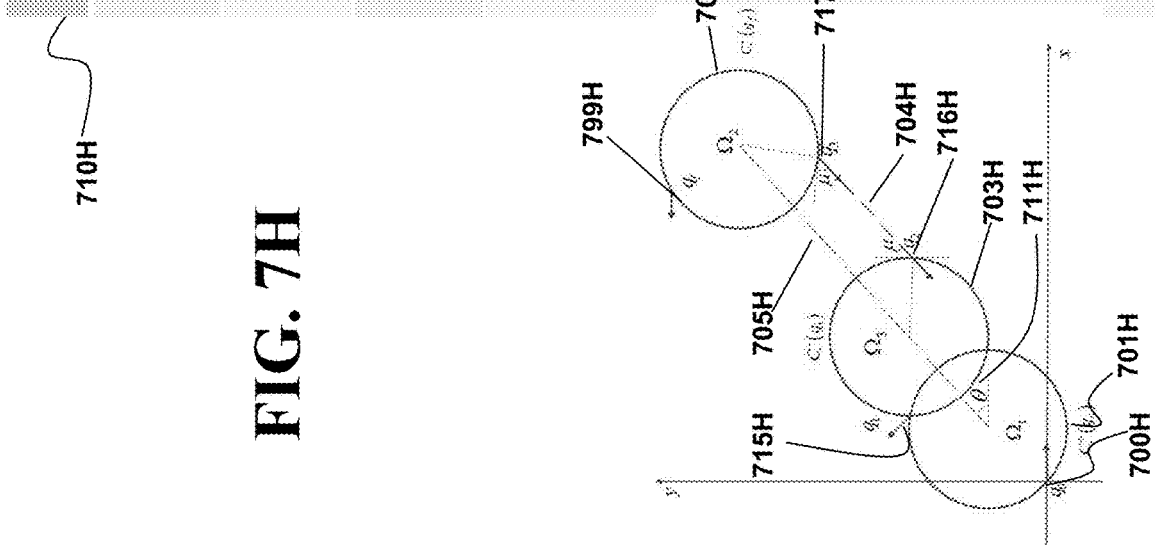

FIG. 7I

| Known | $\Omega_1, \Omega_2, R_\Omega, \mu, \delta_c$ |
|---|---|
| Existence condition | $2R_\Omega \cos\mu \le L(\Omega_1\Omega_2)$<br>$2R_\Omega(\cos\mu + \sin\mu) \le L(\Omega_1\Omega_2)\cos\alpha$ |
| Validation condition | $|\delta_1|, |\delta_2|, |\delta_3| \le \pi + 2\delta_c$ |
| Geometric constraints | NA |
| Cost formula | $\sin\alpha = \dfrac{2R_\Omega \cos\mu}{L(\Omega_1\Omega_2)}$<br>$\delta_1 = \theta + \alpha + \pi/2$<br>$\delta_2 = \pi/2$<br>$L(q_2 q_3) = L(\Omega_1\Omega_2) - 2R_\Omega \cos\mu - 2R_\Omega \sin\mu$<br>$\delta_3 = \theta_f - \theta - \pi$<br>$J = arclen(\delta_1, \delta_2, \delta_3) + L(q_2 q_3)$ |

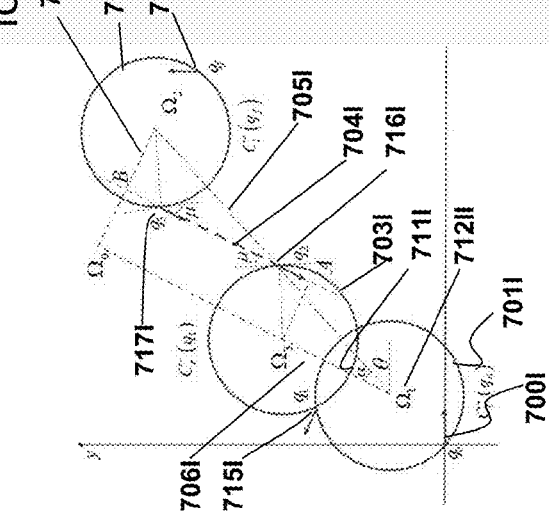

FIG. 7J

| Known | $\Omega_1, \Omega_2, R_\Omega, \mu, \delta_c$ |
|---|---|
| Existence condition | $2R_\Omega \cos\mu \leq L(\Omega_1\Omega_2)$ <br> $4R_\Omega \cos\mu + 2R_\Omega \sin\mu \leq L(\Omega_1\Omega_2)\cos\alpha$ |
| Validation condition | $|\delta_1|, |\delta_2|, |\delta_3| \leq \pi + 2\delta_c$ |
| Geometric constraints | Lines $\Omega_1\Omega_3$ and $\Omega_4\Omega_2$ are in parallel |
| Cost formula | $\sin\alpha = \dfrac{2R_\Omega \cos\mu}{L(\Omega_1\Omega_2)}$ <br> $\delta_1 = \theta + \alpha + \pi/2$ <br> $\delta_2 = \pi/2$ <br> $L(q_2q_3) = L(\Omega_1\Omega_2)\cos\alpha$ <br> $\quad - R_\Omega(4\cos\mu + 2\sin\mu)$ <br> $\delta_3 = -\pi/2$ <br> $\delta_4 = \theta_f - \theta - \alpha - \pi/2$ <br> $J = arclen(\delta_1, \delta_2, \delta_3, \delta_4) + L(q_2q_3)$ |

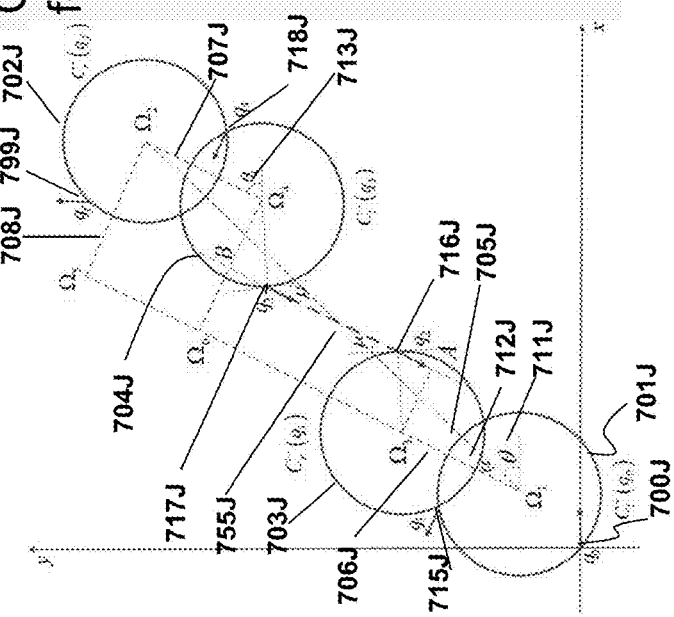

| | |
|---|---|
| Known | $\Omega_1, \Omega_2, R_\Omega, \mu, \delta_c$ |
| Existence condition | $0 \leq 2R_\Omega \sin\mu \leq L(\Omega_1\Omega_2)$<br>$\theta \leq \theta_f$ |
| Validation condition | $|\delta_1|, |\delta_2| \leq \pi + 2\delta_c$ |
| Geometric constraints | N/A |
| Path | $\delta_1 = \theta$<br>$L(q_1q_2) = L(\Omega_1\Omega_2) - 2R_\Omega \sin\mu$<br>$\delta_2 = \theta_f - \theta$<br>$Path = LFCT(q_s, \delta_1)$<br>$\bigcup Line(q_1, L(q_1, q_2))$<br>$\bigcup LFCT(q_2, \delta_2)$ |

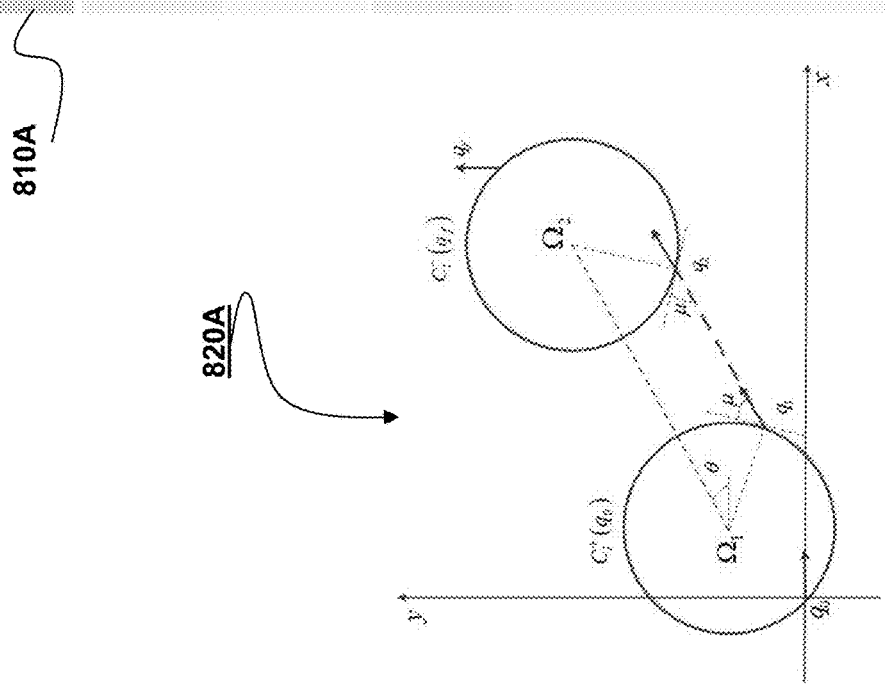

FIG. 8A

| Known | $\Omega_1, \Omega_2, R_\Omega, \mu, \delta_c$ |
|---|---|
| Existence condition | $0 \leq L(\Omega_1\Omega_2) \leq 4R_\Omega \cos\mu$ |
| Validation condition | $|\delta_1|, |\delta_2|, |\delta_3| \leq \pi + 2\delta_c$ |
| Geometric constraints | N/A |
| Cost formula | $\cos\alpha = \dfrac{L(\Omega_1\Omega_2)}{4R_\Omega \cos\mu}$ $\Omega_3 = \begin{pmatrix} x_{\Omega_1} + 2R_\Omega \cos\mu\cos(\theta+\alpha) \\ y_{\Omega_1} + 2R_\Omega \cos\mu\sin(\theta+\alpha) \end{pmatrix}$ $\delta_1 = \theta + \pi/2 + \alpha$ $\delta_2 = \theta_1 - \alpha - \pi - \theta$ $\delta_3 = \theta_f - \theta_1 + \pi/2$ $Path = LFCT(q_s, \delta_1) \cup RBCT(q_1, \delta_2) \cup LFCT(q_2, \delta_3)$ |

| Known | $\Omega_1, \Omega_2, R_\Omega, \mu, \delta_c$ |
|---|---|
| Existence condition | $0 \le L(\Omega_1\Omega_2) \le 4R_\Omega \cos\mu$ |
| Validation condition | $|\delta_1|, |\delta_2|, |\delta_3| \le \pi + 2\delta_c$ |
| Geometric constraints | N/A |
| Cost formula | $\cos\alpha = \dfrac{L^2(\Omega_1\Omega_2) - (2R_\Omega \sin\mu)^2}{4L(\Omega_1\Omega_2)R_\Omega \cos\mu}$ <br> $\Omega_3 = \begin{pmatrix} x_{\Omega_1} + 2R_\Omega \cos\mu \cos(\theta+\alpha) \\ y_{\Omega_1} + 2R_\Omega \cos\mu \sin(\theta+\alpha) \end{pmatrix}$ <br> $\delta_1 = \theta + \pi/2 + \alpha$ <br> $\delta_2 = \theta_1 - \alpha - \pi - \theta - \mu$ <br> $\delta_3 = \theta_f - \theta_1 + \pi/2 + \mu$ <br> $Path = LFCT(q_s, \delta_1) \bigcup RBCT(q_1, \delta_2) \bigcup LBCT(q_2, \delta_3)$ |

810D

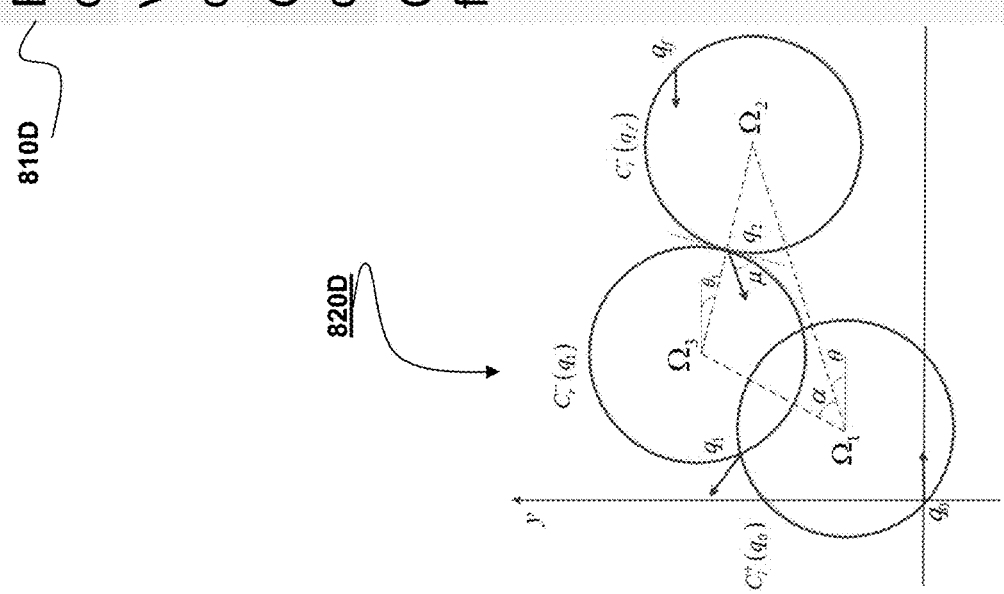

| | |
|---|---|
| Known | $\Omega_1, \Omega_2, R_\Omega, \mu, \delta_c$ |
| Existence condition | $0 \leq L(\Omega_1\Omega_2) \leq 4R_\Omega \cos\mu$ |
| Validation condition | $|\delta_1|, |\delta_2|, |\delta_3| \leq \pi + 2\delta_c$ |
| Geometric constraints | N/A |
| Cost formula | $\cos\alpha = \dfrac{L^2(\Omega_1\Omega_2) + (2R_\Omega \sin\mu)^2}{4L(\Omega_1\Omega_2)R_\Omega \cos\mu}$ $\Omega_3 = \begin{pmatrix} x_{\Omega_1} + 2R_\Omega \cos\mu \cos(\theta - \alpha) \\ y_{\Omega_1} + 2R_\Omega \cos\mu \sin(\theta - \alpha) \end{pmatrix}$ $\delta_1 = \theta + \pi/2 - \alpha - \mu$ $\delta_2 = \theta_1 + \alpha - \pi - \theta - \mu$ $\delta_3 = \theta_f - \theta_1 + \pi/2$ $Path = LFCT(q_s, \delta_1) \cup RFCT(q_1, \delta_2) \cup LBCT(q_2, \delta_3)$ |

810E

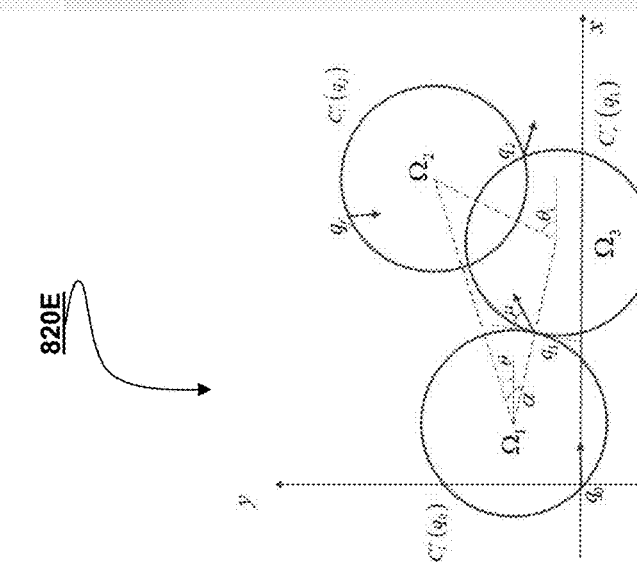

| | |
|---|---|
| Known | $\Omega_1, \Omega_2, R_\Omega, \mu, \delta_c$ |
| Existence condition | $2R_\Omega \leq L(\Omega_1\Omega_2) \leq 2R_\Omega \cos(\mu) + 4R_\Omega$ |
| Validation condition | $|\delta_1|, |\delta_2|, |\delta_3|, |\delta_4| \leq \pi + 2\delta_c$ |
| Geometric constraints | The line $\Omega_1\Omega_2$ is parallel to the line $\Omega_3\Omega_4$ |
| Cost formula | $\cos\alpha = \dfrac{L(\Omega_1\Omega_2) - 2R_\Omega \cos\mu}{4R_\Omega}$<br>$\Omega_3 = \begin{pmatrix} x_{\Omega_1} + 2R_\Omega \cos(\theta-\alpha) \\ y_{\Omega_1} + 2R_\Omega \sin(\theta-\alpha) \end{pmatrix}$<br>$\Omega_4 = \begin{pmatrix} x_{\Omega_3} + 2R_\Omega \cos\mu \cos\theta \\ y_{\Omega_3} + 2R_\Omega \cos\mu \sin\theta \end{pmatrix}$<br>$\delta_1 = \theta - \alpha - \mu + \pi/2$<br>$\delta_2 = \alpha + \mu - \pi$<br>$\delta_3 = \alpha + \mu - \pi$<br>$\delta_4 = \theta_f - \theta_1 - \mu + \pi/2$<br>$Path = LFCT(q_s, \delta_1) \bigcup RFCT(q_1, \delta_2)$<br>$\bigcup LBCT(q_2, \delta_3) \bigcup RBCT(q_3, \delta_4)$ |

810F

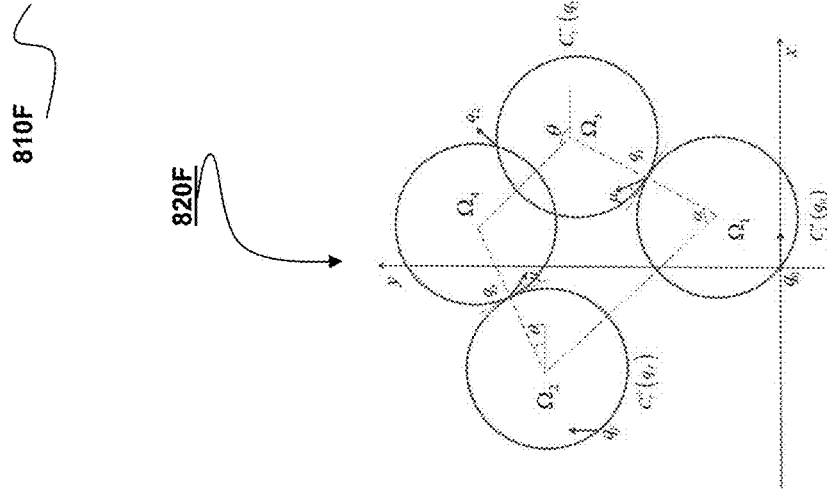

| | |
|---|---|
| Known | $\Omega_1, \Omega_2, R_\Omega, \mu, \delta_c$ |
| Existence condition | $|2R_\Omega - 4R_\Omega \cos\mu| \leq L(\Omega_1\Omega_2)$ <br> $\leq 4R_\Omega \cos\mu + 2R_\Omega$ |
| Validation condition | $|\delta_1|, |\delta_2|, |\delta_3|, |\delta_4| \leq \pi + 2\delta_c$ |
| Geometric constraints | The line $\Omega_1\Omega_3$ is parallel to the line $\Omega_2\Omega_4$ |
| Cost formula | $\cos\alpha = \dfrac{\frac{1}{4}L^2(\Omega_1\Omega_2) + (2R_\Omega \cos\mu)^2 - R_\Omega^2}{2L(\Omega_1\Omega_2)R_\Omega \cos\mu}$ <br> $\Omega_3 = \begin{pmatrix} x_{\Omega_1} + 2R_\Omega \cos\mu \cos(\theta + \alpha) \\ y_{\Omega_1} + 2R_\Omega \cos\mu \sin(\theta + \alpha) \end{pmatrix}$ <br> $\Omega_4 = \Omega_1 + \Omega_2 - \Omega_3$ <br> $\delta_1 = \theta + \alpha + \pi/2$ <br> $\delta_2 = \theta_1 - \theta - \alpha - \mu$ <br> $\delta_3 = -\delta_2$ <br> $\delta_4 = \theta_f - \theta - \alpha - \pi/2$ <br> $Path = LFCT(q_s, \delta_1) \bigcup RBCT(q_1, \delta_2)$ <br> $\bigcup LBCT(q_2, \delta_3) \bigcup RFCT(q_3, \delta_4)$ |

810G

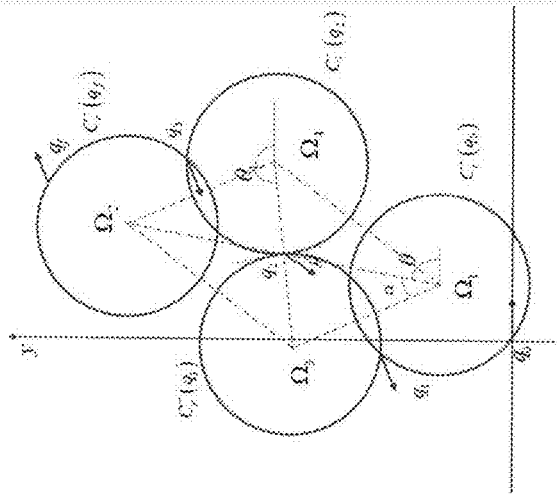

820G

| | |
|---|---|
| Known | $\Omega_1, \Omega_2, R_\Omega, \mu, \delta_c$ |
| Existence condition | $2R_\Omega(\cos\mu + \sin\mu) \leq L(\Omega_1\Omega_2)$ |
| Validation condition | $|\delta_1|, |\delta_2|, |\delta_3| \leq \pi + 2\delta_c$ |
| Geometric constraints | Centers $\Omega_1, \Omega_2, \Omega_3$ stay in a same straight line |
| Cost formula | $\Omega_3 = \begin{pmatrix} x_{\Omega_1} + 2R_\Omega \cos\mu \cos\theta \\ y_{\Omega_1} + 2R_\Omega \cos\mu \sin\theta \end{pmatrix}$ <br> $\delta_1 = \theta + \pi/2$ <br> $\delta_2 = \pi/2$ <br> $L(q_2 q_3) = L(\Omega_1 \Omega_2) - 2R_\Omega \cos\mu - 2R_\Omega \sin\mu$ <br> $\delta_3 = \theta_f - \theta - \pi$ <br> $Path = LFCT(q_s, \delta_1) \bigcup RBCT(q_1, \delta_2)$ <br> $\bigcup Line(q_2, L(q_2, q_3))$ <br> $\bigcup RBCT(q_3, \delta_4)$ |

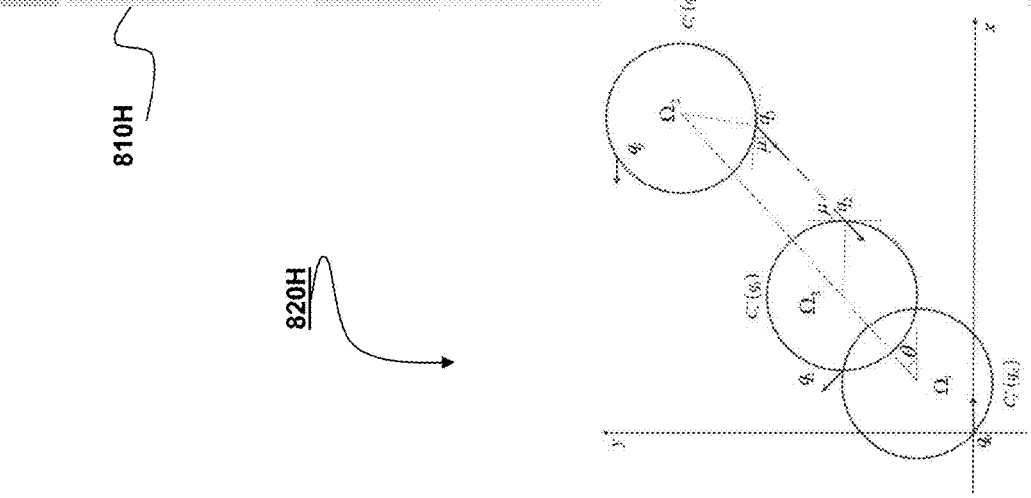

FIG. 8H

| Known | $\Omega_1, \Omega_2, R_\Omega, \mu, \delta_c$ |
|---|---|
| Existence condition | $2R_\Omega \cos\mu \leq L(\Omega_1\Omega_2)$ $2R_\Omega(\cos\mu + \sin\mu) \leq L(\Omega_1\Omega_2)\cos\alpha$ |
| Validation condition | $|\delta_1|, |\delta_2|, |\delta_3| \leq \pi + 2\delta_c$ |
| Geometric constraints | NA |
| Cost formula | $\sin\alpha = \dfrac{2R_\Omega \cos\mu}{L(\Omega_1\Omega_2)}$ $\delta_1 = \theta + \alpha + \pi/2$ $\delta_2 = \pi/2$ $L(q_2q_3) = L(\Omega_1\Omega_2) - 2R_\Omega \cos\mu$ $\quad\quad - 2R_\Omega \sin\mu$ $\delta_3 = \theta_f - \theta - \pi$ $Path = LFCT(q_s, \delta_1) \bigcup RBCT(q_1, \delta_2)$ $\quad\quad \bigcup Line(q_2, L(q_2, q_3))$ $\quad\quad \bigcup LBCT(q_3, \delta_4)$ |

8101

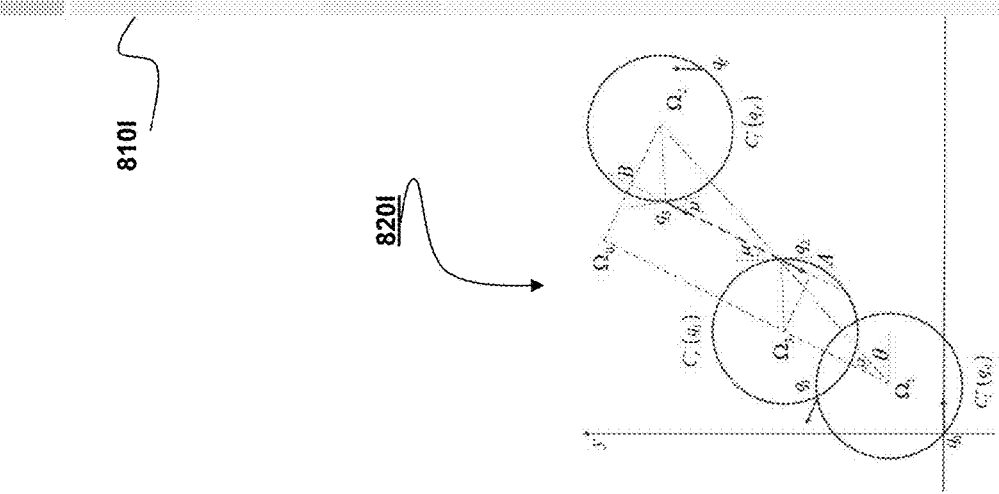

| Known | $\Omega_1, \Omega_2, R_\Omega, \mu, \delta_c$ |
|---|---|
| Existence condition | $2R_\Omega \cos\mu \leq L(\Omega_1\Omega_2)$ |
| Validation condition | $4R_\Omega \cos\mu + 2R_\Omega \sin\mu \leq L(\Omega_1\Omega_2) \cos\alpha$ |
|  | $|\delta_1|, |\delta_2|, |\delta_3| \leq \pi + 2\delta_c$ |
| Geometric constraints | Lines $\Omega_1\Omega_3$ and $\Omega_4\Omega_2$ are in parallel |
| Cost formula | $\sin\alpha = \dfrac{2R_\Omega \cos\mu}{L(\Omega_1\Omega_2)}$ |
|  | $\delta_1 = \theta + \alpha + \pi/2$ |
|  | $\delta_2 = \pi/2$ |
|  | $L(q_2q_3) = L(\Omega_1\Omega_2)\cos\alpha - R_\Omega(4\cos\mu + 2\sin\mu)$ |
|  | $\delta_3 = -\pi/2$ |
|  | $\delta_4 = \theta_f - \theta - \alpha - \pi/2$ |
|  | $Path = LFCT(q_e, \delta_1) \cup RBCT(q_1, \delta_2)$ $\cup Line(q_2, L(q_2, q_3)) \cup RFCT(q_4, \delta_4)$ $\cup LBCT(q_3, \delta_4)$ |

820J

VEHICLE MOTION CONTROL SYSTEM AND METHOD

TECHNICAL FIELD

This invention relates generally to path planning of motion of the vehicles, and more particularly to path planning systems and methods for automatically controlling a motion of a vehicle between different states.

BACKGROUND

Several control systems employed by vehicles, either autonomous vehicles or vehicles executing in autonomous-driving mode, predict future, safe motions, or paths, of the vehicle, both in order to avoid obstacles, such as other vehicles or pedestrians, but also to optimize some criteria associated to the operation of the vehicle. The vehicle is controlled along the path that is a part of the object trajectory or, more precisely, the projection of the trajectory onto the two-dimensional plane of movement. To say it more figuratively, the path is the line connecting all geometrical coordinates of the moving vehicle.

A fundamental objective of path planning is to construct a trajectory connecting two states, e.g., an initial state and a target state, of a moving object, such as autonomous or semi-autonomous vehicles executing in autonomous-driving mode, and to control the motion of the vehicles along the trajectory. A "state" as used herein is meant to be a vector including the geometrical coordinates of the vehicle in the plane and an orientation of the vehicle at these geometrical coordinates. The target state can either be a fixed location, a moving location, a velocity vector, a region, or a combination thereof. The surroundings, such as road edges, pedestrians, and other vehicles, are sensed by the sensors of the vehicle and/or are at least partially known by a priori given information.

A path connecting an initial state and a target state is normally made up of several elementary paths (or EPT for short). In some situations, the path planning solely works with elementary paths of the same or different kinds. To that end, the path of a moving body is normally made up of a plurality of elementary paths that share the same junction points (abbreviated as JP). Thus, the junction points are special points of the path because each of them belongs to two adjoining elementary paths (EPT).

One special characteristic demanded of the paths is that states do not change erratically along the entire course or at the junction points. This is to say that the transition from one elementary path to an adjacent elementary path must be ensured to be continuous at the junction points of the elementary paths as well as both its first derivative (tangent) and its second derivative (curvature). The path is continuous at junction points when the transition from one elementary path to the adjacent elementary path can be performed by changing a steering and velocity of the vehicle in a linear or continuous manner.

For example, pioneering work by Dubins and Reeds and Shepp investigated patterns of a shortest path between two states of the vehicle. The shortest path, termed as Reeds-Shepp's (RS) path, is a sequential composition of line segments and/or tangential circular arcs of a minimum turning radius. The RS path can be computed in a very efficient way, but the curvature along the RS path involving multiple segments is discontinuous. Such discontinuity of the curvature is undesirable in practice, since a vehicle has to stop and perform stationary steering, leading to unnecessary time delay and extra wearing of tires.

Some methods overcome discontinuity of the RS paths by introducing other segments, in addition to the line and circular segments. For example, the path planning can combine various types of elementary paths such as splines, polynomials, trigonometric functions or clothoids. The aforementioned elementary paths are mainly distinguished by their mathematical description. A feature that all elementary paths have in common is that they can be combined with straight and/or circular lines to form a continuous curvature path.

Some conventional methods prefer to base its path planning on clothoids because they are closely related to the rules of movement of steered motor vehicles. A clothoid is a special type of plane curves, which has its curvature, denoted by c, changing in a linear manner along the path. Clothoids have the added benefit of the length of the path being minimized when an initial state is connected with a terminal state.

For example, the teaching of T. Fraichard and A. Scheuer, "From Reeds and Shepp's to continuous curvature paths," introduces a concept of a clothoid turn (abbreviated as CC turn) formed by two clothoids connected by a circular arc, and teaches $\mu$-tangency conditions to ensure continuous curvature transitions among CC turns and straight lines. However, a continuous path typically includes a sequence of multiple CC turns and lines, and it can be time consuming to find the parameters of the optimal sequence forming the continuous path.

For example, method described in U.S. 2016/0313735 first determines an RS path and tries to find a continuous curvature path which stays as close as possible to the RS path. This method computes the continuous curvature path by solving optimization problems with nonlinear constraints. However, the solution to this method requires iterative process, which can be computationally prohibitive for a number of practical applications. Also, the resultant optimization problem of that method is non-convex. A feasible solution to the non-convex problem is not guaranteed solved by the iterative process, and thus the construction of the continuous curvature path may fail. Hence, this method may not be suitable for a real-time control of the vehicles.

Similarly, the method described in U.S. Pat. No. 8,428,820 improves the computation efficiency, but still entails computationally expensive iterative process to construct the continuous curvature path. Hence, this method also may not be suitable for a real time control of the vehicles.

Accordingly, there is a need to construct a continuous curvature path for controlling a motion of a vehicle from an initial to a target state in a manner suitable for real-time control of the vehicles.

SUMMARY

It is an object of some embodiments to provide a path planning system and method to construct a continuous curvature path connecting an initial state to a target state of a vehicle. It is another object of some embodiments to provide such a system and a method that are suitable for real-time control of the vehicles. As used herein, the continuous curvature path is as a sequential composition of multiple elementary paths connected such that the transition from one elementary path to an adjacent elementary path is continuous at the junction points of the elementary paths as well as both its first derivative and second derivatives.

Examples of an elementary path include straight line, circular arc, splines, polynomials, trigonometric functions, clothoids, and clothoid turns.

A continuous curvature path connecting an initial and a target state of a vehicle can be formed by different sequences of the elementary paths. The sequential composition of types of elementary paths is referred herein as a pattern of elementary paths or just as a pattern. For example, a line, a spline, and a polynomial form a pattern that includes three specific types of the elementary paths arranged in a specific order. Geometrical parameters, such as dimensions of each elementary path and the mutual arrangement of the elementary paths within a pattern can vary.

Each pattern used by various embodiments represents a continuous curvature path. As used herein, a pattern represents a continuous curvature path if for some initial and target states, there exist geometrical parameters for the types of the elementary paths forming the pattern that result in the continuous curvature path connecting the initial and target states. For example, a straight line and the circular arc cannot form a continuous curvature path, and thus those types cannot be adjacent in a pattern. On the other hand, a clothoid turn and a straight line can form a continuous curvature path if μ-tangency conditions are satisfied, and thus the combinations of the clothoid turn and the straight line can form a pattern.

Some embodiments are based on recognition that a single continuous curvature path can be formed by different patterns of elementary paths. Moreover, for a single pattern, there can be different combinations of geometrical parameters of its elementary paths that can form the required continuous curvature path. Accordingly, the system defining the continuous curvature path is underdetermined. The solution of the underdetermined systems usually entails computationally expensive iterative process and can be undesirable.

Some embodiments are based on a realization that geometrical constraints imposed on a mutual arrangement of elementary paths within a pattern can turn the underdetermined system into a determined one. The determined system has at most one independent solution that can be found analytically. Thus, for the determined systems, the computationally expensive iterative solutions can be avoided to improve the performance of the processor and memory usage of the path planning.

Some embodiments are based on another realization that such an additional geometrical constraint can be determined for an individual pattern off-line. This realization allows to replace a real-time, i.e., online, determination of the optimal sequence of the elementary paths with the off-line determination of the optimal geometrical constraints. The optimal geometrical constraints can vary for different patterns and can be determined such that the analytical solution for the continuous curvature path that satisfies those geometrical constraints is at least close to the solution that would result from the iterative optimization.

For example, some additional geometrical constraints for different patterns are determined from exploitation of symmetry of patterns, analysis of μ-tangency conditions, and comparison of lengths of feasible paths in a specific pattern. For example, one embodiment uses symmetry to derive additional geometric constraints for a driving pattern $CC_u|C_uC$. Additionally or alternatively, geometric analysis is exploited to derive additional insights to determine continuous curvature paths analytically in driving patterns:

$$C|C_uC_u|C, \ C|C_{\frac{\pi}{2}}SC-1 \text{ and } C|C_{\frac{\pi}{2}}SC_{\frac{\pi}{2}}|C.$$

To that end, some embodiments predetermined a set of analytical functions corresponding to a set of patterns of elementary paths. In response to receiving values of the initial and target states during the online path planning, the embodiments selects an analytical function corresponding to a minimum cost of the continuous curvature path connecting the initial and target states and determines analytically the parameters of that continuous curvature path using the selected analytical function. In such a manner, the undesirable optimization procedure is avoided.

For example, in one embodiment, a memory of a path planning systems stores a pair of functions including an analytical function and a cost function determined for different patterns. In response to receiving values of the initial and target states, the embodiment determines the cost of each pattern using their corresponding cost function, selects the analytical function corresponding to a pattern with minimum cost, and invokes the selected analytical function to produce the continuous curvature path. For example, the continuous curvature path can be represented by a sequence of coordinates of the points connecting the initial to the target states, a sequence of control inputs resulting in the movement of the vehicle according to the continuous path, or both.

Some embodiments are based on recognition that a pattern may not be feasible for all possible combinations of the initial and target states. It is possible that a pattern may not represent a feasible continuous curvature path for the specific values of the initial and target states. In those situations, the analytical function determined for the pattern has no solution for the specific values of the initial and target states. For example, in one embodiment, when the analytical function of a pattern has no solution for the specific values of the initial and target states, the cost of the continuous path for that pattern is infinitely large.

Some embodiments are based on recognition that when the patterns are selected naively, there can be a situation that no pattern represents a feasible continuous curvature path for some values of the initial and target states and the path planning procedure may fail. To avoid this situation, some embodiments determine analytical functions for an exhaustive set of patterns. As used herein, a set of patterns is jointly or collectively exhaustive, if for any values of the initial and target states, there is at least one pattern that represents a feasible continuous path connecting the initial and target states without consideration of the obstacles.

For example, some embodiments are inspired by the possible patterns of Reeds-Shepp (RS) path, which is a sequential composition of line segments and tangential circular arcs of a minimum turning radius. The RS path is the shortest path that connects the initial and the target states and can have up to 48 driving patterns, further categorized as 12 classes. The RS path is a discontinuous curvature path. However, some embodiments are based on recognition that the discontinuous RS path can be transformed into a continuous curvature path by replacing the circular arcs with corresponding clothoid turns. In such a manner, a transformed continuous RS path closely resembles the structure of the RS path and thus the 48 patterns of the transformed RS paths form an exhaustive set of patterns. As used herein, each transformed RS path is formed by a sequential composition of elementary paths selected from a group including a clothoid turn and a straight line. In one embodiment, each transformed RS path includes a clothoid turn. In one embodiment, each transformed RS path includes an elementary path selected from a group consisting of a clothoid turn and a straight line.

Some embodiments are based on recognition that the adjacent elementary paths in the patterns of the transformed RS paths need to satisfy the μ-tangency condition to ensure continuous curvature transitions among CC turns and straight lines. The μ-tangency conditions is [can you define it please]. The μ-tangency condition is a geometrical constraint on mutual arrangement of the adjacent elementary paths. However, such a geometrical constraint fails to form a determined system for all patterns of the transformed RS path. To that end, some embodiments impose additional geometrical constraints on the transformed RS paths and determine the analytical functions having solutions satisfying both the μ-tangency condition and the additional geometrical constraint.

Accordingly, one embodiment discloses a system for controlling a motion of a vehicle. The system includes a memory to store a set of analytical functions corresponding to a set of patterns of elementary paths, where each pattern represents a continuous path and each analytical function is determined for a corresponding pattern to provide an analytical solution for input states of the vehicle defining a continuous path connecting the input states by a sequential compositions of the elementary paths following the corresponding pattern; a path planner to select from the memory, in response to receiving an initial state and a target state of the vehicle, an analytical function corresponding to a minimum cost of the continuous curvature path connecting the initial state with the target state and to analytically determine parameters of the continuous curvature path using the selected analytical function; and a controller to control the motion of the vehicle according to the parameters of the continuous curvature path.

Another embodiment discloses a method for controlling a motion of a vehicle, wherein the method uses a processor coupled to a memory storing a set of analytical functions and a set of cost functions corresponding to a set of patterns of elementary paths, each pattern represents a continuous path, each analytical function is determined for a corresponding pattern to provide an analytical solution for input states of the vehicle defining a continuous path connecting the input states by a sequential compositions of the elementary paths following the corresponding pattern, and each cost function is determined to provide a cost of the corresponding pattern indicative of a cost of the motion of the vehicle according to the continuous path connecting the input states and represented by the corresponding pattern, wherein the processor is coupled with stored instructions implementing the method, wherein the instructions, when executed by the processor carry out at least some steps of the method. The method includes receiving an initial state and a target state of the vehicle; determining the cost of each pattern indicative of the cost of the motion of the vehicle according to a continuous path represented by the corresponding pattern and connecting the initial state with the target state; selecting an analytical function of the pattern having the minimum cost; analytically determining parameters of the continuous path using the selected analytical function; and controlling the motion of the vehicle according to the parameters of the continuous path.

Yet another embodiment discloses a non-transitory computer readable storage medium embodied thereon a program executable by a processor for performing a method, wherein the memory stores a set of analytical functions and a set of cost functions corresponding to a set of patterns of elementary paths, each pattern represents a continuous path, each analytical function is determined for a corresponding pattern to provide an analytical solution for input states of the vehicle defining a continuous path connecting the input states by a sequential compositions of the elementary paths following the corresponding pattern, and each cost function is determined to provide a cost of the corresponding pattern indicative of a cost of the motion of the vehicle according to the continuous path connecting the input states and represented by the corresponding pattern. The method includes receiving an initial state and a target state of the vehicle; determining the cost of each pattern indicative of the cost of the motion of the vehicle according to a continuous path represented by the corresponding pattern and connecting the initial state with the target state; selecting an analytical function of the pattern having the minimum cost; analytically determining parameters of the continuous path using the selected analytical function; and controlling the motion of the vehicle according to the parameters of the continuous path.

BRIEF DESCRIPTION OF THE DRAWINGS

FIG. 1C shows a table that summarizes classes and driving patterns of shortest length paths used by some embodiments.

FIG. 4A shows a flow chart of a method for constructing the graph of collision-free transitions according to one embodiment.

FIG. 6 shows a table listing examples of various additional geometric constraints discovered or imposed to determine a continuous curvature path and its cost for certain driving patterns according to some embodiments.

FIG. 7A shows a schematic illustrating a cost function providing an analytical estimation of a cost for continuous curvature path following a pattern of class CSC-1 according to some embodiments.

FIG. 7B shows a schematic illustrating a cost function providing an analytical estimation of a cost for continuous curvature path following a pattern of class CSC-2 according to some embodiments.

FIG. 7C shows a schematic illustrating a cost function providing an analytical estimation of a cost for continuous curvature path following a pattern of class C|C|C according to some embodiments.

FIG. 7D shows a schematic illustrating a cost function providing an analytical estimation of a cost for continuous curvature path following a pattern of class C|CC according to some embodiments.

FIG. 7E shows a schematic illustrating a cost function providing an analytical estimation of a cost for continuous curvature path following a pattern of class CC|C according to some embodiments.

FIG. 7F shows a schematic illustrating a cost function providing an analytical estimation of a cost for continuous curvature path following a pattern of class $CC_u|C_uC$ according to some embodiments.

FIG. 7G shows a schematic illustrating a cost function providing an analytical estimation of a cost for continuous curvature path following a pattern of class $C|C_uC_u|C$ according to some embodiments.

FIG. 7H shows a schematic illustrating a cost function providing an analytical estimation of a cost for continuous curvature path following a pattern of class $$C | C_{\frac{\pi}{2}} SC - 1$$

according to some embodiments.

FIG. 7I shows a schematic illustrating a cost function providing an analytical estimation of a cost for continuous curvature path following a pattern of class $$C | C_{\frac{\pi}{2}} SC - 2$$

according to some embodiments.

FIG. 7J shows a schematic illustrating a cost function providing an analytical estimation of a cost for continuous curvature path following a pattern of class $$C | C_{\frac{\pi}{2}} SC_{\frac{\pi}{2}} | C$$

according to some embodiments.

FIG. 8A shows a schematic illustrating an analytical function providing an analytical solution for determining a continuous curvature path following a pattern of class CSC-1 according to some embodiments.

Figure 8B:
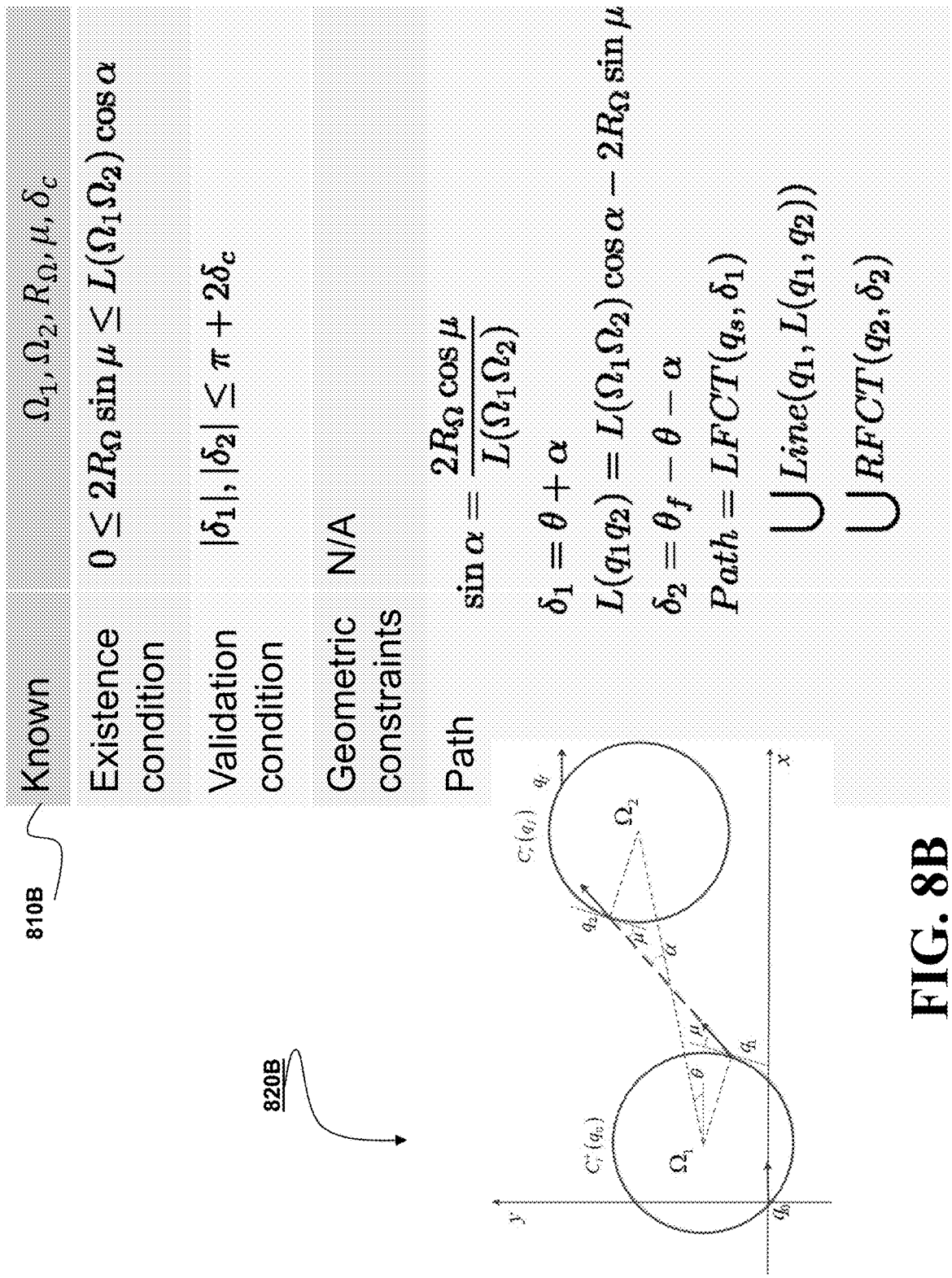

FIG. 8B shows a schematic illustrating an analytical function providing an analytical solution for determining a continuous curvature path following a pattern of class CSC-2 according to some embodiments.

FIG. 8C shows a schematic illustrating an analytical function providing an analytical solution for determining a continuous curvature path following a pattern of class C|C|C according to some embodiments.

FIG. 8D shows a schematic illustrating an analytical function providing an analytical solution for determining a continuous curvature path following a pattern of class C|CC according to some embodiments.

FIG. 8E shows a schematic illustrating an analytical function providing an analytical solution for determining a continuous curvature path following a pattern of class CC|C according to some embodiments.

FIG. 8F shows a schematic illustrating an analytical function providing an analytical solution for determining a continuous curvature path following a pattern of class $CC_u|C_uC$ according to some embodiments.

FIG. 8G shows a schematic illustrating an analytical function providing an analytical solution for determining a continuous curvature path following a pattern of class $C|C_u C_u|C$ according to some embodiments.

FIG. 8H shows a schematic illustrating an analytical function providing an analytical solution for determining a continuous curvature path following a pattern of class $$C | C_{\frac{\pi}{2}} SC - 1$$

according to some embodiments.

FIG. 8I shows a schematic illustrating an analytical function providing an analytical solution for determining a continuous curvature path following a pattern of class $$C | C_{\frac{\pi}{2}} SC - 2$$

according to some embodiments.

FIG. 8J shows a schematic illustrating an analytical function providing an analytical solution for determining a continuous curvature path following a pattern of class $$C | C_{\frac{\pi}{2}} SC_{\frac{\pi}{2}} | C$$

according to some embodiments.

Figure 9:
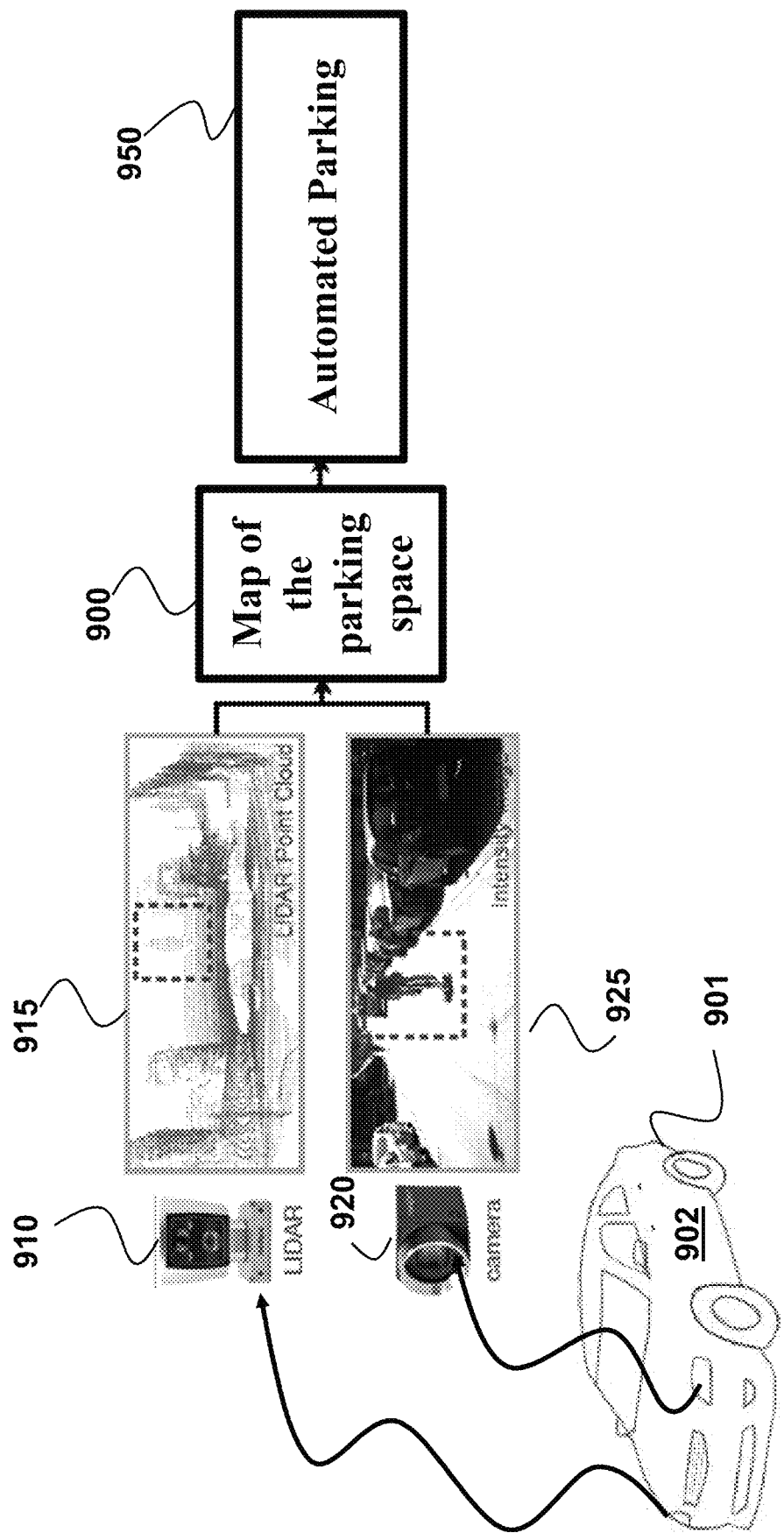

FIG. 9 shows a schematic of a system of a vehicle according to one embodiment.

Figure 10:
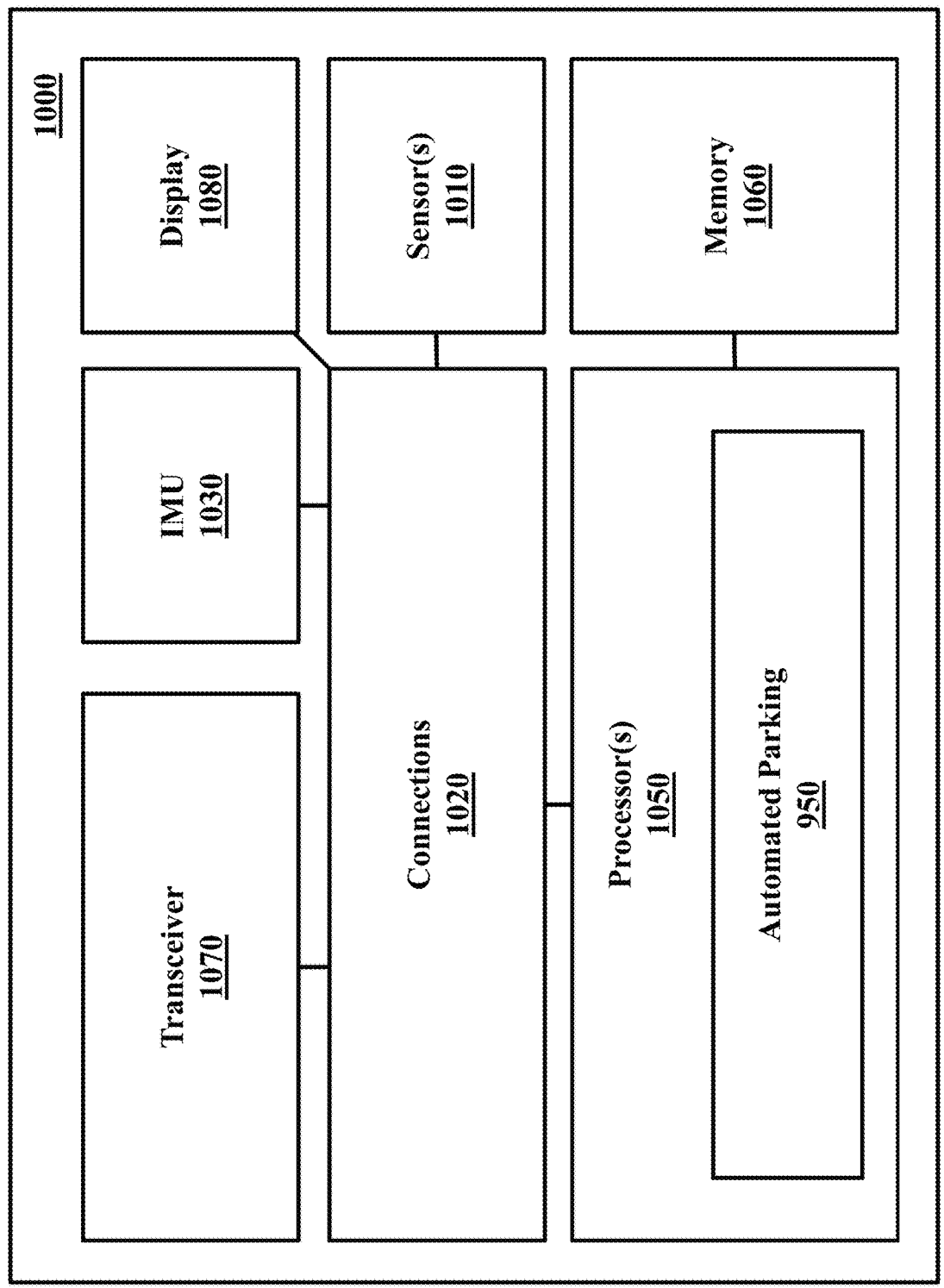

FIG. 10 shows a block diagram of an automated parking system 1000 according to some embodiments.

DETAILED DESCRIPTION

Figure 1A:
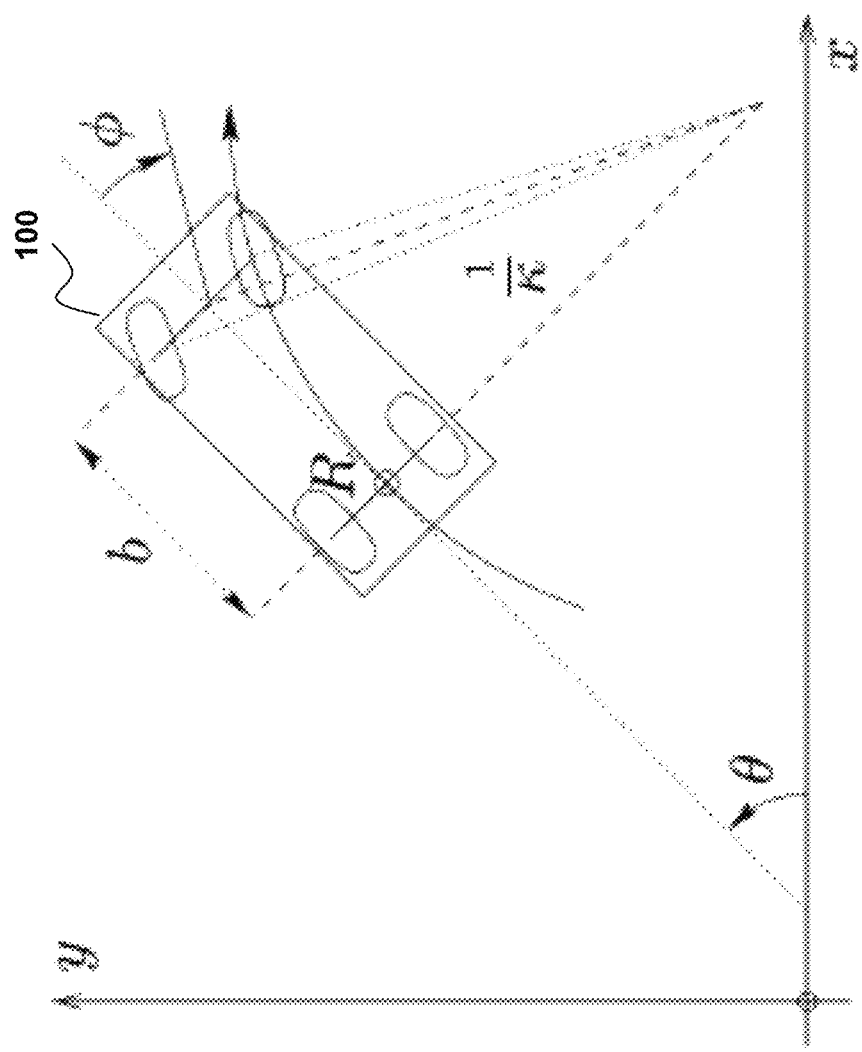
FIG. 1A shows a schematic of a vehicle equipped with a front-fixed steering wheel and fixed parallel rear wheels.

FIG. 1A shows a schematic of a vehicle 100 equipped with a front-fixed steering wheel and fixed parallel rear wheels. A point R is located at the mid of rear wheels of the vehicle. A pose of the vehicle is uniquely described by a triple (x, y, θ) where (x, y) represent the coordinates of R in an earth frame and θ is an orientation angle of the vehicle with respect to the positive x-axis of the earth frame. The vehicle has a wheelbase b, and a steering angle ϕ.

A kinematic model of the vehicle is given by $$\begin{pmatrix} \dot{x} \\ \dot{y} \\ \dot{\theta} \\ \dot{k} \end{pmatrix} = \begin{pmatrix} \cos\theta \\ \sin\theta \\ \kappa \\ 0 \end{pmatrix} v + \begin{pmatrix} 0 \\ 0 \\ 0 \\ 1 \end{pmatrix} \sigma, \quad (1)$$

where a curvature $\kappa$ is an extra configuration parameter in addition to $(x, y, \theta)$. Control inputs in the vehicle model (1) are $u=(v, \sigma)$, where $v$ is a driving velocity of the rear wheels and $\sigma$ a steering rate. The relationship between $\phi$, $\kappa$ and $\sigma$ is established as follows:

$$\kappa = \frac{\tan\phi}{b}, \sigma = \dot{\kappa} = \frac{\dot{\phi}}{b\cos^2\phi}.$$

Assume that both forward and backward motions are allowed for the vehicle and the driving velocity is bounded, whereas the angle of the steering wheel is subject to mechanical constraints, i.e., $$|v| \leq v_{max}, |\phi| \leq \phi_{max}, |\kappa| \leq \kappa_{max} = \frac{\tan\phi_{max}}{b}. \quad (2)$$

The steering rate $\sigma$ is also assumed to be bounded, i.e., $$|\sigma| \leq \sigma_{max}. \quad (3)$$

According to some embodiments, a configuration or state of the vehicle is defined by $q=(x, y, \theta, \kappa)$.

Figure 1B:
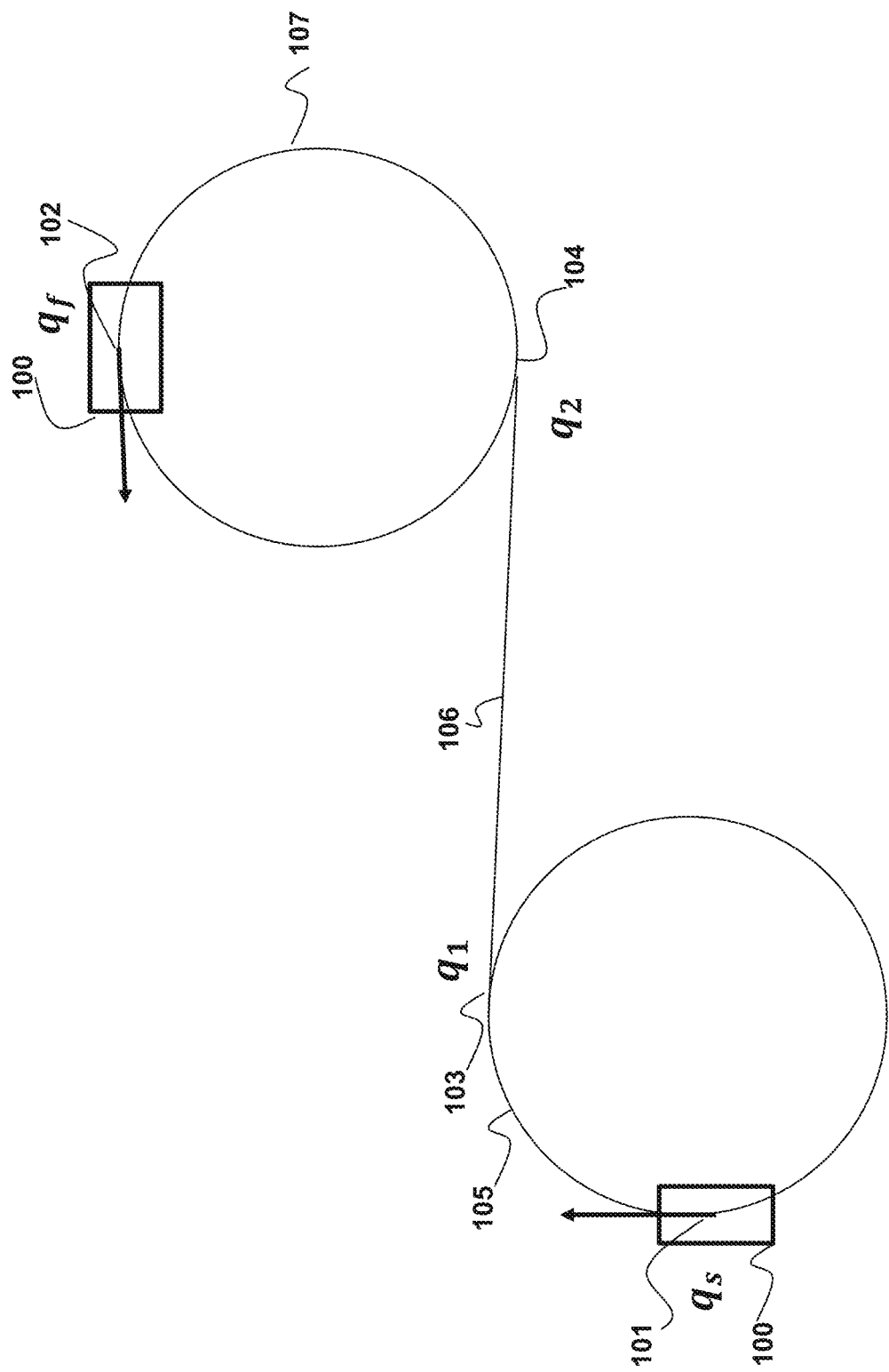
FIG. 1B shows a schematic illustrating continuous curvature path planning (CCPP) problem considered by some embodiments.

FIG. 1B shows a schematic illustrating continuous curvature path planning (CCPP) problem considered by some embodiments. Specifically, several embodiments determine parameters of the continuous curvature path of the vehicle. More formally, this problem can be formulated as: given an initial configuration 101 $q_s=(x_s, y_s, \theta_s, \kappa_s)$, a final configuration 102 $q_f=(x_f, y_f, \theta_f, \kappa_f)$ and the vehicle model (1) with constraints (2) (3), find a feasible path $P_{cc}$ between $q_s$ and $q_f$ such that for a finite time $T_f$,
1. Boundary conditions $P_{cc}(0)=q_s$, $\dot{P}_{cc}(0)=q_s$ and $P_{cc}(T_f)=q_f$;
2. Feasibility $\forall t \in [0, T_f], P_{cc}(t) \in R^2 \times S^1 \times [-\kappa_{max}, \kappa_{max}]$.
3. Non-chattering.

Note that any path satisfies (1) and the boundary conditions has continuous curvature $\kappa$ along the path, and thus is a continuous curvature path.

FIG. 1C shows a table 199 that summarizes classes and driving patterns of shortest length paths, which are also termed as RS paths. In the context of RS paths, C in FIG. 1C stands for a circular arc and S stands for a straight line segment; while L and R specify left and right turns with + or − denoting forward or backward motion, respectively. Subscripts denote (absolute) angular values of certain circular arc and | represents a change of moving direction. FIG. 1B also shows one example RS path in a driving pattern R+S+R+ of class CSC-1 connecting 101 and 102. The example RS path consists of three segments: a circular arc 105, a line 106 and a circular arc 107. The RS path is undesirable according to certain criteria because its curvature is discontinuous at points 101, 103, 104, and 102, which incur stationary steering, time delay, and extra tire wearing.

Some embodiments are based on recognition that CCPP can be fulfilled by combining clothoid turns (CTs or CC Turns) and line segments in the similar manner as the RS path. In one embodiment, a clothoid is a curve whose curvature $\kappa$ varies linearly with respect to its arc length $s$, i.e., $\kappa(s)=\sigma_{max}s$, where $\sigma_{max}$ is the sharpness of the clothoid.

In one embodiment, configurations of a clothoid, defined over $0 \leq s \leq \kappa_{max}/\sigma_{max}$, can be determined by integrating system (1) along the clothoid arc $$q(s) = \begin{pmatrix} x(s) \\ y(s) \\ \theta(s) \\ \kappa(s) \end{pmatrix} = \begin{pmatrix} \sqrt{\pi/\sigma_{max}} C_f\left(\frac{s}{\sqrt{\pi/\sigma_{max}}}\right) \\ \sqrt{\pi/\sigma_{max}} S_f\left(\frac{s}{\sqrt{\pi/\sigma_{max}}}\right) \\ \frac{1}{2}\sigma_{max}s^2 \\ \sigma_{max}s \end{pmatrix}, \quad (4)$$

where $$C_f(s) = \int_0^s \cos\frac{\pi}{2}\tau^2 d\tau \text{ and } S_f(s) = \int_0^s \sin\frac{\pi}{2}\tau^2 d\tau$$

are the Fresnel cosine and sine integrals, respectively. The clothoid is plotted in FIG. 1E as an arc connecting $q_s$ and $q_1$.

A deflection of the clothoid represents a difference in orientations of $q_s$ and $q_1$. For fixed $\kappa_{max}$ and $\sigma_{max}$, the clothoid has important properties
1. a constant deflection $\delta_c = \kappa_{max}^2/(2\sigma_{max})$
2. a constant arc length $s = \kappa_{max}/\sigma_{max}$.
3. a uniquely determined solution $q(s)$.

These properties can be pre-computed and stored in memory for computational efficiency.

Figure 1D:
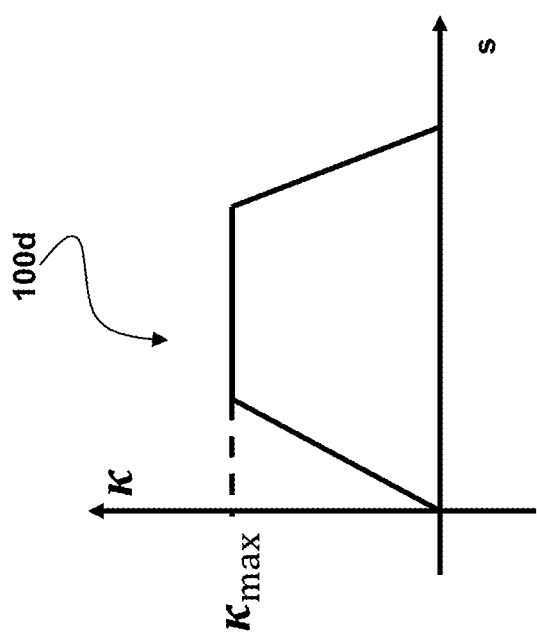
FIG. 1D shows a plot illustrating how curvature changes along a clothoid turn.
Figure 1E:
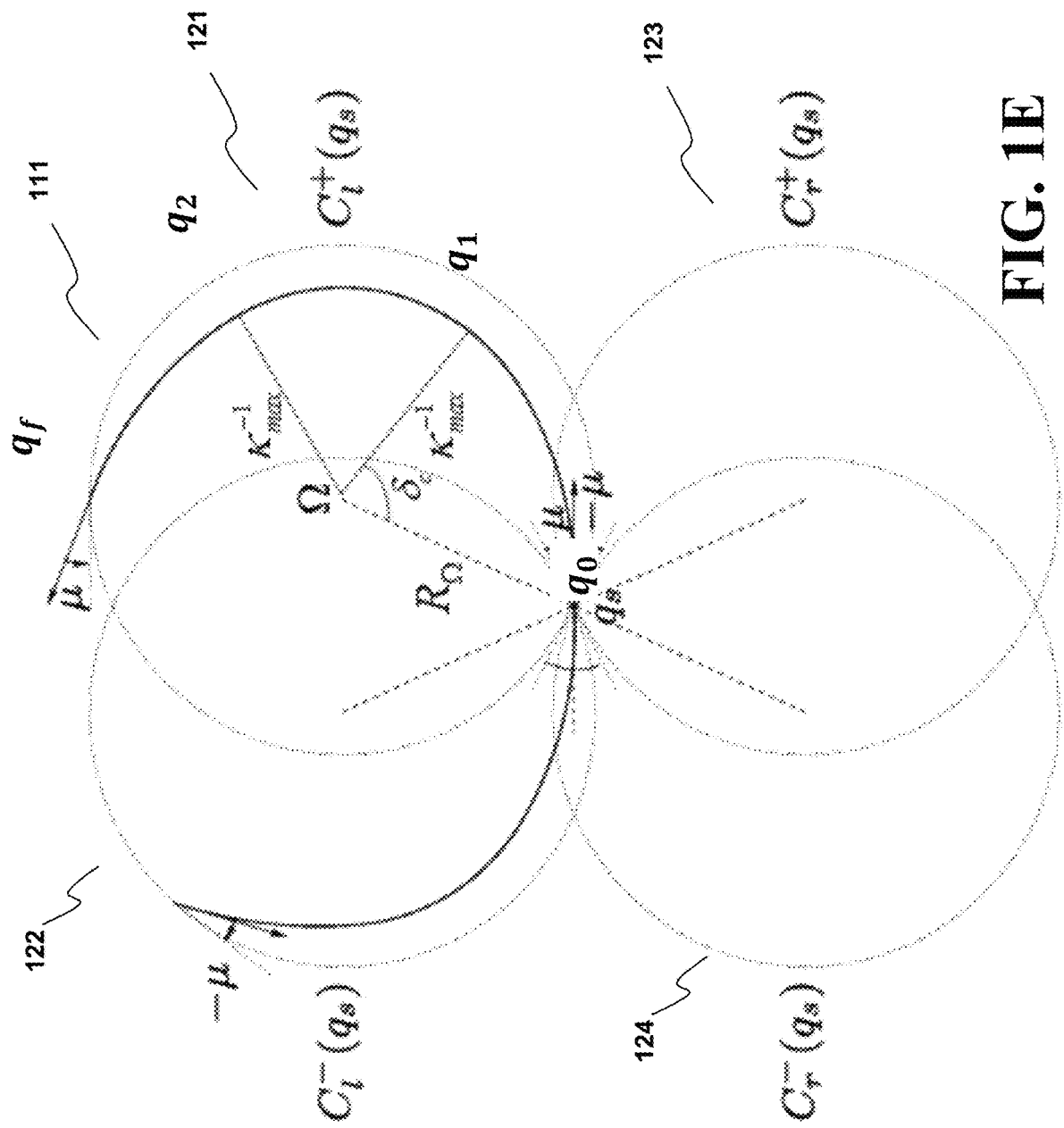
FIG. 1E shows a schematic of a clothoid turn having curvature changing according to the plot.

FIG. 1D shows a plot 100d illustrating how curvature changes along a clothoid turn. FIG. 1E shows a schematic of a clothoid turn having curvature changing according to the plot 100d.

An example of such a clothoid turn is given by an arc 111 from $q_s$ to $q_f$ in FIG. 1E, where the arc represents a left forward clothoid turn, equivalently a left turn and forward movement. Depending on its deflection $\delta = \theta_s - \theta_f$, a clothoid turn could consist of up to two clothoids and one circular arc. As shown in FIG. 1E, the left forward clothoid turn 111, exemplifying a case $2\delta_c \leq \delta < 2\delta_c + \pi$, includes
1. a clothoid from $q_s$ to $q_1$, with a sharpness $\sigma_{max}$;
2. a circular arc of radius $\kappa_{max}^{-1}$ and of angle $\delta_f - 2\delta_c$, starting from $q_1$ and ending at $q_2$;
3. a second clothoid starting from $q_2$ with sharpness $-\sigma_{max}$ and ending at $q_f$.

When $\delta=0$, a clothoid turn reduces to a line segment of length $2R_\Omega \sin \mu$, where $R_\Omega$ and $\mu$ are defined later. For $0 \leq \delta < 2\delta_c$, a clothoid turn contains a clothoid of a sharpness $\sigma \leq \sigma_{max}$ and a symmetric clothoid of a sharpness $-\sigma$, where the sharpness $\sigma$ is given by $$\sigma = \frac{\pi\left(\cos\frac{\delta}{2}C_f\left(\sqrt{\frac{\delta}{\pi}}\right) + \sin\frac{\delta}{2}S_f\left(\sqrt{\frac{\delta}{\pi}}\right)\right)^2}{R_\Omega^2 \sin^2\left(\frac{\delta}{2}+\mu\right)},$$

and the length of each clothoid is $\sqrt{\delta/\sigma}$. Clothoid turns with $2\delta_c+\pi \le \delta < 2\pi$ correspond to left backward motions, and can be treated similarly. It is clear that a clothoid turn can be parameterized by its deflection $\delta$, and a line segment can be parameterized by its length l.

One concept in simplifying the CCPP from geometric perspectives is CC Circle. FIG. 1E shows four CC circles associated with a configuration $q_s$. Particularly, 121 $C_l^+(q_s)$, 122 $C_l^-(q_s)$, 123 $C_r^+(q_s)$, and 124 $C_r^-(q_s)$ correspond to the left forward clothoid turn 111, a left backward clothoid turn, a right forward clothoid turn, and a right backward clothoid turn, respectively. Note that a clothoid turn, enclosed by its corresponding CC circle, always enters and leaves the corresponding CC circle in the direction which forms a $\mu$ angle with tangent vectors at the entry and exit points.

Interestingly, each CC circle has exactly the same center as the circular arc of its respective clothoid turn. For instance, $\Omega$, the center of the CC circle 121 $C_l^+(q_s)$, coincides with the center of the circular arc which is tangential to the vehicle orientation at $q_1$. Its coordinates are given by $$\begin{pmatrix} x_\Omega \\ y_\Omega \end{pmatrix} = \begin{pmatrix} x_1 - \kappa_{max}^{-1}\sin\theta_1 \\ y_1 + \kappa_{max}^{-1}\cos\theta_1 \end{pmatrix}. \quad (5)$$

For fixed $\kappa_{max}$ and $\sigma_{max}$, the CC circle radius and $\mu$-angle are given by $$\begin{pmatrix} R_\Omega \\ \mu \end{pmatrix} = \begin{pmatrix} \sqrt{x_\Omega^2 + y_\Omega^2} \\ \arctan\dfrac{x_\Omega}{y_\Omega} \end{pmatrix}, \quad (6)$$

where $\mu$ is the angle between the vehicle orientation and a tangent vector of the CC circle 121 at $q_s$.

Some embodiments disclose CCPP methods to determine a continuous curvature path between $q_s$ and $q_f$ by combining line segments and clothoid turns. In one embodiment, the continuous curvature path is assumed to take same classes and driving patterns of the RS paths listed in FIG. 1C, except that C in FIG. 1C represents a clothoid turn instead of a circular arc. This embodiment is based on realization that those classes illustrated in FIG. 1C form an exhaustive set of that guaranties that for any values of the input states, there is at least one pattern that represents a feasible continuous curvature path connecting the input states without consideration of obstacles.

Specifically, this embodiment is based on recognition that the discontinuous RS path can be transformed into a continuous curvature path by replacing the circular arcs with corresponding clothoid turns. In such a manner, a transformed continuous RS path closely resembles the structure of the RS path and thus the 48 patterns of the transformed RS paths form an exhaustive set of patterns. As used herein, each transformed RS path is formed by a sequential composition of elementary paths selected from a group including a clothoid turn and a straight line. In one embodiment, each transformed RS path includes a clothoid turn. In one embodiment, each transformed RS path includes an elementary path selected from a group consisting of a clothoid turn and a straight line.

A continuous curvature path, with a specified driving pattern, between the initial configuration $q_s$ and the final configuration $q_f$, can be parameterized by deflections of clothoid turns and lengths of line segments. For instance, assuming a driving pattern L+S+L+, the continuous curvature path begins with a left forward clothoid turn with a deflection $\delta_1$, followed by a line with a length l, and another left forward turn with a deflection $\delta_2$. For those skilled in the art, given values of parameters $\delta_1$, $\delta_2$, l and the initial configuration $q_s$, it is straightforward to obtain a solution of (1), denoted by $\phi(q_s, t)$, with its final configuration given by $\phi(q_s, \delta_1, l, \delta_2)$. According to the CCPP problem formulation, the CCPP for $q_s$ and $q_f$ is equivalent to solve for $\delta^*_1, \delta^*_2, l^*$, which satisfy a set of nonlinear equations $$\phi(q_s, \delta^*_1, l^*, \delta^*_2) = q_f. \quad (7)$$

The set of equations (7) is non-convex in the parameters, and thus is unreliable to solve. Also, it resorts to iterative algorithms and thus is computationally expensive.

In one embodiment, one can re-parameterize a continuous curvature path and perform the CCPP using $\mu$-tangency conditions, which determine combination of clothoid turns and lines. There are three possible combinations in continuous curvature paths fitting the driving patterns in FIG. 1C: SC, CC, C|C. To that end, there are three types of $\mu$-tangency conditions.

Figure 1F:
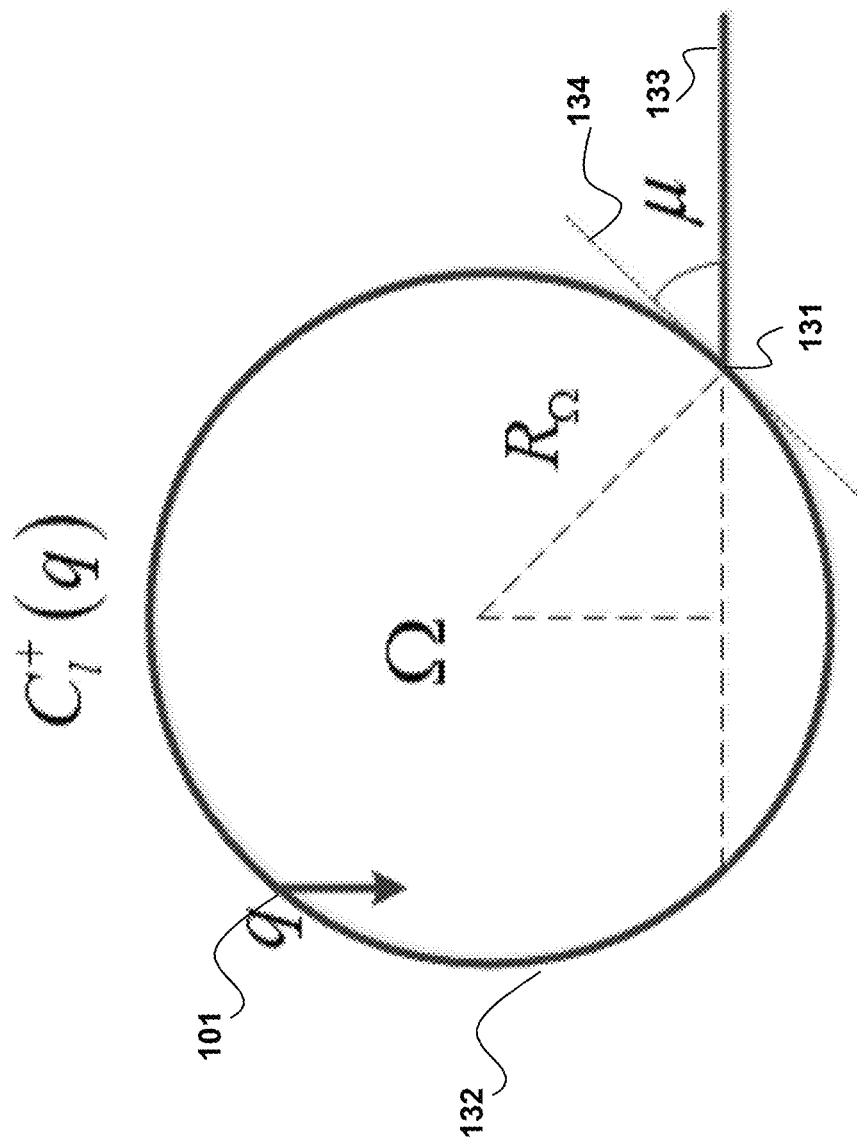
FIG. 1F shows a schematic of a driving pattern that illustrates SC μ-tangency condition according to some embodiments.

FIG. 1F shows a schematic of a driving pattern that illustrates SC $\mu$-tangency condition between a line 133 and a clothoid turn, which uniquely determines a CC circle 132 according to some embodiments. The clothoid turn begins with 101, and transits to the line 133 at $q_1$ 131. The SC $\mu$-tangency condition between the clothoid turn and the line 133 is that an angle between a tangent vector 134 of the CC circle 132 at $q_1$ 131 and the line 133 is $\mu$.

Figure 1G:
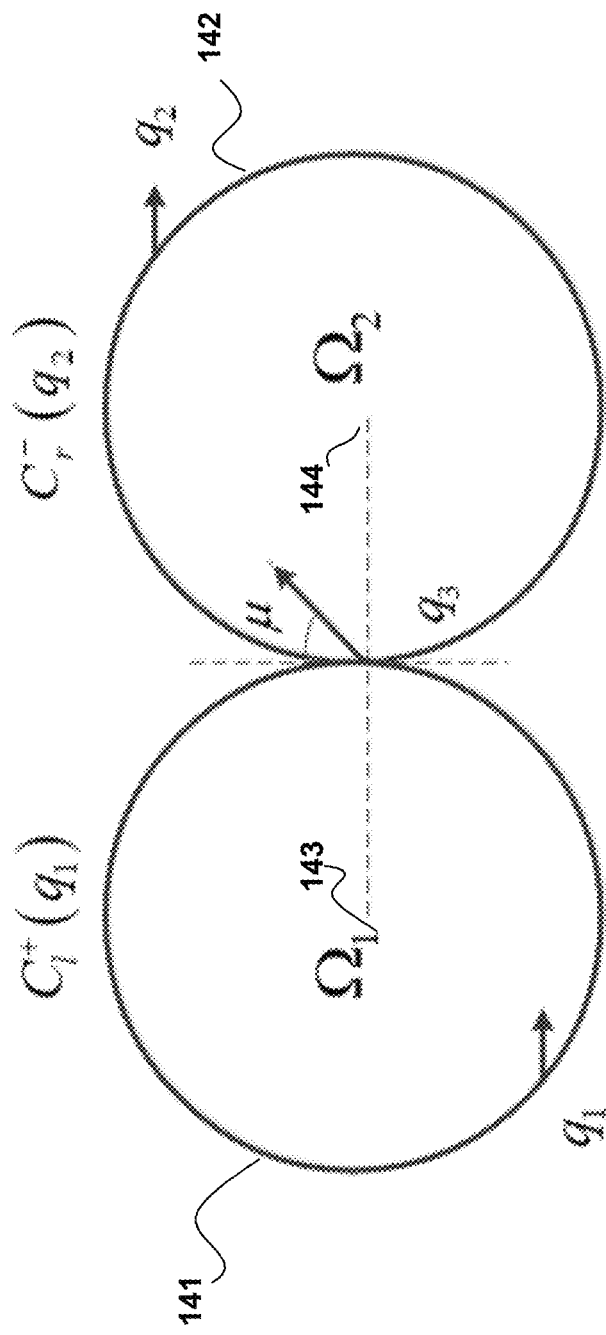
FIG. 1G shows a schematic of a driving pattern that illustrates CC μ-tangency conditions according to some embodiments.

FIG. 1G shows a schematic of a driving pattern that illustrates CC $\mu$-tangency conditions between a left forward clothoid turn and a right forward clothoid turn, corresponding to CC circles 141 and 142, respectively according to some embodiments. The CC $\mu$-tangency conditions specifies
1. the CC circles 141 and 142 have to be tangential;
2. a distance $L(\Omega_1\Omega_2)$ between centers 143 and 144 of the CC circles 141 and 142 is equal to $2R_\Omega$.

Figure 1H:
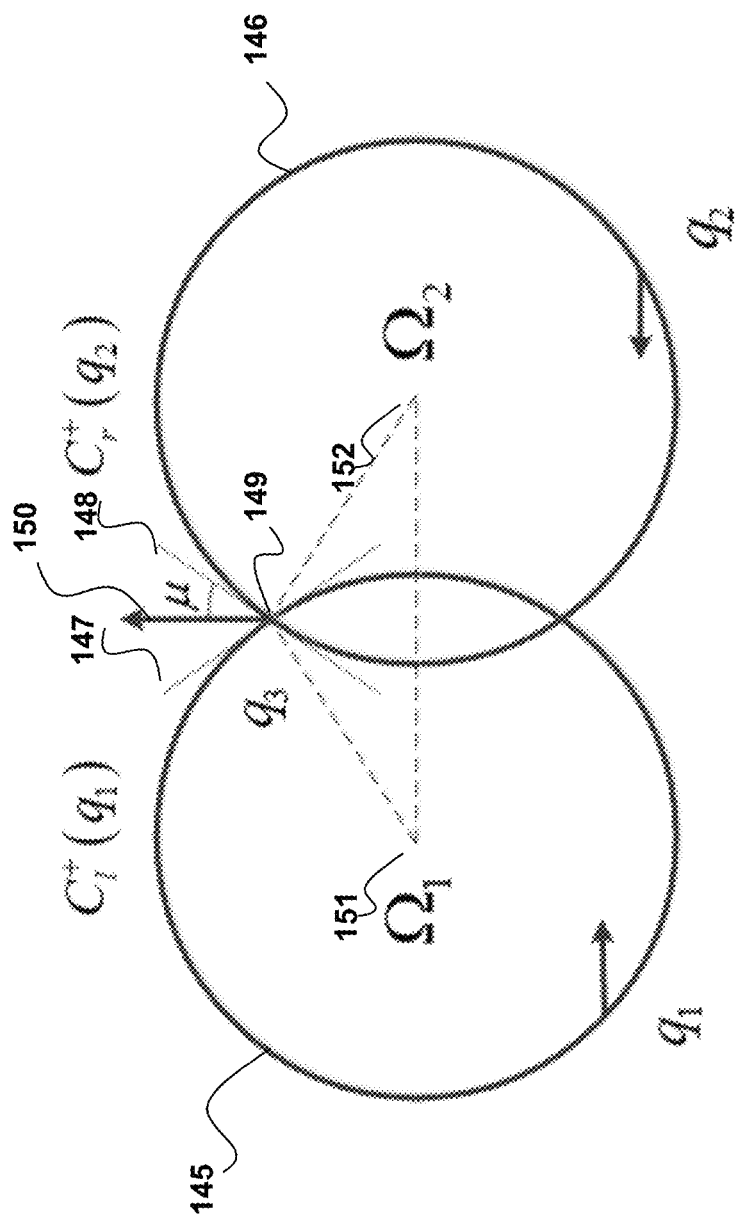
FIG. 1H shows a schematic of a driving pattern that illustrates C|C μ-tangency conditions according to some embodiments.

FIG. 1H shows a schematic of a driving pattern that illustrates C|C $\mu$-tangency conditions between a left forward clothoid turn and a right backward clothoid turn, corresponding to CC circles 145 and 146, respectively, according to some embodiments. The C|C $\mu$-tangency conditions specifies that
1. the CC circles 145 and 146 intersect with each other, and at an intersecting configuration 149, tangent vectors 147 and 148, of the CC circles 145 and 146, respectively, form angles of $\mu$ with respect to an orientation 149 of the vehicle at 149;
2. a distance $L(\Omega_1\Omega_2)$ between centers 151 and 152 of the CC circles 145 and 146 should be $2R_\Omega \cos\mu$.

Some embodiments are based on recognition that a single continuous curvature path can be formed by different patterns of elementary paths. Moreover, for a single pattern, there can be different combinations of geometrical parameters of its elementary paths that can form the required continuous curvature path. Accordingly, the system defining the continuous curvature path is underdetermined. The solution of the underdetermined systems usually entails computationally expensive iterative process and can be undesirable.

Some embodiments are based on a realization that geometrical constraints imposed on a mutual arrangement of elementary paths within a pattern can turn the underdetermined system into a determined one. The determined system has at most one independent solution that can be found analytically. Thus, for the determined systems, the computationally expansive iterative solutions can be avoided to improve the performance of the processor and memory usage of the path planning.

Some embodiments are based on another realization that such an additional geometrical constrain can be determined for an individual pattern off-line. This realization allows to replace a real-time, i.e., online, determination of the optimal sequence of the elementary paths with the off-line determination of the optimal geometrical constraints. The optimal geometrical constraints can vary for different patterns and can be determined such that the analytical solution for the continuous curvature path that satisfies those geometrical constraints is at least close to the solution that would result from the iterative optimization.

To that end, some embodiments analytically compute a continuous curvature path and/or its cost for various driving patterns, such as driving patterns in FIG. 1C. For example, one embodiment enables analytical solutions using reparameterization of continuous curvature paths by angles $\alpha$, $\theta$ between centers of CC circles and lines. These parameters can be uniquely determined offline by exploiting $\mu$-tangency conditions, existence conditions, geometric constraints, and symmetry of driving patterns. Accordingly, costs of continuous curvature paths can also be obtained analytically.

Figure 2A:
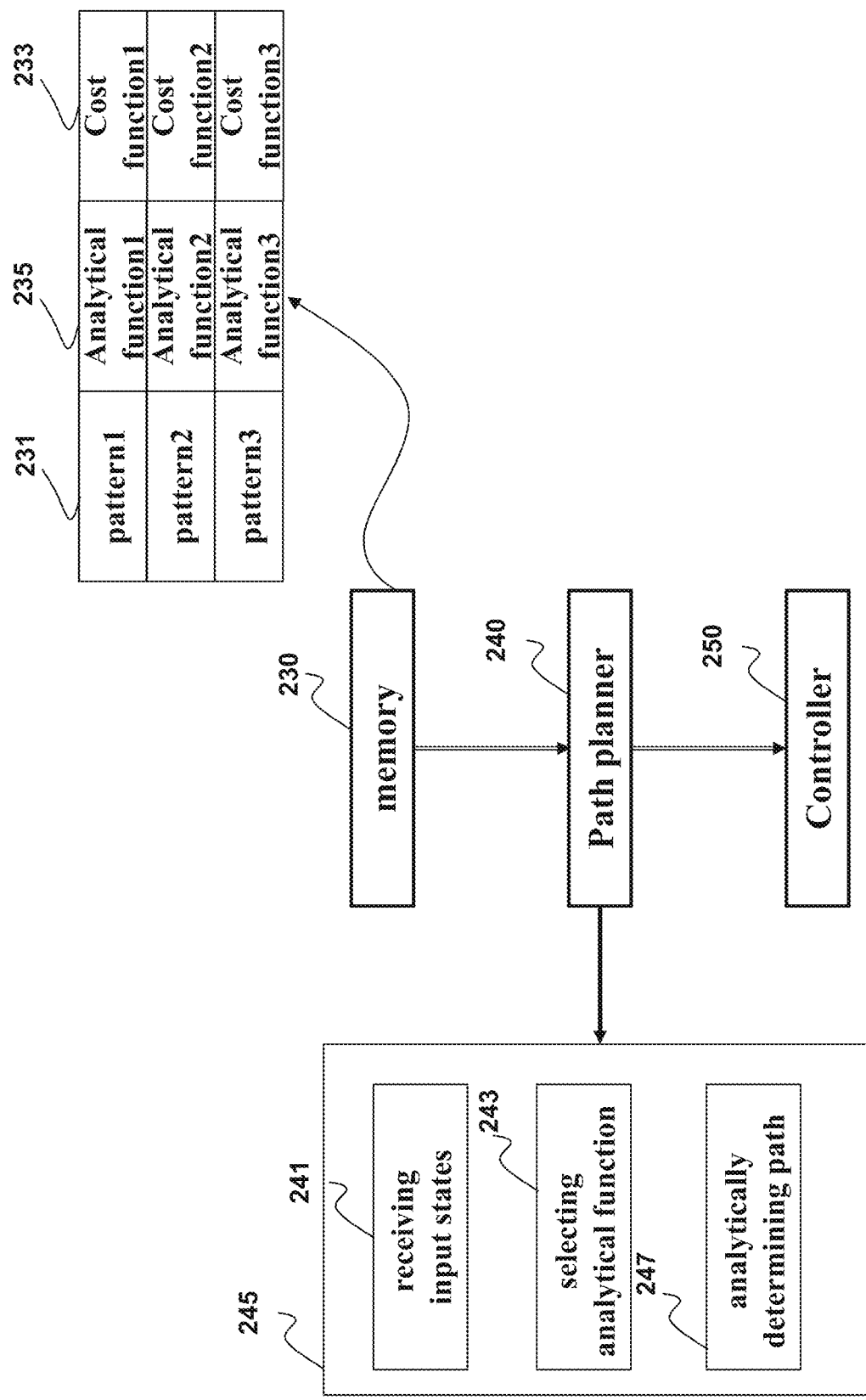
FIG. 2A shows a block diagram of a system for controlling a motion of a vehicle according to some embodiments.

FIG. 2A shows a block diagram of a system for controlling a motion of a vehicle, according to some embodiments. The system includes a memory 230 to store a set of analytical functions 235 corresponding to a set of patterns 231 of elementary paths. Each pattern represents a continuous path and each analytical function is determined for a corresponding pattern to provide an analytical solution for input states of the vehicle defining a continuous path connecting the input states by a sequential compositions of the elementary paths following the corresponding pattern.

The memory 230 can also optionally store a set of cost functions 233 corresponding to the set of patterns and the set of analytical functions. The cost functions 233 allows to analytically compute cost of continuous curvature path according the corresponding pattern. Examples of the cost include a length and/or a time of travel along the path following the pattern. The memory 230 can also optionally store the set of patterns 231 itself. Additionally, or alternatively, the set of analytical and cost function are determined for the set of patterns, but the set itself is not stored in the memory.

A path planner 240 is configured to analytically determine 245 a continuous curvature path connecting a pair of input states referred herein as an initial state and a target state. For example, the path planner can be implemented using a processor programmed to select 243 from the memory 230, in response to receiving 241 an initial state and a target state of the vehicle, an analytical function corresponding to a minimum cost of the continuous curvature path connecting the initial state with the target state and to analytically determine 247 parameters of the continuous curvature path using the selected analytical function.

A controller 250 controls the motion of the vehicle according to the parameters of the continuous curvature path. For example, the parameters of the continuous curvature path includes a sequence of coordinates of points on a plane of the motion of the vehicle forming the continuous curvature path. Additionally, or alternatively, the parameters of the continuous curvature path includes a sequence of control inputs, wherein the control of the motion of the vehicle according to the sequence of control inputs transitions the states of the vehicle according to the continuous curvature path.

When the memory stores a set of cost function corresponding to the set of patterns and the set of analytical functions, the path planner 240 can determine the cost of each pattern using the corresponding cost function and can select the analytical function corresponding to the pattern having the minimal cost. Additionally, or alternatively, the path planner can construct an RS path connecting the initial and the target state and select the analytical function corresponding to a pattern of the RS path. In such a manner, the construction and/or storage of the cost function is not necessary.

In one embodiment, the set of patterns is an exhaustive set that guaranties that for any values of the input states, there is at least one pattern that represents a feasible continuous curvature path connecting the input states without consideration of obstacles. For example, in one embodiments, the set of patterns includes 48 different patterns representing transformed Reeds-Shepp (RS) paths, wherein each pattern in the set is formed by replacing a circular arc in a corresponding pattern representing an RS path with a clothoid turn.

For example, in one embodiment, the analytical functions are determined to provide solutions satisfying $\mu$-tangency conditions on a mutual arrangement of adjacent elementary paths forming the continuous curvature path, and wherein at least some of the analytical functions are determined to provide solutions satisfying an additional geometrical constraint on a mutual arrangement of at least one intermediate elementary path with respect to at least one boundary elementary path.

Given $q_s$ and $q_f$, this embodiment uses analytical cost formula to compute costs of continuous curvature paths for all patterns in FIG. 1C. Cost formula rely on knowledge of CC circles associated with $q_s$ and $q_f$, for instance, radius $R_\Omega$ and centers $\Omega$. Cost formula also rely on properties of a clothoid, for instance, $\mu$ angle, deflection $\delta_c$, and length $l_c$. In some embodiment, all this knowledge involves integrating system dynamics (1), can be obtained online very efficiently. In some embodiment, these knowledge can be pre-computed and stored in the memory for pre-chosen pairs of $\kappa_{max}$ and $\sigma_{max}$.

Figure 2B:
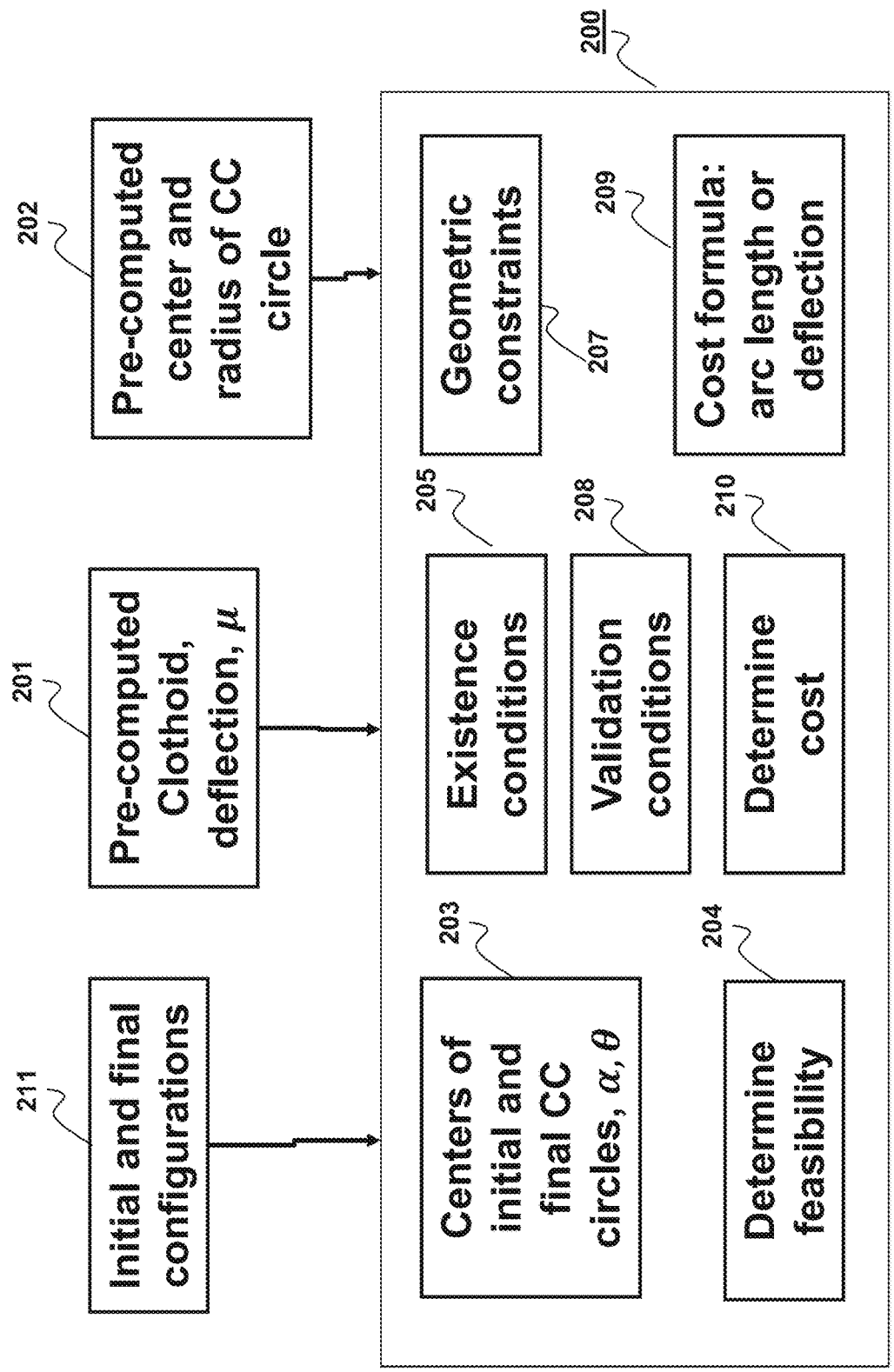
FIG. 2B shows a block diagram of designing a cost function which analytically evaluates a cost of a continuous curvature path with a certain driving pattern according to some embodiments.

FIG. 2B shows a block diagram of designing a cost function which analytically evaluates a cost of a continuous curvature path with a certain driving pattern between input states 211, i.e., the initial configuration $q_s$ and the final configuration $q_f$, according to some embodiments. Pre-computed configurations along a clothoid as (4), deflections and $\mu$ angle are stored in 201, and other values about CC circles, e.g., center and radius of CC circle, are pre-computed and stored 202. With pre-computed values, and $q_s$ and $q_f$, centers of CC circles associated with $q_s$ and $q_f$, and parameters $\alpha$, $\theta$ are determined 203. With all these information, the cost function determines feasibility 204, i.e., whether it is feasible to find such a continuous curvature path between $q_s$ and $q_f$, according to existence conditions 204 and geometric constraints 207. If it is infeasible, the cost function returns a value indicating infeasibility, e.g., an infinite or a very large value. Otherwise, parameters such as deflections of clothoid turns and lengths of lines segments are determined as functions of $\alpha$, $\theta$ and orientations of the configurations $q_s$ and $q_f$ representing a cost formula 209. In one embodiment, deflection parameters are further verified against validation conditions 206 in 210, which indicates infeasibility if validation conditions are violated.

In some embodiments, a clothoid, satisfying system dynamics (1) for a pair of fixed $\kappa_{max}$ and $\sigma_{max}$, is precomputed and stored in memory 201, and can be reused online to determine continuous curvature paths analytically.

Figure 2C:
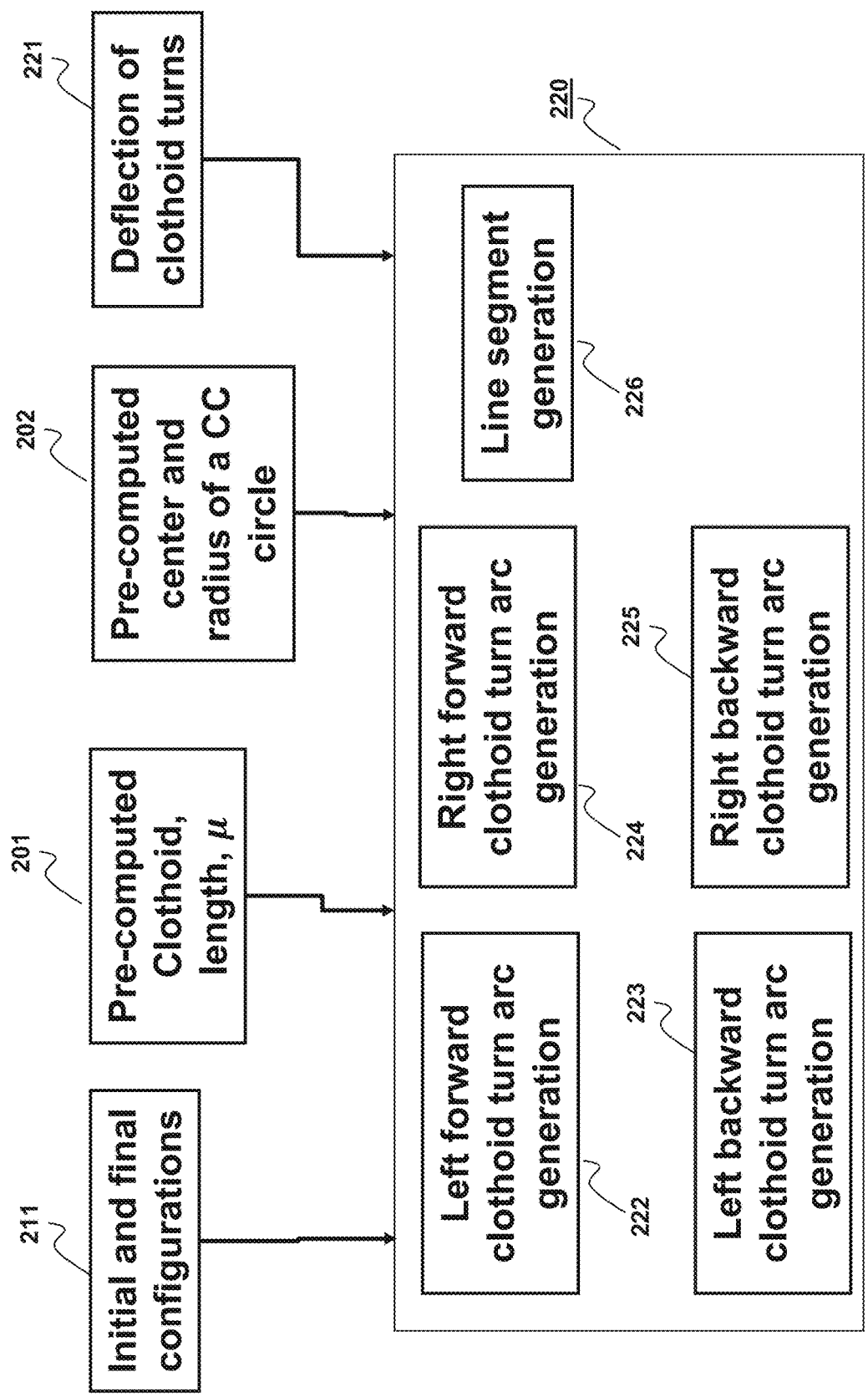
FIG. 2C shows a block diagram of a method for determining an analytical function to determine a continuous curvature path with a fixed driving pattern according to some embodiments.

FIG. 2C shows a block diagram of a method for determining an analytical function 220 to determine a continuous curvature path connecting the initial configuration $q_s$ with the final configuration $q_f$ with a fixed driving pattern according to some embodiments. Given a driving pattern and its parameters, deflections of clothoid turns and lengths of lines 221, the analytical function produces the continuous curvature path as a solution of system dynamics (1) with inputs $\mu$, $\sigma$ uniquely determined by the parameters.

In one implementation, the analytical function can include four arc generation blocks: LFCT 222 for generation of an arc corresponding to a left forward clothoid turn based on its start configuration and deflection; LBCT 223 for generation an arc corresponding to a left backward clothoid turn based on its start configuration and deflection; RFCT 224 for generation of an arc corresponding to a right forward clothoid turn based on its start configuration and deflection; RBCT 225 for generation of an arc corresponding to a right backward clothoid turn based on its start configuration and deflection; and LINE 226 for generation of a line segment based on its start configuration and length. A continuous curvature path can be constructed by providing start configurations, deflections, or length as inputs to 222, 223, 224, 225, and 226, respectively, in the order specified by the driving pattern. For example, to compute a feasible continuous curvature path in the driving pattern L+S+R+, the analytical function 220 needs inputs: $\delta_1$, $l$, $\delta_2$ and $q_s$, representing a deflection of a left forward clothoid turn, a length of forward line segment, and a deflection of a right forward clothoid turn, the initial configuration, respectively. The analytical function first uses LFCT($q_s$, $\delta_1$) 222 to obtain a left forward clothoid turn arc 222 with $\delta_1$ and $q_s$ as inputs, which ends at $q_1$; then uses LINE($q_1$, $l$) 226 to determine a line tangent to the left forward clothoid turn at $q_1$ with inputs $l$ and $q_1$ as its start configuration, which ends at a configuration $q_2$; finally uses RFCT($q_2$, $\delta_2$) 224 to compute a right forward clothoid turn arc which is tangentially connected with the line segment at $q_2$, and reaches the final configuration $q_f$. The continuous curvature path is a union of the left forward clothoid turn, the forward line segment and the right forward clothoid turn: P=LFCT($q_s$, $\delta_1$)∪LINE($q_1$, $l$)∪RFCT($q_2$, $\delta_2$). The analytical function is further illustrated by FIGS. 8A-8J for different driving patterns.

Figure 3:
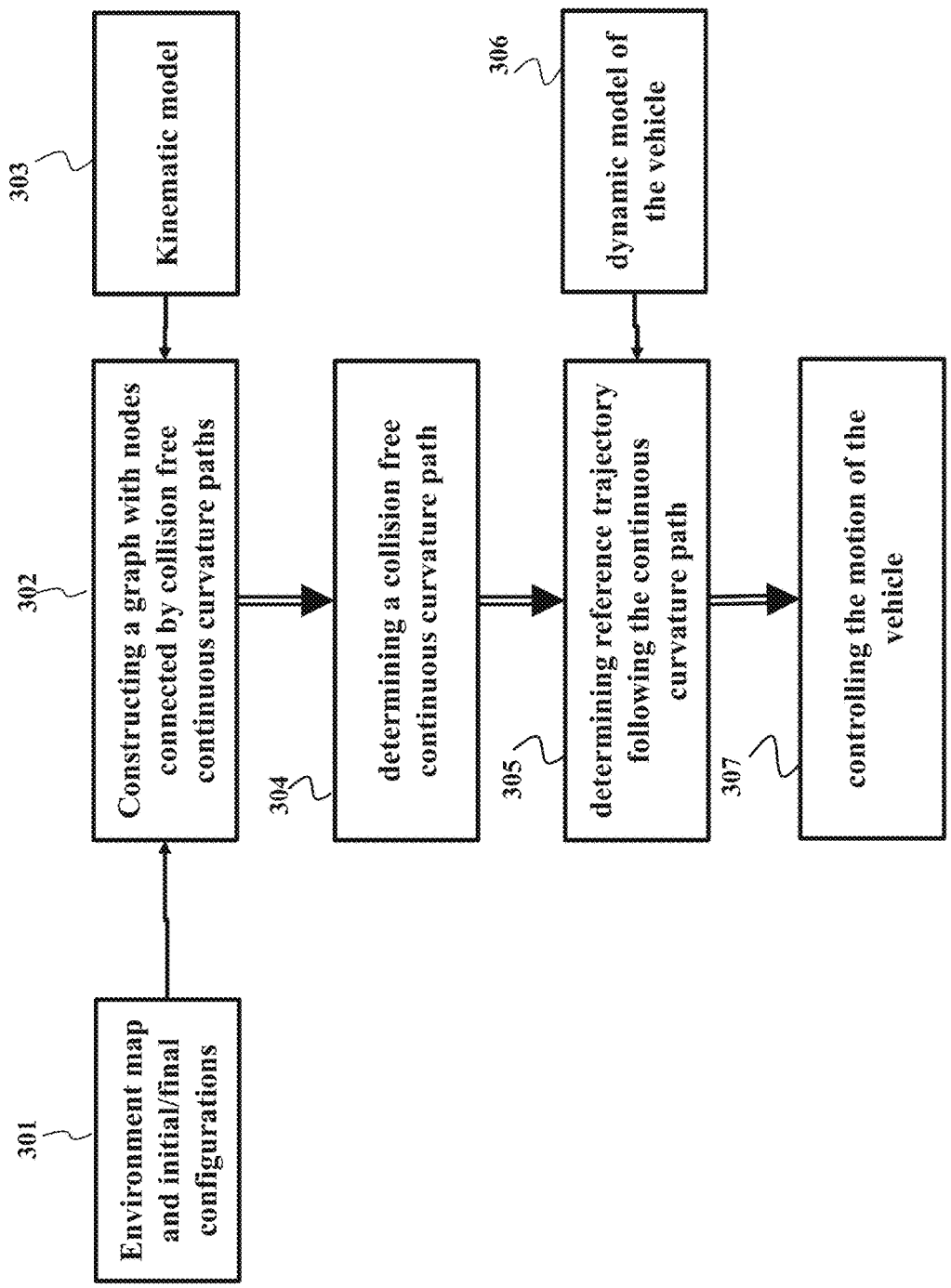
FIG. 3 shows a block diagram of a method to determine a collision-free continuous curvature path according to some embodiments.

FIG. 3 shows a block diagram of a method to determine a collision-free continuous curvature path between two configurations $q_s$ and $q_f$ in an environment including obstacles according to some embodiments. Using the sensors of the vehicle, one embodiment constructs an environment map from sensors, which represents vehicle's knowledge about its surrounding. Obstacles can stand for other vehicles, pedestrians, buildings, sidewalk, etc. In one embodiment, the environmental map is derived by detecting all obstacles, and approximating all obstacles and boundaries of visible surrounding which can be sensed by sensors on the vehicle as simple geometric shapes for instance rectangles representing a minimal bounding box for each obstacle or the visible space. With geometric approximation of obstacles and boundaries of the visible space, the environment map can be fully described by a list of geometric objects. Additionally, or alternatively, an obstacle can be approximated by a polytope, which however may increase computation burden in path planning.

A collision-free continuous curvature path planner first constructs a graph G, according to the environment map and initial/final configurations 301 and the vehicle kinematical model 303. The graph G includes a node set N and an edge set E, where each node in N corresponds to a collision-free configuration $q_i$, and each edge in E between two nodes $q_i$, $q_j$ implies existence of a collision-free continuous curvature path between $q_i$ and $q_j$. The construction 302 outputs the graph G if it contains a set of edges connecting the initial configuration $q_s$ to the final configuration $q_f$. A collision-free continuous curvature path P between $q_s$ and $q_f$ is then determined in 304 on the basis of the graph G by using state of the art search algorithms such as A*, D, D*. A reference trajectory enforcing the vehicle following the continuous curvature path is determined in 305, on the basis of a dynamic model of the vehicle 306. The reference trajectory is further exploited to control actuators on the vehicle to control its motion.

In some embodiments, the reference trajectory defines profiles of the vehicle velocity and steer angle over time. In another embodiment, the reference trajectory defines the profile of the vehicle state (x, y, θ) over time. The vehicle dynamic model is fifth order and given by $$\dot{x} = \cos(\theta)\cos(\phi)v \quad (8)$$
$$\dot{y} = \sin(\theta)\cos(\phi)v$$
$$\dot{\theta} = \sin(\phi)\frac{v}{b}$$
$$\dot{v} = a_1$$
$$\dot{\zeta} = a_2,$$

where $a_1$ the translational acceleration and $a_2$ the steering angular velocity. The vehicle kinematic model 301 is given by (1).

FIG. 4A shows a flow chart of a method for constructing the graph G 302 according to one embodiment. In the beginning, G is initialized with an empty set of edge E=∅, and a node set N={$q_s$}. The method samples 401 the state space of (1) to obtain a collision-free configuration 411 $q_{new}$ according to certain sampling schemes. With the new collision-free configuration 411, the method determines 402 a neighbor node $q_{near}$ which belongs to N and is nearest to $q_{new}$. With $q_{near}$ as the initial configuration, and $q_{new}$ as the final configuration, CC steering 403 performs CCPP according to embodiments disclosed in this invention, and outputs a continuous curvature path P($q_{near}$, $q_{new}$) if possible, otherwise infeasible. The signal 413 can be a valid continuous curvature path or a parameter indicating infeasibility. The method further determines 404 whether the continuous curvature path P($q_{near}$, $q_{new}$) collides with obstacles in the environment map. If the path is collision-free, in 405, the new configuration $q_{new}$ is added to the node set N, and the edge connecting $q_{near}$ and $q_{new}$ is added to the edge set E. Afterwards, certain stop criteria are tested in 406 to exit the construction of G. In one embodiment, the construction stops when there exists a set of edges connecting $q_s$ and $q_f$. In another embodiment, the construction stops when the number of paths between $q_s$ and $q_f$ exceeds a certain threshold. If the stop criteria are not met, the construction procedure is repeated.

Figure 4B:
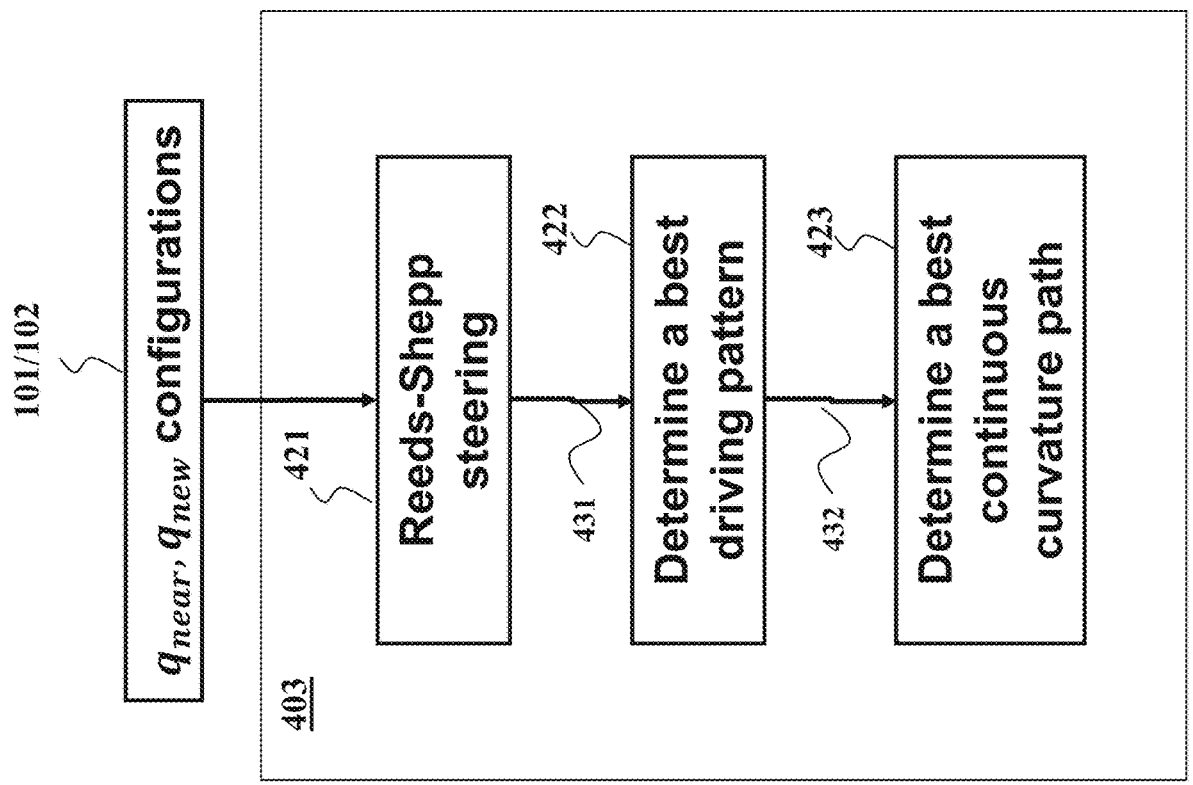
FIG. 4B shows a flow chart of a method for determining a steering according to one embodiment.

FIG. 4B shows a flow chart of a method for determining CC steering 403 according to one embodiment. Given two configurations $q_{near}$ and $q_{new}$, the method first performs Reeds-Shepp (RS) steering 421, testing the existence of RS paths between $q_{near}$ and $q_{new}$ by enumerating all driving patterns in FIG. 1C, and returns a set of driving patterns 431 corresponding to feasible RS paths. The cost function 200 determines, for each driving pattern in 431, feasibility of the CCPP, and the cost. The signal 432 includes driving patterns in 431, which have feasible continuous curvature paths between $q_{near}$ and $q_{new}$, and the corresponding costs. A best driving pattern, which yields the minimum cost, is selected, and the corresponding continuous curvature path is determined 423 by the analytical function 220.

Figure 4C:
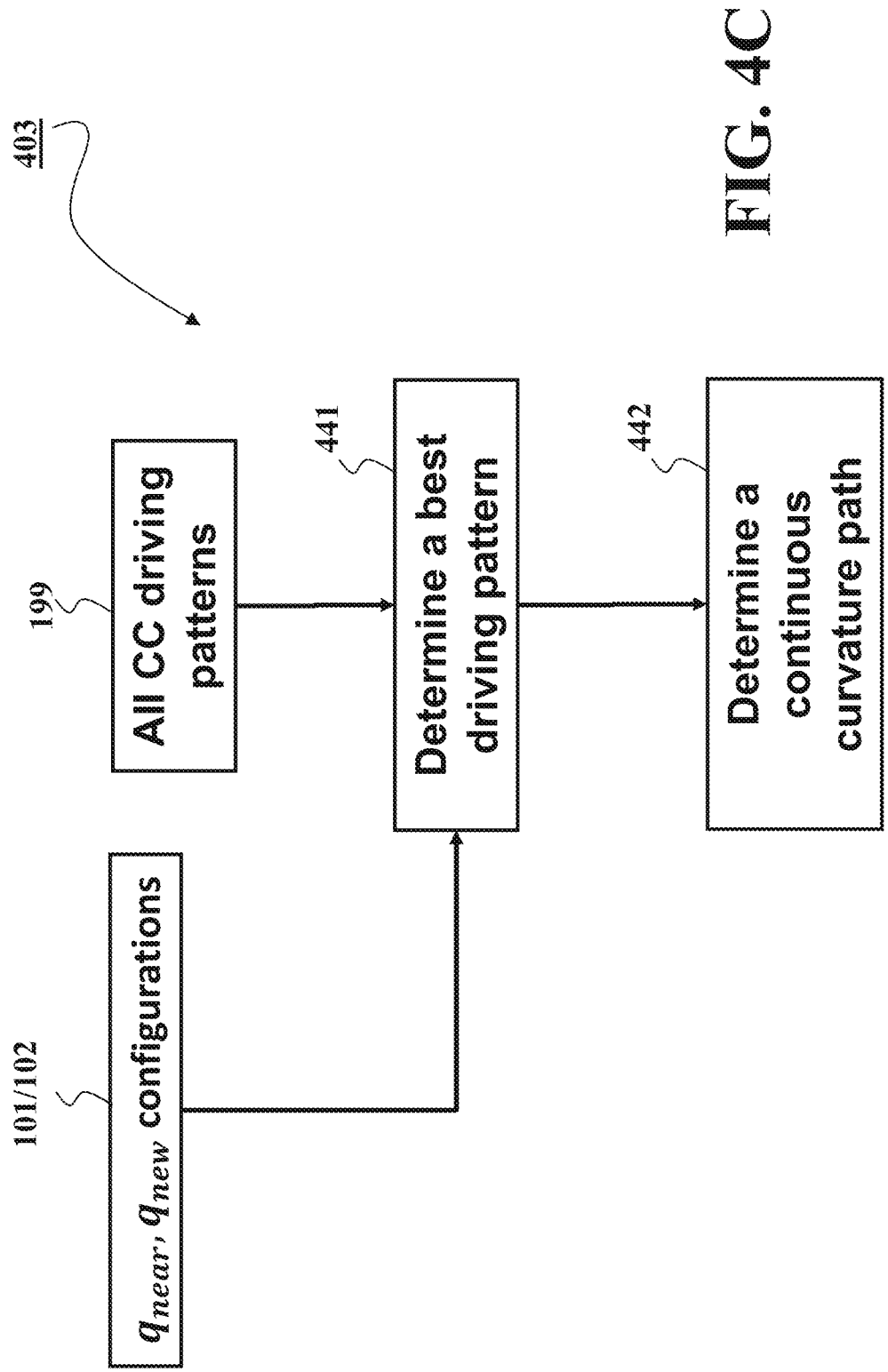
FIG. 4C shows a flow chart of a method for determining a steering according to another embodiment.

FIG. 4C shows a flow chart of a method for determining CC steering 403 according to another embodiment. Given two configurations $q_{near}$ and $q_{new}$, the method, by using the cost function 200, performs CCPP 441, tests the existence of continuous curvature paths between $q_{near}$ and $q_{new}$ by enumerating all driving patterns in FIG. 1C, and returns feasibility and costs of these driving patterns. A best driving pattern, which yields the minimum cost, is picked, and the corresponding continuous curvature path is determined 442 by the analytical function 220.

Figure 5A:
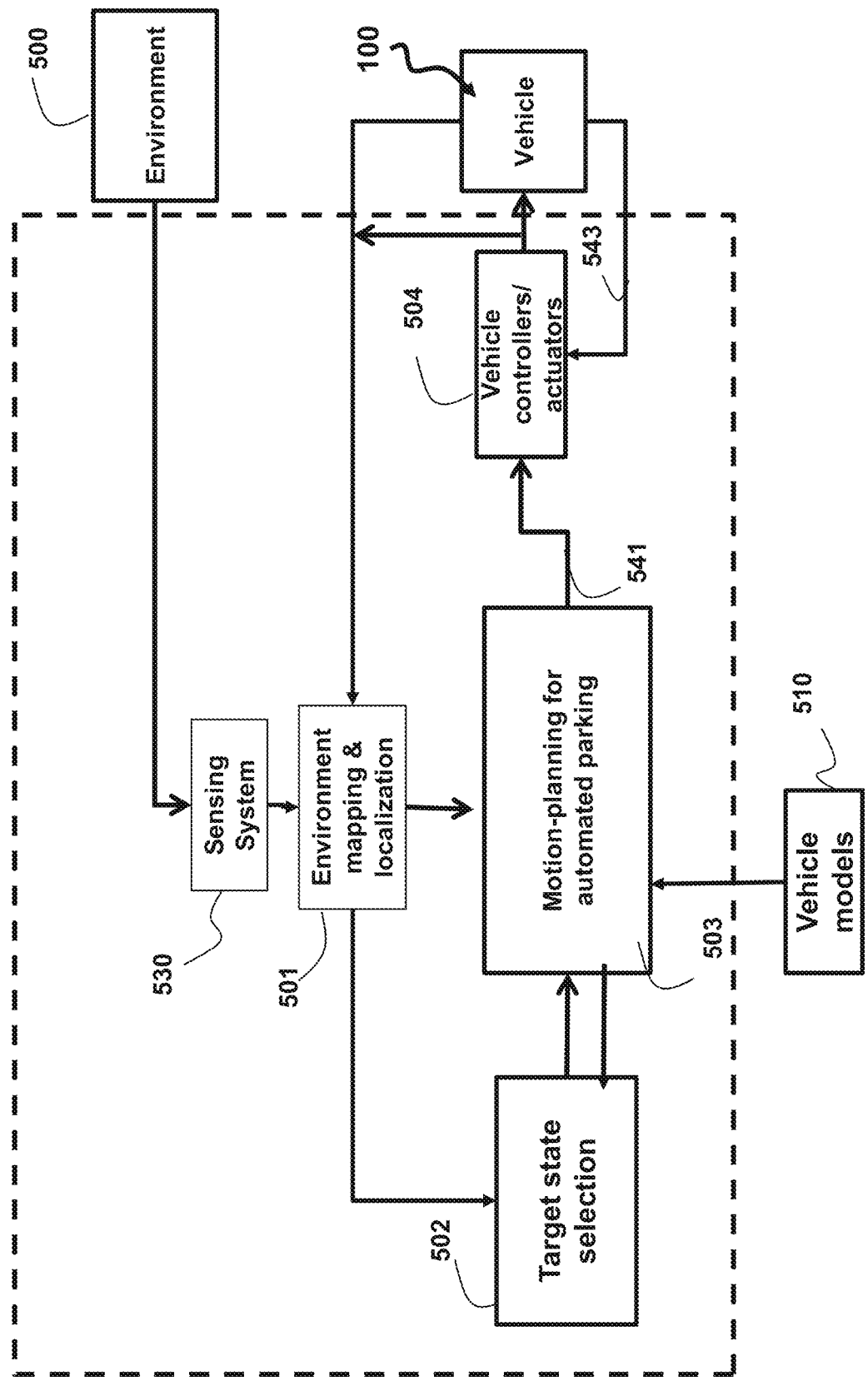
FIG. 5A shows a function diagram of an automated parking system according to one embodiment.

FIG. 5A shows a function diagram of an automated parking system according to one embodiment. Environment mapping and localization block 501 constructs or updates a map of a parking space, and determines the current location of the vehicle by sensing the environment and vehicle operation condition. For example, an inertial measurement unit, which may include 3-axis accelerometer(s), 3-axis gyroscope(s), and/or magnetometer(s), can be used to sense the vehicle operation. A global positioning system sensor can be used to provide position and velocity of the vehicle. Sensors to sense the environment 500 can be video cameras capturing obstacles including other vehicles, pedestrians, and buildings, ultrasonic/radar sensors detecting distance between the vehicle and obstacles, etc. Final state selection block 501 selects a final state for a parking spot to park the vehicle by identifying parking lot candidates, and sends the final state to a motion planning block 503. In one embodiment, the available parking spots are tracked by a separate system associated with the management of the parking garage.

Additionally, or alternatively, the parking spots can be detected using the sensors 503 of the automated parking system. In one embodiment, the motion planning block checks to determine whether the final state is parkable, i.e., there is a feasible path to the parking spot, or not, and notifies the final state selection block 502 the check result. If the final state is not parkable, the target selection block 502 selects another final state for evaluation. In another embodiment, the final state selection block 501 can also evaluate whether the final state is parkable, and only sends a parkable final state to the motion planning block.

If the final state is parkable, then the motion planning 503 initiates a complete motion planning procedure to determine a reference trajectory 541 based on the vehicle models 510, the initial and final states of the vehicle, and the map of the parking space. In one embodiment, the reference trajectory defines profiles of the vehicle velocity and steer angle over time. In another embodiment, the reference trajectory defines the profile of the vehicle state $(x, y, \theta)$ over time.

Given the reference trajectory 541, vehicle controllers and actuators 204 determine and exert control commands to enforce the vehicle state track the reference trajectory 541 if the reference trajectory is state profile, or to enforce the vehicle velocity and steer angle track the reference trajectory if the reference trajectory is the vehicle velocity and steer angle profiles. In one embodiment, the control commands could be gas pedal pressure or steering torque. The vehicle controller/actuators may also use signal 543 to determine control commands. The signal 543 can be a measured steering angle, or measured currents of motors moving the steering wheel or the gas pedal.

Figure 5B:
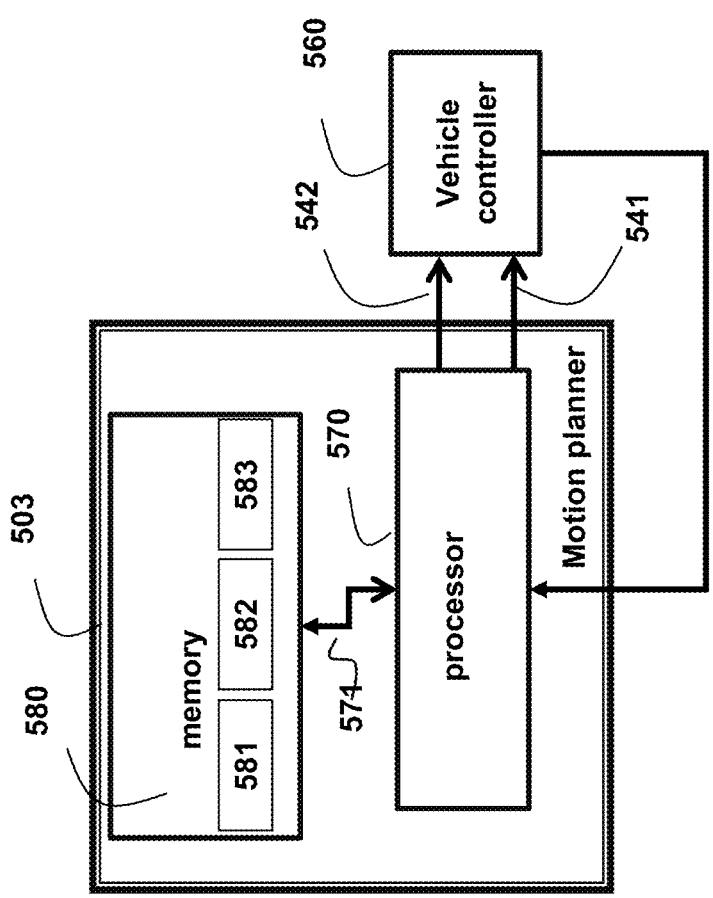
FIG. 5B shows a general structure of the motion-planning system according to one embodiment.

FIG. 5B shows a general structure of the motion-planning system 503 according to one embodiment. The motion-planning system 503 includes at least one processor 570 for executing modules of the motion-planning system 503. The processor 570 is connected 571 to a memory 580 that stores geometrical information 581 such as geometry of the vehicle and a map of the parking space. The memory 580 can also store the models of the vehicle 582 such as a kinematic model of the vehicle and a dynamic model of the vehicle. The memory 580 can also store the internal information 583 of the motion planner, including, but not limited to, an initial state of the vehicle, a final state of parked vehicle, cost function, values of each computed state, $\kappa_{max}$, $\sigma_{max}$, precomputed clothoid and its μ angle and deflection for a set of pairs of $\kappa_{max}$, $\sigma_{max}$, radius of a CC circle corresponding to a pair of ($\kappa_{max}$, $\sigma_{max}$), the motion leading up to each state, a kinematic graph, reference trajectory. In some embodiments, the memory 580 can include stored instructions implementing the method for the automated parking, wherein the instructions, when executed by the processor 570 carry out at least some steps of the method.

In some embodiments, the analytical functions are determined to provide solutions satisfying μ-tangency conditions on a mutual arrangement of adjacent elementary paths forming the continuous curvature path. At least some of the analytical functions are determined to provide solutions satisfying an additional geometrical constraint on a mutual arrangement of at least one intermediate elementary path with respect to at least one boundary elementary path. Some embodiments use existence conditions, geometric constraints, validation conditions imposed on the cost function 200 and the analytical function 220 to determine a continuous curvature path connecting $q_s$ and $q_f$.

FIG. 6 shows a table 610 listing examples of various additional geometric constraints discovered or imposed to determine a continuous curvature path and its cost for certain driving patterns according to some embodiments. For clarity purpose, this example only determines CC paths of driving patterns starting with a left forward clothoid turn L+, and only treats null-curvature initial and final configurations $q_s=(0, 0, 0, 0)$ and $q_f=(x_f, y_f, \theta_f, 0)$ (henceforth deemed as canonical paths). Also, since two $$CSC_{\frac{\pi}{2}} | C$$

classes can be constructed similarly to the $$C | C_{\frac{\pi}{2}} SC$$

classes, this invention explicitly presents here existence conditions for 10 classes:

$$CSC-1, CSC-2, C|C|C, C|CC, CC|C, CC_u|C_uC,$$
$$C|C_uC_u|C, C\left|C_{\frac{\pi}{2}}SC-1\right., C\left|C_{\frac{\pi}{2}}SC-2\right. \text{ and } C\left|C_{\frac{\pi}{2}}SC_{\frac{\pi}{2}}C\right..$$

FIG. 7A shows a schematic illustrating a cost function providing an analytical estimation of a cost for continuous curvature path following a pattern of class CSC-1 according to some embodiments. For example, FIG. 7A shows a table 710A that discloses conditions and formula of an L+S+L+ path that connects 700A $q_0$ and 799A $q_f$, used in the cost function 200. Toward this end, CC circles 701A $C_l^+(q_0)$ for 700A $q_s$ and 702A $C_l^-(q_f)$ for 799A $q_f$ are determined and used to characterize a configuration 715A $q_1$ of a first left clothoid turn, and a configuration 716A $q_2$ of a second left clothoid turn, respectively. Let 711A θ denote an angle between a line 705A $\Omega_1\Omega_2$ and the positive x-axis. To achieve the μ-tangency between 701A and a line 706A $q_1q_2$, and between the line 706A and 702A, geometric analysis shows that the straight line 706A is parallel to the line 705A.

Therefore, the L+S+L+ path that connects $q_0$ and $q_f$ includes:
1. A left clothoid turn $CT_1$: since the orientation of 715A of $CT_1$ is identical to 711A, we have the deflection of $CT_1$: $\delta_1 = \theta$;
2. A straight line segment 706A of length $$L(q_1 q_2) = L(\Omega_1 \Omega_2) - 2R_\Omega \sin \mu;$$

where $L(\Omega_1 \Omega_2)$ denotes the length of the line 705A.
3. A second left clothoid turn $CT_2$: since the orientation of 716A of $CT_2$ is also θ, the deflection of $CT_2$ shall be $\delta_2 = \theta_f - \theta$.

Existence conditions: Such an L+S+L+ path exists if and only if $L(\Omega_1\Omega_2) \geq 2R_\Omega \sin \mu$ and $\theta_f \geq \theta$ are both satisfied. Validation condition requires absolute values of deflections of all clothoid turns are less than $\pi + 2\delta_c$. A function arclen computes lengths of clothoid turns, with deflections of clothoid turns as its inputs.

FIG. 7B shows a schematic illustrating a cost function providing an analytical estimation of a cost for continuous curvature path following a pattern of class CSC-2 according to some embodiments. For example, FIG. 7B shows a table 710B that discloses FIG. 7B discloses conditions and formula of an L+S+R+ canonical path between 700B $q_0$ and 799B $q_f$, where a CC circle 702B $C_r^-(q_f)$ is used to characterize 716B $q_2$ and that a straight line 706B $q_1q_2$ crosses a line 705B $\Omega_1\Omega_2$. Let α denote an angle 712B between lines 705B and 706B. It is clear to see that α can be determined by $$\sin \alpha = \frac{2R_\Omega \cos \mu}{L(\Omega_1\Omega_2)}. \tag{9}$$

The desired canonical path L+S+R+ can therefore be generated with (9).
1. A left clothoid turn $CT_1$ with a deflection $\delta_1 = \theta + \alpha$;
2. A straight line segment 706B of length $$L(q_1 q_2) = \sqrt{L^2(\Omega_1\Omega_2) - (2R_\Omega \cos \mu)^2} - 2R_\Omega \sin \mu;$$

3. A second left clothoid turn $CT_2$: since the configuration 716B $q_2$ of $CT_2$ shares the same orientation with 715B $q_1$, we conclude that the deflection of $CT_2$ shall be $\delta_2 = \theta_f - \theta - \alpha$.

Existence conditions: Such an L+S+R+ path exists if and only if $L(\Omega_1\Omega_2) \geq 2R_\Omega$ and both $\delta_1$ and $\delta_2$ satisfy validation conditions.

FIG. 7C shows a schematic illustrating a cost function providing an analytical estimation of a cost for continuous curvature path following a pattern of class C|C|C according to some embodiments. For example, FIG. 7C shows a table 710C that discloses conditions and formula of a canonical C|C|C path, i.e., an L+R−L+ path that connects 700C $q_0$ and 799C $q_f$. CC circles 701C $C_l^+(q_0)$ for 700C $q_0$ and 702C $C_l^-(q_f)$ for 799C $q_f$ are used to characterize a configuration 715C $q_1$ of a first left clothoid turn, and a configuration 716C $q_2$ of a second left clothoid turn.

The L+R−L+ path suggests that the two left forward clothoid turns be connected by a right and backward clothoid turn, which implies that a CC circle 703C $C_r^-(q_1)$ must coincide with $C_r^+(q_2)$. Let $\Omega_3$ denote the center of the CC circle 703C, and let α denote an angle between a line 706C $\Omega_1\Omega_2$ and a line 705C $\Omega_1\Omega_3$. The μ-tangency conditions between 701C $C_l^+(q_0)$ and 703C $C_r^-(q_1)$ and between 703C $C_r^-(q_1)$ and 702C $C_l^-(q_f)$ suggest $$L(\Omega_1\Omega_3) = L(\Omega_2\Omega_3) = 2R_\Omega \cos \mu. \tag{10}$$

Applying law of cosines to a triangle $\Omega_1\Omega_2\Omega_3$ yields $$\cos \alpha = \frac{L^2(\Omega_1\Omega_2) + (2R_\Omega \cos\mu)^2 - (2R_\Omega \cos\mu)^2}{2 \cdot L(\Omega_1\Omega_2) \cdot 2R_\Omega \cos\mu} \tag{11}$$

$$= \frac{L(\Omega_1\Omega_2)}{4R_\Omega \cos\mu}.$$

Therefore the coordinate of $\Omega_3$ can be given by $$\Omega_3 = \begin{pmatrix} x_{\Omega_3} \\ y_{\Omega_3} \end{pmatrix} = \begin{pmatrix} x_{\Omega_1} + 2R_\Omega \cos\mu \cos(\theta + \alpha) \\ y_{\Omega_1} + 2R_\Omega \cos\mu \sin(\theta + \alpha) \end{pmatrix} \tag{12}$$

Let $\theta_1$ denote an angle 713C between a line 707C $\Omega_2\Omega_3$ and the positive x-axis.
The path L+R−L+ includes
1. A left clothoid turn $CT_1$: the μ-tangency between 701C $C_l^+(q_0)$ and 703C $C_r^-(q_1)$ asserts that the orientation of 715C $q_1$ is $$\theta + \alpha + \frac{\pi}{2},$$

which is exactly the deflection $\delta_1$ of the $CT_1$;
2. A backward and right clothoid turn $CT_2$: since the orientation of 716C $q_2$ is $$\theta_1 - \frac{\pi}{2}$$

according to the μ-tangency between 703C $C_r^-(q_f)$ and 702C $C_r^-(q_1)$, the deflection of $CT_2$ is $\delta_2 = \theta_1 - \theta - \alpha - \pi$;
3. A second left clothoid turn $CT_3$ with a deflection $$\delta_3 = \theta_f - \theta_1 + \frac{\pi}{2}.$$

Existence conditions: the triangle $\Omega_1\Omega_2\Omega_3$ should be valid, i.e., $$0 \leq L(\Omega_1\Omega_2) \leq 4R_\Omega \cos \mu.$$

Validation conditions are: absolute values of $\delta_1$, $\delta_2$ and $\delta_3$ are less than $\pi + 2\delta_c$.

FIG. 7D shows a schematic illustrating a cost function providing an analytical estimation of a cost for continuous curvature path following a pattern of class C|CC according to some embodiments. For example, FIG. 7D shows a table 710D that discloses conditions and formula of C|CC paths in the driving pattern L+R−L−. After computing centers $\Omega_1$ of a CC circle 701D $C_l^+(q_0)$ and $\Omega_2$ of a CC circle 702D $C_l^+(q_f)$, we aim to determine intermediate configurations 715D $q_1$ and 716D $q_2$, and a center, denoted as $\Omega_3$, of a CC circle 703D $C_r^-(q_1)$.

Based on the μ-tangency between 701D $C_l^+(q_0)$ and 703D $C_r^-(q_1)$, and between 703D $C_r^-(q_1)$ and 702D $C_l^+(q_f)$, we have $$L(\Omega_1\Omega_3)=2R_\Omega\cos\mu, L(\Omega_2\Omega_3)=2R_\Omega. \quad (13)$$

Let α denote an angle 712D between a line 705D $\Omega_1\Omega_2$ and a line 706D $\Omega_1\Omega_3$. The law of cosines suggests that, in a triangle $\Omega_1\Omega_2\Omega_3$, $$\cos\alpha = \frac{L^2(\Omega_1\Omega_2) + (2R_\Omega\cos\mu)^2 - (2R_\Omega)^2}{2\cdot L(\Omega_1\Omega_2)\cdot 2R_\Omega\cos\mu} \quad (14)$$
$$= \frac{L^2(\Omega_1\Omega_2) - (2R_\Omega\sin\mu)^2}{4L(\Omega_1\Omega_2)R_\Omega\cos\mu}$$

Coordinates of $\Omega_3$ can also be represented by (12), except that the α is computed by (14). Let $\theta_1$ denote an angle 713D between a line 707D $\Omega_2\Omega_3$ and the positive x-axis. Thus the path L+R−L− includes
1. A left clothoid turn $CT_1$ with a deflection $$\delta_1 = \theta + \alpha + \frac{\pi}{2};$$

2. A backward and right clothoid turn $CT_2$: since the orientation of 716D $q_2$ is $$\theta_1 - \frac{\pi}{2} - \mu,$$

a deflection of $CT_2$ is $\delta_2=\theta_1-\theta-\alpha-\mu-\pi$;
3. A backward and left clothoid turn $CT_3$ with a deflection $$\delta_2 = \theta_f - \theta_1 + \frac{\pi}{2} + \mu.$$

Existence conditions: the triangle $\Omega_1\Omega_2\Omega_3$ be valid, i.e., $$2R_\Omega(1-\cos\mu)\le L(\Omega_1\Omega_2)\le 2R_\Omega(1+\cos\mu).$$

Validation conditions are: absolute values of $\delta_1$, $\delta_2$ and $\delta_3$ are less than $\pi+2\delta_c$.

FIG. 7E shows a schematic illustrating a cost function providing an analytical estimation of a cost for continuous curvature path following a pattern of class CC|C according to some embodiments. For example, FIG. 7E shows a table 710E that discloses conditions and formula of CC|C paths between 700E and 799E, where centers of CC circles 701E $C_l^+(q_0)$ and 702E $C_l^+(q_f)$ are $\Omega_1$ and $\Omega_2$, respectively.

Let 715E $q_1$ and 716E $q_2$ be two intermediate configurations along with the path. To determine a center $\Omega_3$ of a CC circle 703E $C_r^-(q_1)$, we apply law of cosines in a triangle $\Omega_1\Omega_3\Omega_2$ to obtain an angle 712E α:

$$\cos\alpha = \frac{L^2(\Omega_1\Omega_2) + (2R_\Omega)^2 - (2R_\Omega\cos\mu)^2}{2\cdot L(\Omega_1\Omega_2)\cdot 2R_\Omega} \quad (15)$$

$$= \frac{L^2(\Omega_1\Omega_2) + (2R_\Omega\sin\mu)^2}{4L(\Omega_1\Omega_2)R_\Omega},$$

which yields coordinates of $\Omega_3$ $$\Omega_3 = \begin{pmatrix} x_{\Omega_3} \\ y_{\Omega_3} \end{pmatrix} = \begin{pmatrix} x_{\Omega_1} + 2R_\Omega\cos(\theta-\alpha) \\ y_{\Omega_1} + 2R_\Omega\sin(\theta-\alpha) \end{pmatrix} \quad (16)$$

Let 713E $\theta_1$ denote an angle between a line 707E $\Omega_2\Omega_3$ and the positive x-axis.

The path L++R+L− is the sequential concatenation of
1. A left clothoid turn $CT_1$: the μ-tangency between 701E $C_l^-(q_0)$ and 703E $C_r^+(q_1)$ implies that the orientation of 715E $q_1$ is $$\theta - \alpha + \frac{\pi}{2} - \mu,$$

i.e, the $CT_1$ has a deflection $$\delta_1 = \theta - \alpha + \frac{\pi}{2} - \mu;$$

2. A forward and right clothoid turn $CT_2$: since the μ-tangency between 703E $C_r^+(q_1)$ and 702E $C_l^+(q_f)$ implies that the orientation of 716E $q_2$ is $$\theta_1 - \frac{\pi}{2},$$

thus the $CT_2$ has a deflection $\delta_2=\theta_1-\theta+\alpha-\mu-\pi$;
3. A backward and left clothoid turn $CT_3$ with a deflection $$\delta_3 = \theta_f - \theta_1 + \frac{\pi}{2}.$$

Existence conditions: the triangle $\Omega_1\Omega_3\Omega_2$ be valid. That is $$2R_\Omega(1-\cos\mu)\le L(\Omega_1\Omega_2)\le 2R_\Omega(1+\cos\mu). \quad (17)$$

Validation conditions are: absolute values of $\delta_1$, $\delta_2$ and $\delta_3$ are less than $\pi+2\delta_c$.

FIG. 7F shows a schematic illustrating a cost function providing an analytical estimation of a cost for continuous curvature path following a pattern of class $CC_u|C_uC$ according to some embodiments. For example, FIG. 7F shows a table 710F that discloses conditions and formula of a $CC_u$-|$C_u$C, path L+$R_u$+$L_u$−R− between 700F and 799F. It relies on the determination of intermediate configurations 715F $q_1$, 716F $q_2$, 717F $q_3$ and their associated CC circles.

Let $\Omega_1$ and $\Omega_2$ denote centers of CC circles 701F $C_l^+(q_0)$ and 702F $C_r^-(q_f)$, respectively; and let θ denote an angle 711F between a line 705F $\Omega_1\Omega_2$ and the positive x-axis. The intermediate configurations $q_1$, $q_2$ and $q_3$ along the path are depicted in FIG. 7F. Let centers of a CC circle 703F $C_r^+(q_1)$ and a CC circle 704F $C_l^-(q_2)$ be $\Omega_3$ and $\Omega_4$, respectively.

The μ-tangency conditions implies that $$L(\Omega_1\Omega_3)=L(\Omega_2\Omega_4)=2R_\Omega \cos \mu$$

$$L(\Omega_3\Omega_4)=2R_\Omega. \quad (18)$$

To facilitate determination of the path and improve optimality of the resultant path, a geometric constraint is imposed as that a line 707F $\Omega_3\Omega_4$ is parallel to the line 705F, making $\Omega_1\Omega_3\Omega_4\Omega_2$ an isosceles trapezoid. Let α denote an angle 712F between the line 705F $\Omega_1\Omega_2$ and a line 706F $\Omega_1\Omega_3$, geometric analysis implies that $$\cos\alpha = \frac{\frac{1}{2}(L(\Omega_1\Omega_2) - L(\Omega_3\Omega_4))}{L(\Omega_1\Omega_3)} \quad (19)$$

$$= \frac{L(\Omega_1\Omega_2) - 2R_\Omega\cos\mu}{4R_\Omega}.$$

Coordinates of $\Omega_3$ and $\Omega_4$ are respectively given by $$\Omega_3 = \begin{pmatrix} x_{\Omega_3} \\ y_{\Omega_3} \end{pmatrix} = \begin{pmatrix} x_{\Omega_1} + 2R_\Omega\cos(\theta - \alpha) \\ y_{\Omega_1} + 2R_\Omega\sin(\theta - \alpha) \end{pmatrix} \quad (20)$$

$$\Omega_4 = \begin{pmatrix} x_{\Omega_4} \\ y_{\Omega_4} \end{pmatrix} = \begin{pmatrix} x_{\Omega_3} + 2R_\Omega\cos\mu\cos\theta \\ y_{\Omega_3} + 2R_\Omega\cos\mu\sin\theta \end{pmatrix}.$$

Let $\theta_1$ represent an angle 713F between the line 708F $\Omega_2\Omega_4$ and the positive x-axis, the canonical $L+R_u+L_u-R-$ path can then be formed by sequentially combining 1. A forward and left clothoid turn $CT_1$: the μ-tangency condition between 701F $C_l^+(q_0)$ and 703F $C_r^+(q_1)$ implies that the orientation of 715F $q_1$ is $$\theta - \alpha - \mu + \frac{\pi}{2},$$

thus the $CT_1$ has a deflection $$\delta_1 = \theta - \alpha - \mu + \frac{\pi}{2};$$

2. A forward and right clothoid turn $CT_2$: the μ-tangency condition between 703F $C_r^+(q_1)$ and 704F $C_l^-(q_2)$ implies that the orientation of 716F $q_2$ is $$\theta - \frac{\pi}{2},$$

thus a deflection of $CT_2$ is $u=\alpha+\mu-\pi$;
3. A backward and left clothoid turn $CT_3$ with a deflection $u=\alpha+\mu-\pi$;
4. A backward and right clothoid turn $CT_4$: the μ-tangency condition between 704F $C_l^-(q_2)$ and 702F $C_r^+(q_f)$ implies that the orientation of 717F $q_3$ is $$\theta_1 - \frac{\pi}{2} + \mu,$$

thus a deflection of $CT_4$ is $$\delta_2 = \theta_f - \theta_1 - \mu + \frac{\pi}{2}.$$

Existence conditions: the angle 712F α is well defined, thus $$2R_\Omega \leq L(\Omega_1\Omega_2) \leq 2R_\Omega \cos \mu+4R_\Omega.$$

Validation conditions are: absolute values of $\delta_1, \delta_2, \delta_3$ and $\delta_4$ are less than $\pi+2\delta_c$.

FIG. 7G shows a schematic illustrating a cost function providing an analytical estimation of a cost for continuous curvature path following a pattern of class $C|C_u C_u|C$ according to some embodiments. For example, FIG. 7G shows a table 710G that discloses conditions and formula of $C|C_u-C_u|C$, path, namely $L+R_u-L_u-R+$, between 700G and 799G. The key is to determine three intermediate configurations 715G $q_1$, 716G $q_2$, 717G $q_3$.

Let $\Omega_1$ and $\Omega_2$ denote centers of CC circles 701G $C_l^+(q_0)$ and 702G $C_r^-(q_f)$ associated with 700G $q_0$ and 799G $q_f$, respectively. Let θ denote an angle 711G between a line 705G $\Omega_1\Omega_2$ and the positive x-axis. As shown in FIG. 7G, let $\Omega_3$ and $\Omega_4$ be centers of CC circles 703G $C_r^-(q_1)$ and 704G $C_l^-(q_2)$, respectively. The μ-tangency between 701G $C_l^+(q_0)$ and 703G $C_r^-(q_1)$, and between 704G $C_l^-(q_2)$ and 702G $C_r^-(q_f)$ implies that $$L(\Omega_1\Omega_3)=L(\Omega_2\Omega_4)=2R_\Omega \cos \mu. \quad (21)$$

Furthermore, the μ-tangency between 703G $C_r^-(q_1)$ and 704G $C_l^-(q_2)$ implies that $$L(\Omega_3\Omega_4)=2R_\Omega. \quad (22)$$

Some embodiments prove a geometric constraint, which is always valid: a line 706G $\Omega_1\Omega_3$ is parallel to a line 708G $\Omega_2\Omega_4$. This realization facilitates efficient computation of coordinates of $\Omega_3$ and $\Omega_4$, making $\Omega_1\Omega_4\Omega_2\Omega_3$ a parallelogram. Let α denote an angle 712G between a line 705G $\Omega_1\Omega_2$ and the line 706G $\Omega_1\Omega_3$. Applying law of cosines in a triangle $\Omega_1 q_2 \Omega_3$ yields $$\cos\alpha = \frac{\left(\frac{1}{2}L(\Omega_1\Omega_2)\right)^2 + L^2(\Omega_1\Omega_3)) - \left(\frac{1}{2}L(\Omega_3\Omega_4)\right)^2}{2L(\Omega_1\Omega_3)\frac{1}{2}L(\Omega_1\Omega_2)}$$

$$= \frac{\frac{1}{4}L^2(\Omega_1\Omega_2) + (2R_\Omega\cos\mu)^2 - R_\Omega^2}{2L(\Omega_1\Omega_2)R_\Omega\cos\mu}.$$

Coordinates of $\Omega_3$ and $\Omega_4$ are obtained as:

$$\Omega_3 = \begin{pmatrix} x_{\Omega_3} \\ y_{\Omega_3} \end{pmatrix} = \begin{pmatrix} x_{\Omega_1} + 2R_\Omega\cos\mu\cos(\theta + \alpha) \\ y_{\Omega_1} + 2R_\Omega\cos\mu\sin(\theta + \alpha) \end{pmatrix} \quad (23)$$

$$\Omega_4 = \begin{pmatrix} x_{\Omega_4} \\ y_{\Omega_4} \end{pmatrix} = \begin{pmatrix} x_{\Omega_1} + x_{\Omega_2} - x_{\Omega_3} \\ y_{\Omega_1} + y_{\Omega_2} - y_{\Omega_3} \end{pmatrix}.$$

As illustrated in FIG. 7G, let $\theta_1$ denote an angle 713G between the line 708G $\Omega_3\Omega_4$ and the positive x-axis. The canonical path $L+R_u-R+$ is the sequential concatenation of
1. A left clothoid turn $CT_1$ with a deflection $$\delta_1 = \theta + \alpha + \frac{\pi}{2};$$

2. A backward and right clothoid turn $CT_2$ with a deflection $u=\theta_1-\theta-\alpha-\mu$;
3. A backward and left clothoid turn $CT_3$ with a deflection $-u$.
4. A forward and right clothoid turn $CT_4$ with a deflection $$\delta_2 = \theta_f - \theta - \alpha - \frac{\pi}{2}.$$

Existence conditions: the triangle $\Omega_1 q_2 \Omega_3$ be valid, i.e., $$|2R_\Omega - 4R_\Omega \cos \mu| \leq (\Omega_1\Omega_2) \leq 2R_\Omega + 4R_\Omega \cos \mu.$$

Validation conditions are: absolute values of $\delta_1$, $\delta_2$, $\delta_3$ and $\delta_4$ are less than $\pi+2\delta_c$.

FIG. 7H shows a schematic illustrating a cost function providing an analytical estimation of a cost for continuous curvature path following a pattern of class $$C \mid C_{\frac{\pi}{2}} SC-1$$

according to some embodiments. For example, FIG. 7H shows a table 710H that discloses conditions and formula to build up an L+R−S−R− path that connects 700H $q_0$ and 799H $q_f$, which is equivalent to determine intermediate configurations 715H $q_1$, 716H $q_2$ and 717H $q_3$. Toward this end, we use CC circles 701H $C_l^+(q_0)$ with a center $\Omega_1$ and 702H $C_l^+(q_f)$ with a center $\Omega_2$.

Let $\theta$ denote an angle 711H between a line 705H $\Omega_1\Omega_2$ and the positive x-axis. Denote a center of a CC circle 703H $C_r^-(q_1)$ as $\Omega_3$. This invention realizes that the following fact holds: $\Omega_1$, $\Omega_2$ and $\Omega_3$ stay in the same straight line 705H. This fact allows derivation of analytical formula to compute a L+R−S−R− path that connects 700H $q_0$ and 799H $q_f$.

The L+R−S−R− path can thus be computed immediately
1. A forward and left clothoid turn $CT_1$ with a deflection $$\delta_1 = \theta + \frac{\pi}{2};$$

2. A backward and right clothoid turn $CT_2$ with a deflection $$\delta_2 = \frac{\pi}{2}$$

3. A straight line segment 704H $q_2 q_3$ with a length given by $$L(q_2 q_3) = L(\Omega_2 \Omega_3) - 2R_\Omega \sin\mu$$
$$= L(\Omega_1 \Omega_2) - 2R_\Omega \cos\mu - 2R_\Omega \sin\mu;$$

4. A second backward and right clothoid turn $CT_3$ with a deflection $\delta_3 = \theta_f - \theta - \pi$.

Existence conditions: $L(q_2 q_3) \geq 0$, that is $$L(\Omega_1\Omega_2) \geq 2R_\Omega(\cos\mu + \sin\mu).$$

Validation conditions are: absolute values of $\delta_1$ and $\delta_2$ are less than $\pi+2\delta_c$.

FIG. 7I shows a schematic illustrating a cost function providing an analytical estimation of a cost for continuous curvature path following a pattern of class $$C \mid C_{\frac{\pi}{2}} SC-2$$

according to some embodiments. For example, FIG. 7I shows a table 710I that discloses conditions and formula to construct a C|CSC-2 class of CC paths, without loss of generality, which shares a driving pattern L+R−S−L−. This task is based on CC circles 701I $C_l^+(q_0)$ and 702I $C_l^+(q_f)$, whose centers are denoted as $\Omega_1$ and $\Omega_2$, respectively.

Let $\theta$ denote an angle between a line $\Omega_1\Omega_2$ and the positive x-axis. Let 715I $q_1$, 716I $q_2$ and 717I $q_3$ represent beginning configurations of a first backward right clothoid turn, a line segment 704I and a second backward right clothoid turn, respectively. Let $\Omega_3$ be a center of a CC circle 703I $C_r^-(q_1)$, and $\alpha$ denote an angle 712I between a line 706I $\Omega_1\Omega_3$ and a line 705I $\Omega_1\Omega_2$. We extend the line 706I $\Omega_1\Omega_3$ to $\Omega_0$ such that a line 707I $\Omega_2\Omega_0$ is perpendicular to $\Omega_1\Omega_0$. Let a line $\Omega_3 A$ be perpendicular to the line 704I $q_2 q_3$, and let B be an intersecting point of the line 707I $\Omega_2\Omega_0$ and the line 704I $q_2 q_3$. Based on the μ-tangency between 701I $C_l^+(q_0)$ and 703I $C_r^-(q_1)$, orientations of both 716I $q_2$ and 717I $q_3$ are equal to $\theta+\alpha+\pi$, which implies that the line 704I $q_2 q_3$ is parallel to the line 706I $\Omega_1\Omega_0$ and is perpendicular to the line 707I $\Omega_0\Omega_2$. This indicates that $\Omega_3 AB\Omega_0$ is a rectangle. The μ-tangency between the line 704I $q_2 q_3$ and 703I $C_r^-(q_1)$, and between the line 704I $q_2 q_3$ and 702I $C_l^+(q_f)$ suggests $$L(\Omega_3 A) = L(\Omega_2 B) = L(\Omega_0 B) = R_\Omega \cos\mu,$$

which implies that, in a right triangle $\Omega_0 \Omega_1 \Omega_2$, $$\sin\alpha = \frac{L(\Omega_0\Omega_2)}{L(\Omega_1\Omega_2)} = \frac{2R_\Omega \cos\mu}{L(\Omega_1\Omega_2)}. \qquad (24)$$

It follows from (24) that the L+R−S−L− canonical CC path includes
1. A forward and left clothoid turn $CT_1$ with a deflection $$\delta_1 = \theta + \alpha + \frac{\pi}{2};$$

2. A backward and right clothoid turn $CT_2$ with a deflection $$\delta_2 = \frac{\pi}{2}$$

3. A straight line segment 704I $q_2 q_3$ of a length $$L(q_2 q_3) = L(AB) - 2R_\Omega \sin\mu = L(\Omega_3 \Omega_0) - 2R_\Omega \sin\mu$$
$$= L(\Omega_1\Omega_2)\cos\alpha - 2R_\Omega\cos\mu - 2R_\Omega\sin\mu;$$

4. A second backward and right clothoid turn $CT_3$ with a deflection $\delta_3 = \theta_f - \theta - \pi$.

Existence conditions: L(q$_2$q$_3$)≥0, that is $$L(\Omega_1\Omega_2) \geq 2R_\Omega\cos\mu$$
$$\sqrt{L^2(\Omega_1\Omega_2) - (2R_\Omega\cos\mu)^2} \geq 2R_\Omega(\cos\mu + \sin\mu).$$

Validation conditions are: absolute values of $\delta_1$, $\delta_2$ and $\delta_3$ are less than $\pi+2\delta_c$.

FIG. 7J shows a schematic illustrating a cost function providing an analytical estimation of a cost for continuous curvature path following a pattern of class $$C\left|C_{\frac{\pi}{2}}SC_{\frac{\pi}{2}}\right|C$$

according to some embodiments. For example, FIG. 7J shows a table 710J that discloses conditions and formula to construct a canonical C|CSC|C path, with a specific driving pattern L+R−S−L−R+.

Let 701J $C_l^+(q_0)$ and 702J $C_r^-(q_f)$ be CC circles associated with 700J $q_0$ and 799J $q_f$, whose centers are $\Omega_1$ and $\Omega_2$, respectively. Let θ denote an angle 711J between a line 705J $\Omega_1\Omega_2$ and the positive x-axis. As shown in FIG. 7J, to appropriately determine intermediate configurations 715J $q_1$, 716J $q_2$, 717J $q_3$ and 718J $q_4$, one takes advantage of CC circles 703J $C_r^-(q_1)$ and 704J $C_l^-(q_3)$, whose centers are $\Omega_3$ and $\Omega_4$, respectively. This embodiment recognizes the following necessary geometric property: a line 706J $\Omega_1\Omega_3$ is parallel to a line 707J $\Omega_4\Omega_2$.

Let a line $\Omega_4\Omega_0$ be perpendicular to the line 706J $\Omega_1\Omega_3$. Since $q_0q_1q_2q_3q_4$ forms a canonical L+R−S−L− path from 700J $q_0$ to 718J $q_4$, it follows from the previous reasoning that $L(\Omega_4\Omega_0)=2R_\Omega\cos\mu$. Moreover, let $\Omega_5$ be a point on the straight line 706J $\Omega_1\Omega_3$ such that a line 708J $\Omega_2\Omega_5$ is perpendicular to $\Omega_1\Omega_5$. The line 707J $\Omega_4\Omega_2=2R_\Omega\cos\mu$ and is parallel to $\Omega_1\Omega_5$, making $\Omega_0\Omega_4\Omega_2\Omega_5$ a square. Therefore, an auxiliary angle α 712J can be determined in a right triangle $\Omega_1\delta_2\Omega_5$:

$$\sin\alpha = \frac{L(\Omega_2\Omega_5)}{L(\Omega_1\Omega_2)} = \frac{2R_\Omega\cos\mu}{L(\Omega_1\Omega_2)}. \tag{25}$$

It follows immediately from (25) that the L+R−S−L−R+ CC path is formed by

1. A forward and left clothoid turn $CT_1$ with a deflection $$\delta_1 = \theta + \alpha + \frac{\pi}{2};$$

2. A backward and right clothoid turn $CT_2$ with a deflection $$\delta_2 = \frac{\pi}{2};$$

3. A backward line segment 755J $q_2q_3$ of length $$L(q_2q_3) = L(\Omega_3\Omega_0) - 2R_\Omega\sin\mu$$
$$= \sqrt{L^2(\Omega_1\Omega_2) - (2R_\Omega\cos\mu)^2} - 4R_\Omega\cos\mu - 2R_\Omega\sin\mu$$

4. A backward and left clothoid turn $CT_3$ with a deflection $$\delta_3 = -\frac{\pi}{2};$$

5. A forward and right clothoid turn $CT_4$ with a deflection $$\delta_3 = \theta_f - \theta - \alpha - \frac{\pi}{2}.$$

Existence conditions: L(q$_2$q$_3$)≥0, that is $$L(\Omega_1\Omega_2) \geq 2R_\Omega\cos\mu,$$
$$\sqrt{L^2(\Omega_1\Omega_2) - (2R_\Omega\cos\mu)^2} \geq 4R_\Omega\cos\mu + 2R_\Omega\sin\mu,$$

Validation conditions are: absolute values of $\delta_1$, $\delta_2$, $\delta_3$ and $\delta_4$ are less than $\pi+2\delta_c$.

Similar to FIGS. 7A-7J, FIGS. 8A-8J illustrate examples of analytical functions used to generate paths for a given driving pattern according to some embodiments.

FIG. 8A shows a schematic illustrating an analytical function providing an analytical solution for determining a continuous curvature path following a pattern of class CSC-1 according to some embodiments. For example, FIG. 8A shows a table 810A that discloses parameters for finding analytically the continuous curvature path following a pattern 820A according to one embodiment.

FIG. 8B shows a schematic illustrating an analytical function providing an analytical solution for determining a continuous curvature path following a pattern of class CSC-2 according to some embodiments. For example, FIG. 8B shows a table 810B that discloses parameters for finding analytically the continuous curvature path following a pattern 820B according to one embodiment.

FIG. 8C shows a schematic illustrating an analytical function providing an analytical solution for determining a continuous curvature path following a pattern of class C|C|C according to some embodiments. For example, FIG. 8C shows a table 810C that discloses parameters for finding analytically the continuous curvature path following a pattern 820C according to one embodiment.

FIG. 8D shows a schematic illustrating an analytical function providing an analytical solution for determining a continuous curvature path following a pattern of class C|CC according to some embodiments. For example, FIG. 8D shows a table 810D that discloses parameters for finding analytically the continuous curvature path following a pattern 820D according to one embodiment.

FIG. 8E shows a schematic illustrating an analytical function providing an analytical solution for determining a continuous curvature path following a pattern of class CC|C according to some embodiments. For example, FIG. 8E shows a table 810E that discloses parameters for finding analytically the continuous curvature path following a pattern 820E according to one embodiment.

FIG. 8F shows a schematic illustrating an analytical function providing an analytical solution for determining a continuous curvature path following a pattern of class $CC_u$-$|C_uC$ according to some embodiments. For example, FIG. 8F shows a table 810F that discloses parameters for finding analytically the continuous curvature path following a pattern 820F according to one embodiment.

FIG. 8G shows a schematic illustrating an analytical function providing an analytical solution for determining a continuous curvature path following a pattern of class $C|C_u$-$C_u|C$ according to some embodiments. For example, FIG. 8G shows a table 810G that discloses parameters for finding analytically the continuous curvature path following a pattern 820G according to one embodiment.

FIG. 8H shows a schematic illustrating an analytical function providing an analytical solution for determining a continuous curvature path following a pattern of class $$C\left|C_{\frac{\pi}{2}}SC-1\right.$$

according to some embodiments. For example, FIG. 8H shows a table 810H that discloses parameters for finding analytically the continuous curvature path following a pattern 820H according to one embodiment.

FIG. 8I shows a schematic illustrating an analytical function providing an analytical solution for determining a continuous curvature path following a pattern of class $$C\left|C_{\frac{\pi}{2}}SC-2\right.$$

according to some embodiments. For example, FIG. 8I shows a table 810I that discloses parameters for finding analytically the continuous curvature path following a pattern 820I according to one embodiment.

FIG. 8J shows a schematic illustrating an analytical function providing an analytical solution for determining a continuous curvature path following a pattern of class $$C\left|C_{\frac{\pi}{2}}SC_{\frac{\pi}{2}}\right|C$$

according to some embodiments. For example, FIG. 8J shows a table 810IJ that discloses parameters for finding analytically the continuous curvature path following a pattern 820J according to one embodiment.

FIG. 9 shows a schematic of a system according to one embodiment. The system includes a vehicle 901 including a processor 902 configured for performing an automated parking 950. The vehicle also includes at least one sensor, such as a LIDAR 910 and/or a camera 920. The LIDAR sensor 910 is the low-resolution first sensor and the camera 920 is the high-resolution second sensor. The sensor 910 and/or 920 is operatively connected to the processor 902 and is configured for sensing information indicative of the geometry of at least part of the parking space. Using this information, the processor 902 determines and/or updates the map of the parking space 900. To that end, the processor 902 performs the automated parking 950 using the map 900.

FIG. 10 shows a block diagram of an automated parking system 1000 according to some embodiments. The system 1000 can be implemented internal to the vehicle 901. Additionally, or alternatively, the system 1000 can be communicatively connected to the vehicle 901.

The system 1000 can include one or combination of a camera 1010, an inertial measurement unit (IMU) 1030, a processor 1050, a memory 1060, a transceiver 1070, and a display/screen 1080, which can be operatively coupled to other components through connections 1020. The connections 1020 can comprise buses, lines, fibers, links or combination thereof.

The transceiver 1070 can, for example, include a transmitter enabled to transmit one or more signals over one or more types of wireless communication networks and a receiver to receive one or more signals transmitted over the one or more types of wireless communication networks. The transceiver 1070 can permit communication with wireless networks based on a variety of technologies such as, but not limited to, femtocells, Wi-Fi networks or Wireless Local Area Networks (WLANs), which may be based on the IEEE 802.11 family of standards, Wireless Personal Area Networks (WPANS) such Bluetooth, Near Field Communication (NFC), networks based on the IEEE 802.15x family of standards, and/or Wireless Wide Area Networks (WWANs) such as LTE, WiMAX, etc. The system 400 can also include one or more ports for communicating over wired networks.

In some embodiments, the system 1000 can comprise image sensors such as CCD or CMOS sensors, lasers and/or camera 1010, which are hereinafter referred to as "sensor 1010". For example, the sensor 1010 can convert an optical image into an electronic or digital image and can send acquired images to processor 1050. Additionally, or alternatively, the sensor 1010 can sense the light reflected from a target object in a scene and submit the intensities of the captured light to the processor 1050.

For example, the sensor 1010 can include color or grayscale cameras, which provide "color information." The term "color information" as used herein refers to color and/or grayscale information. In general, as used herein, a color image or color information can be viewed as comprising 1 to N channels, where N is some integer dependent on the color space being used to store the image. For example, an RGB image comprises three channels, with one channel each for Red, Blue and Green information.

For example, the sensor 1010 can include a depth sensor for providing "depth information." The depth information can be acquired in a variety of ways using depth sensors. The term "depth sensor" is used to refer to functional units that may be used to obtain depth information independently and/or in conjunction with some other cameras. For example, in some embodiments, the depth sensor and the optical camera can be part of the sensor 1010. For example, in some embodiments, the sensor 1010 includes RGBD cameras, which may capture per-pixel depth (D) information when the depth sensor is enabled, in addition to color (RGB) images.

As another example, in some embodiments, the sensor 1010 can include a 3D Time Of Flight (3DTOF) camera. In embodiments with 3DTOF camera, the depth sensor can take the form of a strobe light coupled to the 3DTOF camera, which can illuminate objects in a scene and reflected light can be captured by a CCD/CMOS sensor in the sensor 410. Depth information can be obtained by measuring the time that the light pulses take to travel to the objects and back to the sensor.

As a further example, the depth sensor can take the form of a light source coupled to the sensor 1010. In one embodiment, the light source projects a structured or textured light pattern, which can include one or more narrow bands of light, onto objects in a scene. Depth information is obtained by exploiting geometrical distortions of the projected pattern caused by the surface shape of the object. One embodiment determines depth information from stereo sensors such as a combination of an infra-red structured light projector and an infra-red camera registered to a RGB camera.

In some embodiments, the sensor 1010 includes stereoscopic cameras. For example, a depth sensor may form part of a passive stereo vision sensor, which may use two or more cameras to obtain depth information for a scene. The pixel coordinates of points common to both cameras in a captured scene may be used along with camera pose information and/or triangulation techniques to obtain per-pixel depth information.

In some embodiments, the system 1000 can be operatively connected to multiple sensors 1010, such as dual front cameras and/or a front and rear-facing cameras, which may also incorporate various sensors. In some embodiments, the sensors 1010 can capture both still and video images. In some embodiments, the sensor 1010 can include RGBD or stereoscopic video cameras capable of capturing images at, e.g., 30 frames per second (fps). In one embodiment, images captured by the sensor 1010 can be in a raw uncompressed format and can be compressed prior to being processed and/or stored in memory 1060. In some embodiments, image compression can be performed by the processor 1050 using lossless or lossy compression techniques.

In some embodiments, the processor 1050 can also receive input from IMU 1030. In other embodiments, the IMU 1030 can comprise 3-axis accelerometer(s), 3-axis gyroscope(s), and/or magnetometer(s). The IMU 1030 can provide velocity, orientation, and/or other position related information to the processor 1050. In some embodiments, the IMU 1030 can output measured information in synchronization with the capture of each image frame by the sensor 1010. In some embodiments, the output of the IMU 1030 is used in part by the processor 1050 to fuse the sensor measurements and/or to further process the fused measurements.

The system 1000 can also include a screen or display 1080 rendering images, such as color and/or depth images. In some embodiments, the display 1080 can be used to display live images captured by the sensor 1010, fused images, augmented reality (AR) images, graphical user interfaces (GUIs), and other program outputs. In some embodiments, the display 1080 can include and/or be housed with a touchscreen to permit users to input data via some combination of virtual keyboards, icons, menus, or other GUIs, user gestures and/or input devices such as styli and other writing implements. In some embodiments, the display 1080 can be implemented using a liquid crystal display (LCD) display or a light emitting diode (LED) display, such as an organic LED (OLED) display. In other embodiments, the display 480 can be a wearable display. In some embodiments, the result of the fusion can be rendered on the display 1080 or submitted to different applications that can be internal or external to the system 1000.

Exemplary system 1000 can also be modified in various ways in a manner consistent with the disclosure, such as, by adding, combining, or omitting one or more of the functional blocks shown. For example, in some configurations, the system 1000 does not include the IMU 1030 or the transceiver 1070. Further, in certain example implementations, the system 1000 include a variety of other sensors (not shown) such as an ambient light sensor, microphones, acoustic sensors, ultrasonic sensors, laser range finders, etc. In some embodiments, portions of the system 400 take the form of one or more chipsets, and/or the like.

The processor 1050 can be implemented using a combination of hardware, firmware, and software. The processor 1050 can represent one or more circuits configurable to perform at least a portion of a computing procedure or process related to sensor fusion and/or methods for further processing the fused measurements. The processor 1050 retrieves instructions and/or data from memory 1060. The processor 1050 can be implemented using one or more application specific integrated circuits (ASICs), central and/or graphical processing units (CPUs and/or GPUs), digital signal processors (DSPs), digital signal processing devices (DSPDs), programmable logic devices (PLDs), field programmable gate arrays (FPGAs), controllers, micro-controllers, microprocessors, embedded processor cores, electronic devices, other electronic units designed to perform the functions described herein, or a combination thereof.

The memory 1060 can be implemented within the processor 1050 and/or external to the processor 1050. As used herein the term "memory" refers to any type of long term, short term, volatile, nonvolatile, or other memory and is not to be limited to any particular type of memory or number of memories, or type of physical media upon which memory is stored. In some embodiments, the memory 1060 holds program codes that facilitate the automated parking.

For example, the memory 1060 can store the measurements of the sensors, such as still images, depth information, video frames, program results, as well as data provided by the IMU 1030 and other sensors. The memory 1060 can store a memory storing a geometry of the vehicle, a map of the parking space, a kinematic model of the vehicle, and a dynamic model of the vehicle. In general, the memory 1060 can represent any data storage mechanism. The memory 1060 can include, for example, a primary memory and/or a secondary memory. The primary memory can include, for example, a random access memory, read only memory, etc. While illustrated in FIG. 4 as being separate from the processors 1050, it should be understood that all or part of a primary memory can be provided within or otherwise co-located and/or coupled to the processors 1050.

Secondary memory can include, for example, the same or similar type of memory as primary memory and/or one or more data storage devices or systems, such as, for example, flash/USB memory drives, memory card drives, disk drives, optical disc drives, tape drives, solid state drives, hybrid drives etc. In certain implementations, secondary memory can be operatively receptive of, or otherwise configurable to a non-transitory computer-readable medium in a removable media drive (not shown). In some embodiments, the non-transitory computer readable medium forms part of the memory 1060 and/or the processor 1050.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Also, the embodiments of the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Although the invention has been described by way of examples of preferred embodiments, it is to be understood that various other adaptations and modifications can be made within the spirit and scope of the invention.

Therefore, it is the object of the appended claims to cover all such variations and modifications as come within the true spirit and scope of the invention.

The invention claimed is:

1. A system for controlling a motion of a vehicle, comprising:
   a memory configured to store a set of analytical functions corresponding to a set of patterns of elementary paths, each pattern represents a continuous path and each analytical function is determined for a corresponding pattern to provide an analytical solution for input states of the vehicle defining a continuous path connecting the input states by a sequential compositions of the elementary paths following the corresponding pattern, wherein the set of patterns is an exhaustive set that guaranties that for any values of the input states, there is at least one pattern that represents a feasible continuous curvature path connecting the input states without consideration of obstacles, the set of patterns includes 48 different patterns representing transformed Reeds-Shepp (RS) paths, wherein each pattern in the set is formed by replacing a circular arc in a corresponding pattern representing an RS path with a clothoid turn; and
   a processor configured to
      select from the memory, in response to receiving an initial state and a target state of the vehicle, an analytical function corresponding to a minimum cost of the continuous curvature path connecting the initial state with the target state and to analytically determine parameters of the continuous curvature path using the selected analytical function, wherein a cost of the continuous curvature path representing a transformed RS path is a cost of corresponding RS path; and
      control the motion of the vehicle according to the parameters of the continuous curvature path.

2. The system of claim 1, wherein the parameters of the continuous curvature path includes a sequence of coordinates and orientation angles of points on a plane of the motion of the vehicle forming the continuous curvature path.

3. The system of claim 1, wherein the parameters of the continuous curvature path includes a sequence of control inputs, wherein the control of the motion of the vehicle according to the sequence of control inputs transitions the states of the vehicle according to the continuous curvature path.

4. The system of claim 1, wherein the memory stores a set of cost function corresponding to the set of patterns and the set of analytical functions, wherein the processor determines the cost of each pattern using the corresponding cost function and selects the analytical function corresponding to the pattern having the minimal cost.

5. The system of claim 1, wherein the memory stores a set of cost function corresponding to the set of patterns and the set of analytical functions, wherein the processor determines a set of Reeds-Shepp's (RS) paths connecting the initial state and the target state, evaluates a cost of each RS path using the cost function corresponding to the pattern resembling a pattern of the RS path, and selects the analytical function corresponding to the cost function producing the minimal cost.

6. The system of claim 1, wherein the processor determines a Reeds-Shepp (RS) path connecting the initial state and the target state and selects the analytical function corresponding to a pattern of the RS path.

7. The system of claim 1, wherein the analytical functions are determined to provide solutions satisfying µ-tangency conditions on a mutual arrangement of adjacent elementary paths forming the continuous curvature path, and wherein at least some of the analytical functions are determined to provide solutions satisfying an additional geometrical constraint on a mutual arrangement of at least one intermediate elementary path with respect to at least one boundary elementary path.

8. The system of claim 7,
   wherein the additional geometrical constraint for a pattern $C_1C_2|C_3C_4$ provides that centers of the clothoid turns $C_2$ and $C_3$ lies on a line parallel to a line connecting centers of the clothoid turns $C_1$ and $C_4$, wherein C stands for a clothoid turn and a symbol "|" stands for reversing a direction of the motion,
   wherein the additional geometrical constraint for a pattern $C_1|C_2C_3|C_4$ provides that a line formed by centers of the clothoid turns $C_1$ and $C_2$ is parallel to a line connecting centers of the clothoid turns $C_3$ and $C_4$
   wherein the additional geometrical constraint for a pattern $C_1|C_2SC_3-1$ provides that centers of all three clothoid turns $C_1$, $C_2$, and $C_3$ forms a straight line;
   wherein the additional geometrical constraint for a pattern $C_1|C_2SC_3|C_4$ provides that a line between centers of the clothoid turns $C_1$ and $C_2$ is parallel to a line connecting centers of the clothoid turns $C_3$ and $C_4$.

9. The system of claim 1, further comprising:
   a motion planner to sample a drivable state space of the vehicle, prune the sampled states to produce a sequence of states for the motion of the vehicle, and invoke the processor for each pair of adjacent states in the sequence of states to produce a sequence of continuous paths.

10. A method for controlling a motion of a vehicle, wherein the method uses a processor coupled to a memory storing a set of analytical functions and a set of cost functions corresponding to a set of patterns of elementary paths, each pattern represents a continuous path, each analytical function is determined for a corresponding pattern to provide an analytical solution for input states of the vehicle defining a continuous path connecting the input states by a sequential compositions of the elementary paths following the corresponding pattern, and each cost function is determined to provide a cost of the corresponding pattern indicative of a cost of the motion of the vehicle according to the continuous path connecting the input states and represented by the corresponding pattern, wherein the set of patterns is an exhaustive set that guaranties that for any values of the input states, there is at least one pattern that represents a feasible continuous curvature path connecting the input states without consideration of obstacles, the set of patterns includes 48 different patterns representing transformed Reeds-Shepp (RS) paths, wherein each pattern in the set is formed by replacing a circular arc in a corresponding pattern representing an RS path with a clothoid turn, wherein the processor is coupled with stored instructions implementing the method, wherein the instructions, when executed by the processor carry out at least some steps of the method, comprising:

receiving an initial state and a target state of the vehicle;

determining the cost of each pattern indicative of the cost of the motion of the vehicle according to a continuous path represented by the corresponding pattern and connecting the initial state with the target state, wherein the cost of the continuous curvature path representing a transformed RS path is a cost of corresponding RS path;

selecting an analytical function of the pattern having the minimum cost;

analytically determining parameters of the continuous path using the selected analytical function; and controlling the motion of the vehicle according to the parameters of the continuous path.

11. The method of claim 10, wherein the set of patterns is an exhaustive set that guaranties that for any values of the input states, there is at least one pattern that represents a feasible continuous path connecting the input states without consideration of obstacles.

12. The method of claim 10, the set of patterns includes 48 different patterns representing transformed Reeds-Shepp (RS) paths, wherein each pattern in the set is formed by replacing a circular arc in a corresponding pattern representing an RS path with a clothoid turn.

13. The method of claim 12, wherein the analytical functions are determined to provide solutions satisfying μ-tangency conditions on a mutual arrangement of adjacent elementary paths forming the continuous path, and wherein at least some of the analytical functions are determined to provide solutions satisfying an additional geometrical constraint on a mutual arrangement of at least one intermediate elementary path with respect to at least one boundary elementary path.

14. The method of claim 13, wherein the additional geometrical constraint for a pattern $C_1C_2|C_3C_4$ provides that centers of the clothoid turns $C_2$ and $C_3$ lies on a line parallel to a line connecting centers of the clothoid turns $C_1$ and $C_4$, wherein C stands for a clothoid turn and a symbol "|" stands for reversing a direction of the motion, wherein the additional geometrical constraint for a pattern $C_1|C_2C_3|C_4$ provides that a line formed by centers of the clothoid turns $C_1$ and $C_2$ is parallel to a line connecting centers of the clothoid turns $C_3$ and $C_4$ wherein the additional geometrical constraint for a pattern $C_1|C_2SC_3-1$ provides that centers of all three clothoid turns $C_1$, $C_2$, and $C_3$ forms a straight line;

wherein the additional geometrical constraint for a pattern $C_1|C_2SC_3|C_4$ provides that a line between centers of the clothoid turns $C_1$ and $C_2$ is parallel to a line connecting centers of the clothoid turns $C_3$ and $C_4$.

15. A non-transitory computer readable storage medium embodied thereon a program executable by a processor for performing a method, wherein the memory stores a set of analytical functions and a set of cost functions corresponding to a set of patterns of elementary paths, each pattern represents a continuous path, each analytical function is determined for a corresponding pattern to provide an analytical solution for input states of the vehicle defining a continuous path connecting the input states by a sequential compositions of the elementary paths following the corresponding pattern, and each cost function is determined to provide a cost of the corresponding pattern indicative of a cost of the motion of the vehicle according to the continuous path connecting the input states and represented by the corresponding pattern, wherein the set of patterns is an exhaustive set that guaranties that for any values of the input states, there is at least one pattern that represents a feasible continuous curvature path connecting the input states without consideration of obstacles, the set of patterns includes 48 different patterns representing transformed Reeds-Shepp (RS) paths, wherein each pattern in the set is formed by replacing a circular arc in a corresponding pattern representing an RS path with a clothoid turn, the method comprising:

receiving an initial state and a target state of the vehicle;

determining the cost of each pattern indicative of the cost of the motion of the vehicle according to a continuous path represented by the corresponding pattern and connecting the initial state with the target state, wherein the cost of the continuous curvature path representing a transformed RS path is a cost of corresponding RS path;

selecting an analytical function of the pattern having the minimum cost;

analytically determining parameters of the continuous path using the selected analytical function; and controlling the motion of the vehicle according to the parameters of the continuous path.

* * * * *